US008640027B2

(12) United States Patent
Chandhoke et al.

(10) Patent No.: US 8,640,027 B2
(45) Date of Patent: Jan. 28, 2014

(54) SYSTEM AND METHOD FOR CONFIGURING A HARDWARE DEVICE TO EXECUTE A PROTOTYPE

(75) Inventors: Sundeep Chandhoke, Austin, TX (US); Nicolas Vazquez, Austin, TX (US); Kevin L. Schultz, Georgetown, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 10/200,091

(22) Filed: Jul. 19, 2002

(65) Prior Publication Data

US 2002/0186245 A1 Dec. 12, 2002

Related U.S. Application Data

(63) Continuation-in-part of application No. 09/595,003, filed on Jun. 13, 2000, now Pat. No. 7,937,665, and a continuation-in-part of application No. 09/949,783, filed on Sep. 10, 2001, now Pat. No. 6,971,066.

(51) Int. Cl.
*G06F 3/00* (2006.01)
*G06F 9/00* (2006.01)
*G06F 17/00* (2006.01)

(52) U.S. Cl.
USPC ................. 715/700; 715/967; 715/764

(58) Field of Classification Search
USPC ......... 715/764, 967, 700; 348/207.11; 396/57
See application file for complete search history.

(56) References Cited

U.S. PATENT DOCUMENTS

| | | | |
|---|---|---|---|
| 3,744,031 A * | 7/1973 | Avery et al. ................. | 700/160 |
| 4,831,580 A * | 5/1989 | Yamada ...................... | 717/105 |
| 4,901,221 A | 2/1990 | Kodosky et al. | |
| 4,914,568 A | 4/1990 | Kodosky et al. | |
| 5,005,119 A | 4/1991 | Rumbaugh et al. | |
| 5,291,587 A | 3/1994 | Kodosky et al. | |
| 5,301,301 A | 4/1994 | Kodosky et al. | |
| 5,301,336 A | 4/1994 | Kodosky et al. | |
| 5,309,556 A | 5/1994 | Sismilich | |

(Continued)

FOREIGN PATENT DOCUMENTS

EP     0 510 514 A1    10/1992

OTHER PUBLICATIONS

Compumotor, Motion Builder Start-Up Guide & Tutorial, Oct. 1996, Parker Hannifin Corporation, 1-93.*

(Continued)

*Primary Examiner* — Boris Pesin
*Assistant Examiner* — Sabrina Greene
(74) *Attorney, Agent, or Firm* — Meyertons Hood Kivlin Kowert & Goetzel, P.C.; Jeffrey C. Hood

(57) ABSTRACT

A system and method for configuring a hardware device to execute a prototype is presented. The hardware device may include a programmable hardware element and/or a processor and memory. The prototype may comprise a software entity operable to perform a plurality of executable operations, wherein the prototype is created by a user without requiring user programming. For example, a prototyping environment may provide a library of operations that are specific to a particular problem domain and may enable the user to select various operations from the library for inclusion in the prototype. The prototyping environment may include a graphical user interface that is streamlined for interactively experimenting with various parameters or properties associated with the selected operations and seeing the effects of adjusting the parameters.

26 Claims, 49 Drawing Sheets

(56) References Cited

U.S. PATENT DOCUMENTS

| | | | |
|---|---|---|---|
| 5,331,111 A * | 7/1994 | O'Connell | 84/602 |
| 5,386,508 A * | 1/1995 | Itonori et al. | 717/109 |
| 5,481,712 A | 1/1996 | Silver et al. | |
| 5,485,601 A * | 1/1996 | Ching | 717/106 |
| 5,490,246 A | 2/1996 | Brotsky et al. | |
| 5,493,246 A | 2/1996 | Anderson | |
| 5,497,498 A | 3/1996 | Taylor | |
| 5,535,342 A | 7/1996 | Taylor | |
| 5,541,849 A | 7/1996 | Rostoker et al. | |
| 5,583,749 A | 12/1996 | Tredennick et al. | |
| 5,603,043 A | 2/1997 | Taylor et al. | |
| 5,623,659 A | 4/1997 | Shi et al. | |
| 5,631,974 A * | 5/1997 | Lau-Kee et al. | 382/132 |
| 5,638,299 A | 6/1997 | Miller | |
| 5,652,875 A | 7/1997 | Taylor | |
| 5,684,980 A | 11/1997 | Casselman | |
| 5,732,277 A | 3/1998 | Kodosky et al. | |
| 5,737,235 A | 4/1998 | Kean et al. | |
| 5,742,504 A | 4/1998 | Meyer et al. | |
| 5,764,546 A * | 6/1998 | Bryant et al. | 702/108 |
| 5,862,372 A * | 1/1999 | Morris et al. | 717/109 |
| 5,911,070 A | 6/1999 | Solton et al. | |
| 5,940,296 A * | 8/1999 | Meyer | 700/83 |
| 5,966,532 A | 10/1999 | McDonald et al. | |
| 6,006,039 A * | 12/1999 | Steinberg et al. | 396/57 |
| 6,053,951 A * | 4/2000 | McDonald et al. | 717/109 |
| 6,064,409 A | 5/2000 | Thomsen et al. | |
| 6,173,438 B1 | 1/2001 | Kodosky et al. | |
| 6,201,516 B1 * | 3/2001 | Tanide et al. | 345/7 |
| 6,219,628 B1 | 4/2001 | Kodosky et al. | |
| 6,237,136 B1 * | 5/2001 | Sadahiro | 717/110 |
| 6,282,699 B1 * | 8/2001 | Zhang et al. | 717/109 |
| 6,298,474 B1 | 10/2001 | Blowers et al. | |
| 6,349,274 B1 * | 2/2002 | Kay et al. | 703/13 |
| 6,366,300 B1 | 4/2002 | Ohara et al. | |
| 6,369,836 B1 * | 4/2002 | Larson et al. | 715/763 |
| 6,408,428 B1 * | 6/2002 | Schlansker et al. | 716/17 |
| 6,408,429 B1 | 6/2002 | Marrion, Jr. et al. | |
| 6,437,805 B1 * | 8/2002 | Sojoodi et al. | 715/763 |
| 6,442,442 B1 * | 8/2002 | Weinhofer | 700/86 |
| 6,526,566 B1 * | 2/2003 | Austin | 717/109 |
| 6,584,601 B1 * | 6/2003 | Kodosky et al. | 716/4 |
| 6,608,638 B1 * | 8/2003 | Kodosky et al. | 715/771 |
| 6,629,312 B1 * | 9/2003 | Gupta | 717/136 |
| 6,637,022 B1 | 10/2003 | Weeren et al. | |
| 6,684,381 B1 * | 1/2004 | Bening et al. | 716/18 |
| 6,690,981 B1 * | 2/2004 | Kawachi et al. | 700/83 |
| 6,715,139 B1 * | 3/2004 | Kodosky et al. | 717/125 |
| 6,750,944 B2 * | 6/2004 | Silverbrook et al. | 355/18 |
| 6,751,653 B2 * | 6/2004 | Austin | 709/217 |
| 6,763,515 B1 * | 7/2004 | Vazquez et al. | 717/109 |
| 6,802,053 B1 * | 10/2004 | Dye et al. | 717/113 |
| 6,904,577 B2 * | 6/2005 | Schubert et al. | 716/4 |
| 6,934,667 B2 * | 8/2005 | Kodosky et al. | 703/2 |
| 6,934,668 B2 * | 8/2005 | Kodosky et al. | 703/2 |
| 6,941,543 B1 * | 9/2005 | Brown et al. | 717/107 |
| 2001/0020291 A1 * | 9/2001 | Kudukoli et al. | 717/1 |
| 2001/0024211 A1 * | 9/2001 | Kudukoli et al. | 345/763 |
| 2001/0035879 A1 * | 11/2001 | Washington et al. | 345/763 |
| 2002/0055947 A1 * | 5/2002 | Schultz et al. | 707/500 |
| 2005/0091602 A1 * | 4/2005 | Ramamoorthy et al. | 715/763 |
| 2005/0143968 A9 * | 6/2005 | Odom et al. | 703/21 |

OTHER PUBLICATIONS

National Instruments, LabVIEW Code Interface Reference Manual, Jan. 1998, 1-143.*

National Instruments, LabVIEW QuickStart Guide, Feb. 1999.*

Rafael Kelly and Angel Coello, Analysis and Experimentation of Transpose Jacobian-based Cartesian Regularors, 1999, Cambridge University Press, Robotica vol. 17, pp. 303-312.*

European Patent Application 0510514 Yoshiharu Oka.*

Smart Camera Based on FPGA Technology, 11 pages, printed from Internet Website www.gel.ulaval.ca/vision/vlsi/camera on Dec. 28, 2001.

IMAQ Vision Builder Tutorial, National Instruments Corporation, Jan. 1999 Edition.

IMAQ Vision for G Reference Manual, National Instruments Corporation, Jun. 1999 Edition.

Optilab Image Processing and Analysis Software for the Apple Macintosh™ II, User's Manual, dated 1990.

MacUser, John Rizzo, Image Analyst and Enhance, Jul. 1990, pp. 55-58.

SPIE—The International Society for Optical Engineering, Steven Rosenthal and Larry Stahlberg, "Integrated Approach to Machine Vision Application Development", vol. 1386, Nov. 8, 1990, pp. 158-162.

Automatix News Release, www.applefritter.com/macclones/automatix/newsrelease, Vision for Process Feedback and Control, Jul. 3, 2000, pp. 1-3.

IPLab, Serious Image Processing for the Macintosh II, 1990.

SPIE—The International Society for Optical Engineering, Michael S. Mort and Robert J. Fontana, "Low Cost Image Analysis Workstation Which is Menu Driven and Extensible," vol. 1232, Feb. 4, 1990, pp. 380-389.

IPLab™, User's Guide, Signal Analytics Corporation, 1991.

MacGuide Magazine, vol. 2, Issue 4, Stuart Gitlow, M.D., "X-Ray Vision," Jun. 1989, pp. 89-94.

Ric Ford, Optimage Processes Scientific Images, 1994.

Signal Analytics Corp., News Release, "Signal Analytics Brings Powerful Scientific Image Processing to the Macintosh II", Feb. 1, 1990 (2 pgs.).

IPLab, "Serious Scientific Image Processing for the Macintosh II", 1992 (4 pgs.).

IPLab, "Gives You Unparalleled Value", 1992, (6 pgs.).

Signal Analytics Corp., "IPLab Brings Affordable Scientific Image Processing to the Macintosh II", estimated 1990 (2 pgs.).

Automatix Inc., "A Seminar on Machine Vision & Image Analysis", 1993, (46 pgs.).

National Instruments, Measurement and Automation Catalogue, Interactive Vision Software, 1999, pp. 518-520.

MacUser, "Ultimage and IPLab Spectrum", Jul. 1991, (5 pgs.).

Neil Kleinman, "The Macintosh as a Scientific/Industrial Image Processing Platform," Advanced Imaging, Special Report: Imaging and the Macintosh/Robust Image Databases, Apr. 1991, pp. 18-31.

Niel Hunt; "IDF: A graphical dataflow programming language for image processing and computer vision"; IEEE International Conference on Systems, Man and Cybernetics; Nov. 1990; pp. 351-360.

W.A. Keddy and P. Agathoklis; "DEDIP: A User-friendly environment for digital image processing algorithm development"; IEEE Pacific Rim Conference on Communications, Computers and Signal Processing; May 1991, pp. 733-736.

Konstantinos Konstantinides and John R. Rasure; "The Khoros Software Development Environment for Image and Signal Processing", IEEE Transactions on Image Processing; May 1994; pp. 243-252; vol. 3, No. 3.

Young-Seok Sim, Chae-Seong Lim, Young-Shik Moon and Sung-Han Park; "Design and Implementation of the Visual Programming Environment for the Distributed Image Processing," International Conference on Image Processing; Sep. 1996; pp. 149-152.

"SILMA Products—Production PILOT"; May 24, 2001; 4 pages; Retrieved from the Internet: "www.adept.com/Silma/products/pd-productionpilot.html".

"RoboWorks" Mar. 2002; 3 pages; Retrieved from Internet: www.newtonium.com/public_html/Products/RoboWorks/RoboWorks.htm.

"The Measurement and Automation Catalog 2002" National Instruments Corporation; 2002; pp. 97 and 580-594.

"Motion Architect User Guide"; Compumotor; Aug. 1994; 23 pages.

"Software Solutions"; GE Fanuc Automation; 2002; 8 pages.

"CIMPLICITY Machine Edition—Motion Developer"; GE Industrial Systems; Dec. 6, 2001; 4 pages.

"CIMPLICITY Machine Edition"; GE Fanuc Automation; 2000; 4 pages.

"Motion Builder: Making Motion Control Programming Easy"; Servo Catalogue; pp. 86-87.

* cited by examiner

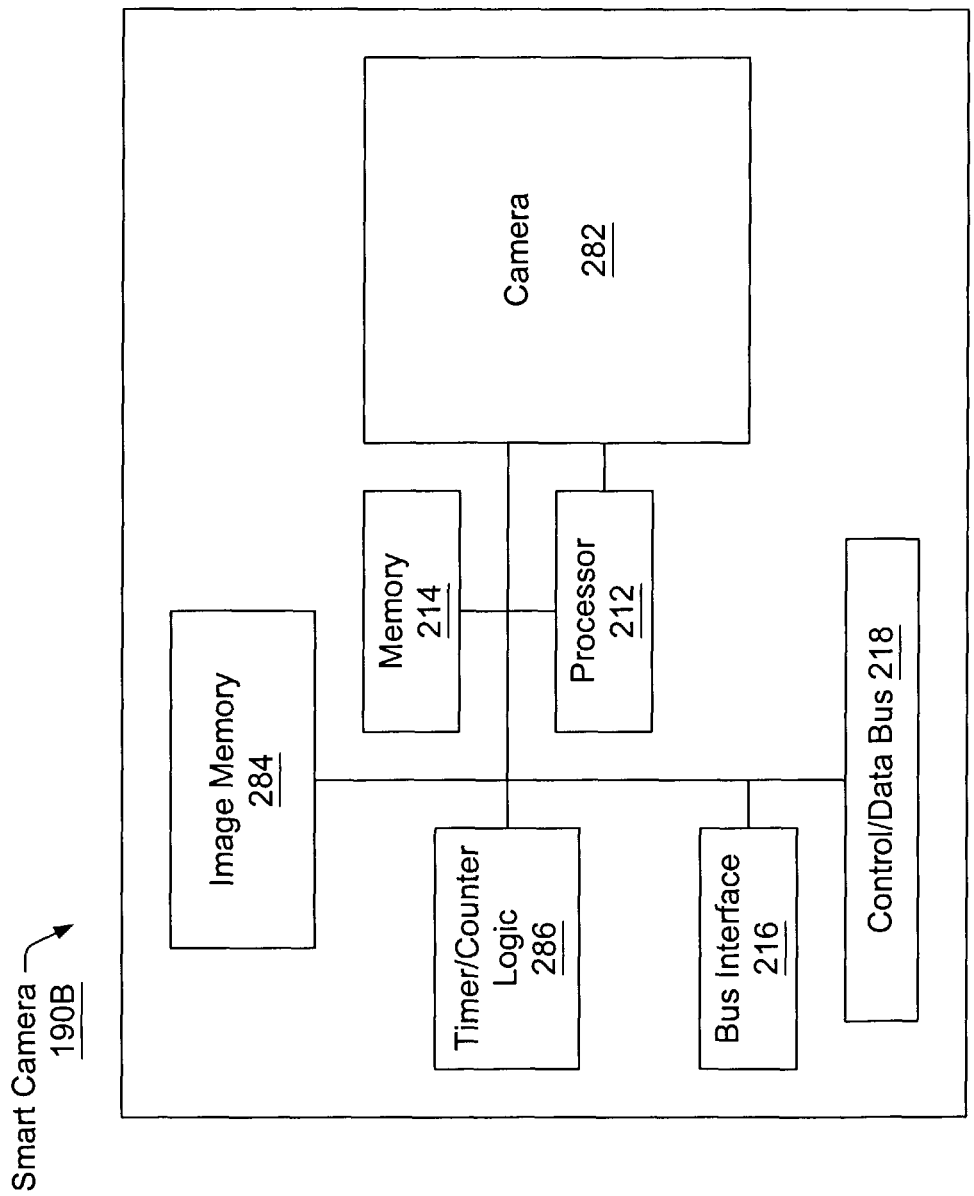

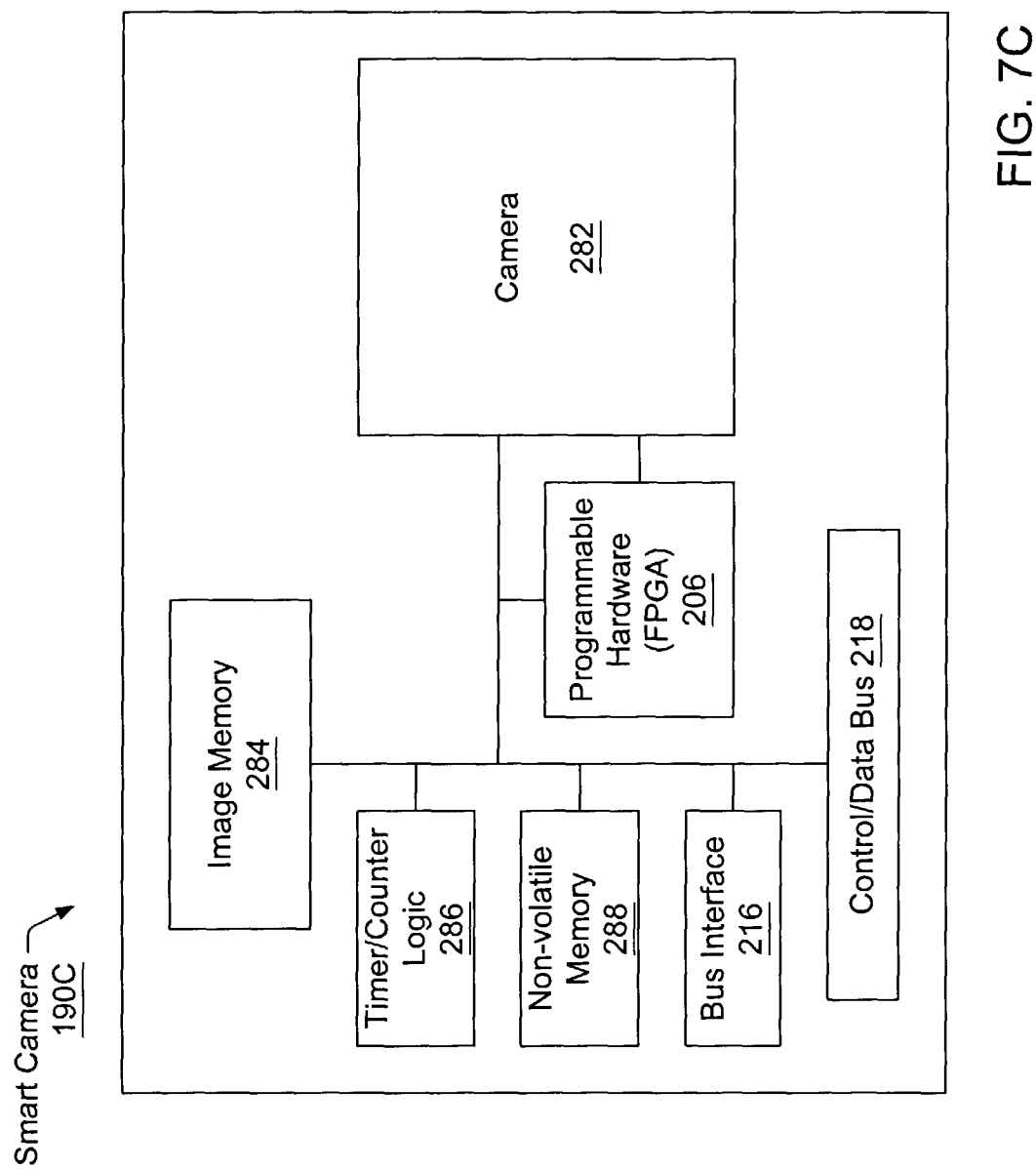

Image after Processing

Original Image (Metal3.jpg)

US 8,640,027 B2

SYSTEM AND METHOD FOR CONFIGURING A HARDWARE DEVICE TO EXECUTE A PROTOTYPE

CONTINUATION DATA

This application is a continuation-in-part of U.S. patent application Ser. No. 09/595,003 titled "System and Method for Automatically Generating a Graphical Program to Implement a Prototype," filed Jun. 13, 2000 now U.S. Pat. No. 7,937,665, whose inventors were Nicolas Vazquez, Jeffrey L. Kodosky, Ram Kudukoli, Kevin L. Schultz, Dinesh Nair, and Christophe Caltagirone.

This application is also a continuation-in-part of U.S. patent application Ser. No. 09/949,783 titled "System and Method for Deploying a Graphical Program on an Image Acquisition Device", filed Sep. 10, 2001 now U.S. Pat. No. 6,971,066, Kevin L. Schultz, Jeffrey L. Kodosky, Hugo Andrade, Brian Keith Odom and Cary Paul Butler.

FIELD OF THE INVENTION

The present invention relates to a system and method for configuring a hardware device to execute a prototype. The hardware device may include a programmable hardware element and/or a processor and memory. The prototype may comprise a software entity operable to perform a plurality of executable operations, wherein the prototype is created by a user without requiring user programming.

DESCRIPTION OF THE RELATED ART

The continually improving price and performance of today's computers make computer-based measurement and automation systems more accessible to users who were previously limited by inflexible, costly measurement and automation methods. By employing computer-based measurement and automation systems, users can lower capital costs, system development costs, and system maintenance costs, while at the same time improving the time to market and quality of their products. Virtual instrumentation has been an industry paradigm shift. Through the power of computer-based tools, scientists and engineers can build their own solutions exactly suited to their needs rather than being confined to a limited, inflexible, and expensive selection of fixed-function, traditional instruments.

Today, many hardware devices include at least one functional unit, such as a processor and memory, or a programmable hardware element, which enables the device to be programmed with or execute program instructions, e.g., to control the device. For example, a "smart camera" may include a functional unit operable to execute program instructions to acquire and analyze an image, e.g., to check for visual defects present in a manufactured object. Inasmuch as a primary goal of virtual instrumentation is to provide the user the maximum amount of flexibility to create his/her own applications and/or define his/her own instrument functionality, it is desirable to extend the level at which the user is able to program a device, e.g., extend the level at which a user of instrumentation or industrial automation hardware is able to program an instrument. The evolution of the levels at which the user has been able to program an instrument is essentially as follows.

1. User level software (LABVIEW™, LABWINDOWS CVI™, VISUALBASIC™, etc.)
2. Kernel level software
3. Auxiliary kernel level software (a second kernel running along side the main OS, e.g., InTime, VentureCom, etc.)
4. Embedded kernel level software
5. Hardware level software (FPGA)

In general, going down the above list, the user is able to create software applications which provide a more deterministic real-time response. Currently, some programming development tools for instrumentation or industrial automation provide an interface at level 1 above. In general, most users are unable and/or not allowed to program at the kernel level or auxiliary kernel level. It would be highly desirable to provide the user with the ability to develop user level software which operates at the embedded kernel level and/or the hardware level.

A type of software application referred to herein as a "prototyping environment" is becoming increasingly popular. In general, a prototyping environment may refer to a specialized application that provides an environment that is conducive to rapidly and conveniently prototyping a problem solution, i.e., a prototype. As used herein, a "prototype" may comprise a software entity operable to perform a plurality of executable operations, wherein the prototype is created by a user without requiring user programming. For example, the user may create the prototype by interacting at a high level with a graphical user interface of the prototyping environment. One example of a prototyping environment is an image processing prototyping environment that enables a user to easily develop a script or sequence, i.e., a prototype, including various operations that are applied to images, e.g., for use in a machine vision, pattern matching, shape matching, or other imaging application. The prototyping environment may enable the user to create the prototype without requiring the user to write code in a programming language or minimizing the amount of code the user would otherwise have to write. Thus, a prototyping environment may enable a user to develop a solution for a problem by working at a higher level of abstraction than a programming environment provides.

It would be desirable to provide the user with the ability to develop a prototype using a prototyping environment, which can then be readily deployed onto a hardware device. This would provide the user with the dual benefits of being able to program device functionality at the highest level possible (e.g., prototypes), while also providing the ability to have program instructions execute directly on an embedded processor or in hardware for increased speed and efficiency.

SUMMARY OF THE INVENTION

One embodiment of the invention comprises a system and method for configuring a hardware device to execute a prototype. The hardware device may include a programmable hardware element and/or a processor and memory. The prototype may comprise a software entity operable to perform or specify a plurality of executable operations, wherein the prototype is created by a user without requiring user programming. The prototype may be created using a prototyping environment application. For example, the prototyping environment may provide a library of operations that are specific to a particular problem domain and may enable the user to select various operations from the library for inclusion in the prototype. The prototyping environment may include a graphical user interface that is streamlined for interactively experimenting with various parameters or properties associated with the selected operations and seeing the effects of adjusting the parameters.

The prototyping environment may be used to generate a sequence, solution, or script, also called a prototype, which represents an algorithm or process designed by the user in the prototyping environment. For example, the prototype may include a plurality of operations for implementing or specifying a solution for a motion control application, a data acquisition and control application, a test and measurement application, an image processing or machine vision application, a process control application, a man-machine interface application, a simulation application, a hardware-in-the-loop validation application, or any of various other types of applications.

After the prototype has been created, the prototype may be deployed on the hardware device. The hardware device may be coupled to the computer system to facilitate the deployment of the prototype. In one embodiment, the hardware device may be comprised in the computer system. In other embodiments the hardware device may be coupled to the computer system through a network, such as the Internet, or may be coupled to the computer system through wireless means.

Deploying the prototype on the hardware device may comprise configuring the hardware device to perform at least a portion of the operations in the prototype. In one embodiment, a program based on the prototype may be programmatically generated, and deploying the prototype may comprise storing this program or a user-modified version of the program on (at least part of) a "functional unit" of the hardware device, or configuring the functional unit with all or part of the program, such that after the deployment, the functional unit is operable to execute or implement the functionality of the program.

As used herein, the term "functional unit" may include a processor and memory or a programmable hardware element. The term "functional unit" may include one or more processors and memories and/or one or more programmable hardware elements. As used herein, the term "processor" is intended to include any of various types of processors, CPUs, microcontrollers, or other devices capable of executing software instructions. As used herein, the term "programmable hardware element" is intended to include various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware.

In various embodiments, any of various methods or techniques may be used in deploying the prototype on the functional unit of the hardware device. In the preferred embodiments, the process of deploying the prototype is fully or mostly automatic so that once the prototype is created, little or no work is required on the user's part to deploy the prototype on the hardware device. For example, the prototyping environment may include functionality for programmatically converting the prototype to a format usable to configure the device and for configuring the device according to this format, or the prototyping environment may interface with one or more other applications to perform the converting and configuring. The user may not be required to provide user input, or may be required to provide a minimal amount of user input. In one embodiment, a graphical user interface wizard, i.e., one or more graphical panels or dialog boxes may be displayed to guide the user through the process of deploying the prototype on the device.

After the hardware device has been configured, the hardware device may execute to perform the functionality specified by the prototype. The hardware device performing the functionality specified by the prototype may comprise the functional unit on the hardware device executing at least a portion of the operations in the prototype, i.e., executing program instructions and data implementing the operations.

As described above, in one embodiment, deploying a prototype on a hardware device may comprise programmatically generating a program based on the prototype, and then deploying the generated program on the hardware device. In one embodiment, the program that is programmatically generated based on the prototype may be a graphical program. The generated graphical program may include various interconnected nodes or icons which visually represent the operations in the prototype and which are executable to perform the operations as configured by the user. In various embodiments, this programmatic generation may be performed in any of various ways. In one embodiment, the prototyping environment application may include functionality for both creating the prototype and generating the graphical program. In another embodiment, the prototyping environment application may interface with another program, e.g., a graphical programming development environment application, to request the graphical program to be generated, e.g., according to a client/server methodology. The graphical program may be programmatically generated with little or no user input received during the generation process.

The user may optionally modify the graphical program that was programmatically generated, e.g., to develop a customized or optimized graphical program. For example, the user may desire to add functionality to the graphical program which was not included in the prototype from which the graphical program was generated. For example, by directly modifying the graphical source code of the program, the user may be able to customize the graphical program to perform operations not available from within the prototyping environment. The user may utilize a graphical programming development environment separate from the prototyping environment to interactively modify the generated program.

The generated graphical program or the user-modified version of the graphical program may then be deployed on the hardware device to configure the device to perform the function implemented by the graphical program, and thus to perform the function specified by the prototype on which the graphical program is based.

In various embodiments, the process of converting the prototype to a graphical program and then configuring the device according to the graphical program may vary in terms of the flow experienced by the user. For example, in one embodiment, the user may create a prototype in the prototyping environment and may then request the prototyping environment to deploy the prototype on a hardware device. For example, the user may invoke a dialog box or wizard to specify information regarding the deployment, such as a selected hardware device on which to deploy the prototype, selected operations of the prototype to deploy, etc.

After the user has filled in the information in the dialog box or wizard, a graphical program based on the prototype may be automatically generated, and the hardware device may then be configured to execute the graphical program. The prototyping environment may interact with one or more other applications in this process, such as a graphical programming development environment. For example, the prototyping environment may interface with the graphical programming development environment to generate the graphical program and may then request the graphical programming development environment to configure the selected hardware device according to the graphical program. However, this may appear to the user as a seamless process, and the user may never know that the graphical programming development environment was involved and may not even know that a graphical program was ever generated.

In another embodiment, the entire process of moving from the prototype to the configured hardware device may be less integrated, i.e., more knowledge of and control over the process may be provided to the user. For example, the prototyping environment may generate the graphical program, and the user may then open the graphical program in a graphical programming development environment and request the graphical programming development environment to deploy the generated graphical program on a selected hardware device. Also, as described above, the user may first modify the generated graphical program before requesting the graphical program to be deployed on the device.

In another embodiment, instead of a graphical program, a text-based program based on the prototype may be automatically generated. The text-based program may include program code in any of various text-based programming languages, such as C, C++, VISUAL C++™, VISUAL BASIC™, JAVA™, PASCAL™, etc. The generated text-based program may include various functions or methods which are executable to perform the operations configured by the user in the prototype. The text-based program may then be used in configuring the hardware device, similarly as described above.

In one embodiment, the hardware device may include a processor and a memory, and deploying the graphical program on the hardware device may include transferring the graphical program to the memory on the hardware device, where the processor in the hardware device executes the graphical program from the memory. In one embodiment, deploying the graphical program on the hardware device may include generating an executable program, such as a machine language program, based on the graphical program, which implements at least a portion of the functionality of the graphical program; and transferring the executable program to the memory on the hardware device. In one embodiment, compiling the graphical program into an executable program may comprise converting the graphical program first into a text-language program, and then compiling the text-language program into the executable program. The processor in the hardware device may execute the executable program from the memory.

In one embodiment, the hardware device may include a programmable hardware element, and deploying the graphical program on the hardware device may include generating a hardware description based on the graphical program, which describes a hardware implementation of the graphical program, and configuring the programmable hardware element in the hardware device utilizing the hardware description. After being configured with the hardware description the programmable hardware element may implement a hardware implementation of the graphical program. The programmable hardware element in the hardware device may execute to perform the operations specified in the prototype.

In one embodiment, the hardware device may include a processor and a memory and a programmable hardware element. In this embodiment, deploying the graphical program on the hardware device may include transferring a first portion of the graphical program to the memory on the hardware device; generating a hardware description based on a second portion of the graphical program, which describes a hardware implementation of the graphical program; and configuring the programmable hardware element in the hardware device utilizing the hardware description. After being configured, the programmable hardware element may implement a hardware implementation of the second portion of the graphical program. The processor in the hardware device may execute the first portion of the graphical program from the memory and the programmable hardware element may execute the second portion of the graphical program.

In one embodiment, deploying the graphical program on the hardware device may include generating an executable program based on a first portion of the graphical program, and which implements functionality of the graphical program; transferring the executable program to the memory on the hardware device; generating a hardware description based on a second portion of the graphical program, where the hardware description describes a hardware implementation of the graphical program; and configuring the programmable hardware element in the hardware device utilizing the hardware description, where after being configured, the programmable hardware element implements a hardware implementation of the second portion of the graphical program. The processor in the hardware device may execute the executable program from the memory and the programmable hardware element may execute the second portion of the graphical program.

In one embodiment, the hardware device may include a first processor, a second processor, and at least one memory, and the first processor in the hardware device may execute a first portion of the graphical program from the at least one memory and the second processor in the hardware device may execute a second portion of the graphical program from the at least one memory. For example, the first portion of the graphical program may implement a first portion of the operations specified in the prototype, and the second portion of the graphical program may implement a second portion of the operations specified in the prototype.

In one embodiment, in addition to configuring the hardware device to execute the prototype (or execute a program based on the prototype), the hardware device may also be configured according to another program, such as a user-created program.

BRIEF DESCRIPTION OF THE DRAWINGS

A better understanding of the present invention can be obtained when the following detailed description of the preferred embodiment is considered in conjunction with the following drawings, in which:

FIGS. 7A-7C illustrate exemplary embodiments of a smart camera with programmable hardware that may be configured to execute a prototype;

Figure 1:
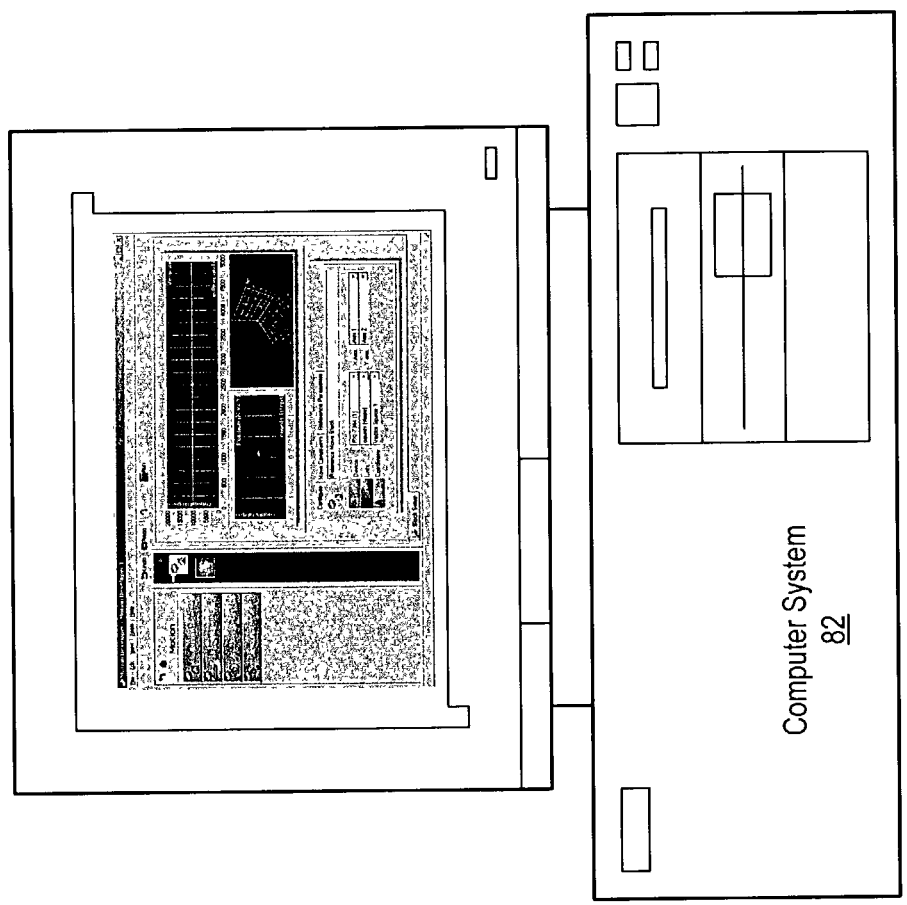
FIG. 1 illustrates a computer system that may execute a prototyping environment application for developing prototype.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. Pat. No. 6,064,812 titled "System and Method for Developing Automation Clients Using a Graphical Data Flow Program," issued on May 16, 2000.

U.S. Pat. No. 6,102,965 titled "System and Method for Providing Client/Server Access to Graphical Programs," issued on Aug. 15, 2000.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/499,503 titled "System and Method for Configuring a Programmable Hardware Instrument to Perform Measurement Functions Utilizing Estimation of the Hardware Implementation and Management of Hardware Resources" filed Feb. 7, 2000.

U.S. patent application Ser. No. 09/617,600 titled "Graphical Programming System with Distributed Block Diagram Execution and Front Panel Display," filed Jun. 13, 2000.

U.S. patent application Ser. No. 09/518,492 titled "System and Method for Programmatically Creating a Graphical Program," filed Mar. 3, 2000.

U.S. patent application Ser. No. 09/595,003 titled "System and Method for Automatically Generating a Graphical. Program to Implement a Prototype," filed Jun. 13, 2000.

U.S. patent application Ser. No. 09/745,023 titled "System and Method for Programmatically Generating a Graphical Program in Response to Program Information," filed Dec. 20, 2000.

U.S. patent application Ser. No. 09/949,783 titled "System and Method for Deploying a Graphical Program on an Image Acquisition Device," filed Sep. 10, 2001.

FIG. 1—Computer System Executing a Prototyping Environment Application

Knowledge of computer-implemented techniques for solving problems in a wide array of fields is expanding at a rapid pace. As new techniques and computerized methods are developed for a given problem domain, specialized software applications for developing solutions to problems in that domain are often created. These specialized applications can provide an environment that is conducive to rapidly and conveniently prototyping a problem solution. Hence, these applications are also referred to herein as "prototyping environments".

FIG. 1 illustrates a computer system 82. The computer system 82 may execute a prototyping environment application for creating a prototype. A prototyping environment may integrate various capabilities to aid a user in developing problem solutions, depending on the particular problem domain. For example, a prototyping environment may provide a library of operations that are specific to a problem domain and may enable the user to select various operations from the library for inclusion in the prototype. The prototyping environment may include a graphical user interface that is streamlined for interactively experimenting with various parameters or properties associated with the selected operations and seeing the effects of adjusting the parameters. A prototyping environment may also include capabilities for simulating real-world objects or processes. A prototyping environment may be used to generate a sequence, solution, or script, also called a prototype, which represents an algorithm or process designed by the user in the prototyping environment.

Prototyping environments are usually designed for ease of use and may be specialized for developing solutions for a particular problem domain. They may enable users to create a computer-implemented solution to a problem without requiring the users to utilize or understand traditional programming techniques. For example, the prototyping environment may aid the user in creating a sequence, solution, or script (called a prototype) including a plurality of operations, without requiring the user to write programming language code. Instead of writing code, the user may interact at a higher level with the graphical user interface of the prototyping environment to create the prototype.

Prototyping environments may be developed for many different problem domains. Various exemplary prototyping environments are described herein. One example is a motion control prototyping environment application for developing a sequence of motion control operations. A motion control sequence is also referred to herein as a "prototype".

Computer-based motion control involves precisely controlling the movement of a device or system. Computer-based motion control is widely used in many different types of applications, including applications in the fields of industrial automation, process control, test and measurement automation, robotics, and integrated machine vision, among others. A typical computer-based motion system includes components such as the moving mechanical device(s), a motor with feedback and motion I/O, a motor drive unit, a motion controller, and software to interact with the motion controller.

A motion control prototyping environment may be designed to enable a user to easily and efficiently develop/prototype a motion control sequence without requiring the user to perform programming, e.g., without needing to write or construct code in any programming language. For example, the environment may provide a graphical user interface (GUI) enabling the user to develop/prototype the motion control sequence at a high level, by selecting from and configuring a sequence of motion control operations using the GUI.

The motion control prototyping environment may also enable the user to preview various aspects of the motion control performed by a sequence, e.g., velocity profile, acceleration profile, position plots, etc., in advance before commanding the motor to perform the sequence of moves. The environment may also enable simulation of the motion control sequence, thus enabling users to perform offline development and prototyping.

After configuring and previewing the motion control sequence, the user may request the motion control prototyping environment to perform the motion control sequence. Performing the motion control sequence may comprise interfacing with one or more motors (or motion controllers) coupled to the computer system to command the motor (or motion controller) to perform the sequence of motion control operations configured by the user. According to one embodiment, the user may also request the motion control sequence or prototype to be deployed for execution on a hardware device, such as a motion control device, as described below.

Another example of a prototyping environment described herein is an image processing prototyping environment. The term "image processing" is used herein to refer to image processing, image analysis, and machine vision, among others. An image processing prototyping environment may enable a user to rapidly develop an image processing algorithm or application, e.g., for machine vision, pattern matching, shape matching, or other applications. For example, the image processing prototyping environment may include a graphical user interface enabling the user to easily apply various image processing functions to an image and immediately see the results, in order to develop the desired algorithm. In various embodiments, any of various types of image processing functions may be supported, including filtering functions, morphology functions, histogram functions, particle analysis functions, edge detection functions, etc. As the user applies each image processing function to an image, the function may be recorded as a step in a script (also called a prototype). A script may essentially specify an algorithm; i.e., an algorithm may be defined by the plurality of steps or operations in a script. The user may create the script without specifying or writing programming language code, similarly as described above. According to one embodiment, the user may request an image processing script or prototype to be deployed for execution on a hardware device, such as an image acquisition device, as described below.

In various embodiments, the computer system 82 may execute a prototyping environment application for developing prototypes for any of various other types of applications, in addition to motion control and/or image processing. In general, a "prototyping environment" may refer to a specialized application that provides an environment that is conducive to rapidly and conveniently prototyping a problem solution, preferably without requiring the user to write code in a programming language or minimizing the amount of code the user would otherwise have to write. Other examples of prototyping environments include:

an instrumentation environment for interacting with hardware instruments, e.g., in order to initialize an instrument, acquire data from the instrument, analyze the acquired data, etc.

a circuit design environment for developing and testing circuit designs a sound processing environment for applying various audio operations to a sound clip, e.g., in order to analyze the sound clip, eliminate background noise, etc.

Various embodiments of the present invention may enable any of various types of prototypes to be deployed for execution on any of various types of hardware devices.

It is noted that a prototyping environment may also enable a user to develop a prototype which includes operations related to multiple different fields or technologies. For example, one embodiment of a prototyping environment may provide a library of operations including one or more image processing operations, one or more motion control operations, and one or more data acquisition (DAQ) operations. In this example, the motion control prototyping environment may be referred to as a MC/MV/DAQ prototyping environment. (The abbreviation "MC/MV/DAQ" is used herein to refer to "motion control/machine vision/DAQ".) For example, a MC/MV/DAQ prototyping environment may be used to create a prototype including image processing (machine vision) operations for acquiring and analyzing images of an object, motion control operations for moving the object, and DAQ operations for acquiring measurement data of the object. Such a prototype may be useful, for example, in an automated inspection process performed on manufactured objects. Similarly as described above, the prototype may be deployed for execution on a hardware device. The prototype may also be deployed on multiple hardware devices. For example, the image processing (machine vision) functions included in the prototype may be deployed on an image acquisition device, the motion control functions may be deployed on a motion control device, and the DAQ functions may be deployed on a DAQ device.

In various embodiments, a prototype may be deployed on a hardware device using any of various methods. In one embodiment, the prototyping environment application may be operable to automatically, i.e., programmatically, generate program code implementing the prototype. For example, the prototyping environment may generate a standalone program, such as a graphical program or a text-based program, that implements the functionality of the prototype. For example, when executed, the generated program code may have the same functionality as when the prototype is executed under control of the prototyping environment. This generated program code may then be used in configuring the hardware device. In one embodiment, the program code may be generated as an intermediate step in configuring the hardware device, and the user may not even be aware of the generated program. In another embodiment, the user may first modify the generated program code, e.g., to develop a customized or optimized program, and may then request the modified program to be deployed on the hardware device.

As described below, in one embodiment a graphical program may first be generated based on a prototype. The graphical program (or a user-modified version of the graphical program) may then be deployed by either one or more of: 1) converting the graphical program (or a portion thereof) into a hardware implementation and configuring a programmable hardware element in the hardware device with this hardware implementation, 2) transferring the graphical program (or a portion thereof) to a memory of a functional unit of the hardware device for execution by a processor (wherein the processor may execute a graphical program execution engine and optionally a real time operating system), or 3) compiling the graphical program (or a portion thereof) into an executable program and transferring the executable program to a memory of a functional unit of the hardware device for execution by a processor (wherein the processor may optionally execute a real time operating system).

Referring again to FIG. 1, the computer system 82 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium.

The computer system 82 may include a memory medium(s) on which one or more computer programs or software components may be stored according to one embodiment of the present invention. For example, the memory medium may store a prototyping environment application (or portion of such an application) such as described above. The memory medium may also store one or more prototypes, sequences, or scripts created using the prototyping environment application. The memory medium may also store one or more programs, including graphical programs and/or text-based programs, automatically generated by the prototyping environment application based on a prototype. The memory medium may also store an application development environment with which a generated program is associated. In one embodiment, the application development environment may include functionality facilitating the deployment of a program generated based on a prototype on a hardware device. In another embodiment, the prototyping environment application may include all necessary functionality for deploying the prototype on the hardware device. The memory medium may also store operating system software, as well as other software for operation of the computer system 82.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

In the present application, the term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A graphical program may also comprise a graphical user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface or front panel of a graphical program may enable the user to interactively control or manipulate the input being provided to the graphical program.

Examples of graphical programming development environments include LABVIEW™, DASYLAB™, and DIADEM™ from National Instruments, VEE™ from Agilent, WIT™ from Coreco, VISION PROGRAM MANAGER™ from PPT Vision, SOFTWIRE™ from Measurement Computing, SIMULINK™ from the MathWorks, SANSCRIPT™ from Northwoods Software, KHOROS™ from Khoral Research, SNAPMASTER™ from HEM Data, VISSIM™ from Visual Solutions, OBJECTBENCH™ by SES (Scientific and Engineering Software), and VISIDAQ™ from Advantech, among others.

Figure 2:
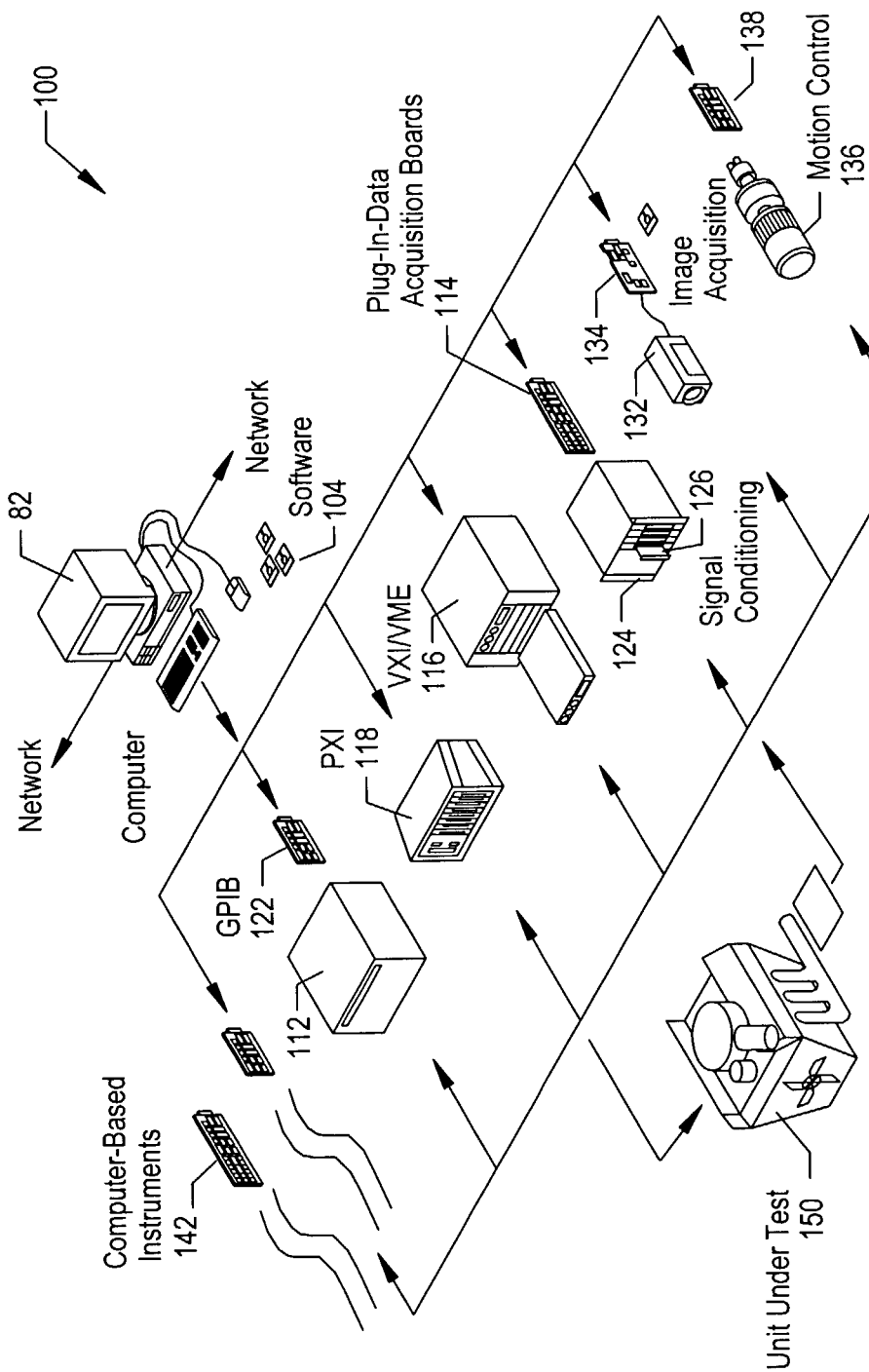
FIG. 2 illustrates an exemplary instrumentation system that may implement embodiments of the invention.

FIG. 2—Instrumentation System

FIG. 2 illustrates an exemplary instrumentation system 100. The system 100 may include a host computer 82 that comprises a CPU, a display screen, memory, and one or more input devices such as a mouse or keyboard. As shown, the host computer 82 may connect to one or more instruments.

For example, the host computer 82 may interface with a motion control device 136 via an associated motion control interface card 138. The host computer 82 may also interface with an image acquisition device 132 via an associated image acquisition (or machine vision) card 134. The host computer 82 may also be coupled to a data acquisition (DAQ) board 114. The DAQ board 114 may interface through signal conditioning circuitry 124 to a unit under test (UUT) 150. In one embodiment, the signal conditioning circuitry 124 may comprise an SCXI (Signal Conditioning eXtensions for Instrumentation) chassis comprising one or more SCXI modules 126.

The instrumentation control system 100 may include other types of instruments as well, such as a GPIB instrument 112 and associated GPIB interface card 122, a VXI instrument 116, a PXI instrument 118, and/or one or more computer based instrument cards 142, among other types of devices. The GPIB instrument 112 may be coupled to the computer 82 via the GPIB interface card 122 provided by the computer 82.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or Micro-Channel bus slot provided by the computer 82. However, these cards 122, 134, 138 and 114 are shown external to computer 82 for illustrative purposes. These devices may also be connected to the computer 82 through a serial bus or through other means.

The VXI chassis or instrument 116 may be coupled to the computer 82 via a VXI bus, MXI bus, or other serial or parallel bus provided by the computer 82. The computer 82 may include VXI interface logic, such as a VXI, MXI or GPIB interface card (not shown), which interfaces to the VXI chassis 116. The PXI chassis or instrument may be coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82.

In typical instrumentation systems, an instrument will not be present of each interface type, and in fact many systems may only have one or more instruments of a single interface type, such as only GPIB instruments. As used herein, the term "instrument" is intended to include any of the devices that are adapted to be connected to a computer system as shown in FIG. 2, traditional "stand-alone" instruments, as well as other types of measurement and control devices. The term "measurement function" may include any type of data acquisition, measurement or control function, such as that implemented by the instruments shown in FIG. 2. For example, the term "measurement function" includes acquisition and/or processing of an image. In the embodiment of FIG. 2, one or more of the various instruments may couple to the computer 82 over a network, such as the Internet.

In one embodiment, the computer 82 may be operable to execute program instructions to deploy a prototype or portion of a prototype on one or more of the hardware devices or instruments shown in FIG. 2. The prototype may have been created and stored using a prototyping environment application such as described above. The prototyping environment application may execute on the computer 82 or on another computer. The prototype may be operable for example, to analyze, measure, or control the unit under test (UUT) or process 150.

As one example, an image processing prototyping environment may be utilized to create an image processing or machine vision prototype or sequence. The image processing prototype may then be deployed on the image acquisition device 132 and/or the associated image acquisition card 134. For example, the prototype may include one or more image processing operations for acquiring images of the UUT 150 and/or analyzing such images. By deploying the prototype on the hardware, the image processing may be performed directly in hardware for increased speed and efficiency.

As another example, a motion control prototyping environment may be utilized to create a motion control prototype or sequence. The motion control prototype may then be deployed on the motion control device 136 and/or the associated motion control interface card 138. For example, the prototype may include one or more motion control operations for controlling movement of the UUT 150, and the hardware may be configured to execute these operations onboard for increased speed and efficiency.

As another example, a MC/MV/DAQ environment may be utilized to create a prototype including motion control, machine vision (image processing), and/or DAQ functionality. The motion control operations of the prototype may be deployed on the motion control hardware as described above. The machine vision operations of the prototype may be deployed on the image acquisition hardware as described above. Similarly, the DAQ operations may be deployed on the DAQ board 114, e.g., to acquire measurement data from the UUT 150. In another embodiment, separate prototypes may be created, e.g., a separate motion control prototype, a separate machine vision prototype, and a separate DAQ prototype. These prototypes may then be deployed on the respective devices separately.

The system 100 may be used in any of various types of applications, such as a motion control application, a data acquisition and control application, a test and measurement application, an image processing or machine vision application, a process control application, a man-machine interface application, a simulation application, and/or a hardware-in-the-loop validation application. In one embodiment, the computer 82 may first deploy the prototype on one or more of the hardware devices, and the hardware devices may then execute independently to perform the application. For example, the computer 82 may not be involved at all in performing the application, e.g., may not be involved in analyzing, measuring, or controlling the unit under test (UUT) or process 150. In another embodiment, the computer 82 may still be involved even after deploying the prototype. For example, if motion control operations in the prototype have been deployed on the motion control hardware, the computer 82 may still control another device, e.g., may interface with the DAQ board 114 to perform DAQ operations in the prototype.

Hardware devices on which a prototype is deployed may include a "functional unit" operable to execute the prototype. As used herein, the term "functional unit" may include a processor and memory or a programmable hardware element. The term "functional unit" may include one or more processors and memories and/or one or more programmable hardware elements. As used herein, the term "processor" is intended to include any of various types of processors, CPUs, microcontrollers, or other devices capable of executing software instructions. As used herein, the term "programmable hardware element" is intended to include various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware.

As used herein, the term "image acquisition device" is intended to include any of various types of devices that are operable to acquire and/or store an image. An image acquisition device may also optionally be further operable to analyze or process the acquired or stored image. Examples of an image acquisition device include an image acquisition (or machine vision) card (also called a video capture board), a device external to a computer that operates similarly to an image acquisition card, a smart camera, a robot having machine vision, and other similar types of devices. In one embodiment, a single device may combine the functionality of the image acquisition device 132 and the associated image acquisition card 134 shown in FIG. 2.

As used herein, the terms "image processing" and "machine vision" are used interchangeably to refer to the processing of images to extract useful information from the image or determine characteristics of the image (or to determine characteristics of one or more objects displayed in the image). The term "image processing" is used herein to refer to both "image processing" and "machine vision", to the extent these terms have different meanings. The term "image processing function" includes tools such as edge detection, blob analysis, pattern matching, and other image processing functions. The term "image processing function" may also include an operation or decision that is performed in response to the information extracted or characteristics determined from the image. The term "image processing function" is also intended to include an image processing (or machine vision) algorithm that combines a sequence of two or more image processing functions or tools and/or decision operations that process an image in a desired way or which implement an image processing or machine vision application, such as part inspection, automated assembly, image analysis, pattern matching, edge detection, etc.

Figure 3A:
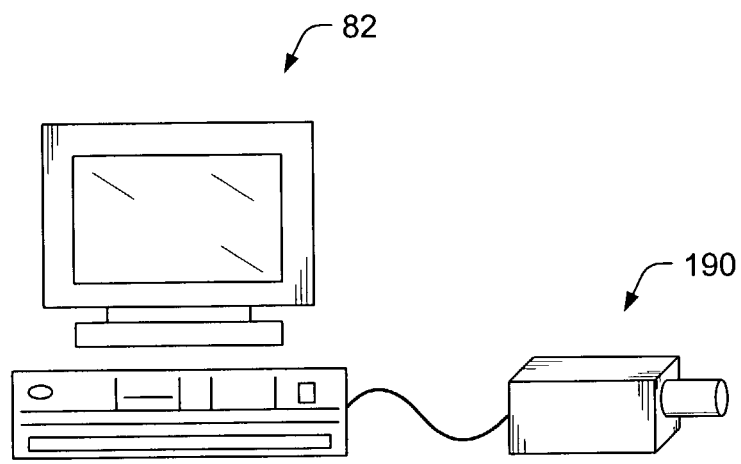
FIGS. 3A and 3B illustrate exemplary image acquisition systems including a smart camera that may be configured to execute a prototype.
Figure 3B:
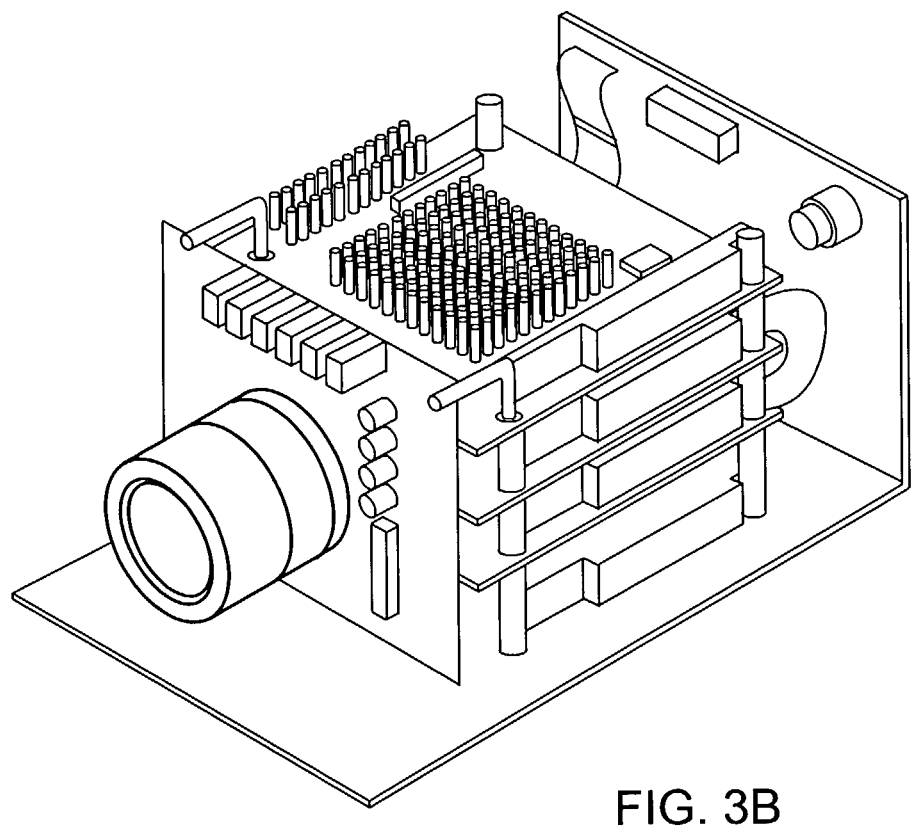

FIGS. 3A and 3B—Image Acquisition System Having a Smart Camera

As noted above, in one embodiment, an image processing or machine vision prototype may be deployed on an image acquisition device. As described below, such an image acquisition device may be referred to as a "smart camera". FIGS. 3A and 3B illustrate an image acquisition system with a smart camera. As FIGS. 3A and 3B illustrate, a smart camera may include a housing which encloses a portion or all of the smart camera components, or may be comprised on a frame which primarily provides structural support for the smart camera components.

FIG. 3A—Image Acquisition System With Smart Camera

FIG. 3A illustrates an image acquisition system comprising computer system 82 coupled to a smart camera 190. The smart camera is an example of an image acquisition device. As used herein, the term "smart camera" is intended to include any of various types of devices that include a camera or other image sensor and a functional unit capable of being configured to perform an image processing function to analyze or process an acquired image. For example, while traditional computer vision is based on a camera/computer system in which the image processing or understanding algorithm is embedded in the computer 82, the computational load of vision algorithms may be circumvented or mitigated by merging low level processing with the camera or sensor in a single module. For example, a hardware architecture may be defined in a Hardware Description Language (e.g., VHDL), simulated and synthesized into digital structures that can then be configured in a Field Programmable Gate Array (FPGA). In one application of a smart camera, the flexibility of an FPGA may be combined with a sensor for real time image processing. In another application of a smart camera, the flexibility of a processor and memory may be combined with a sensor for real time image processing. Examples of smart cameras include: NAVSYS Corporation's GI-EYE, which generates digital image data that are automatically tagged with geo-registration meta-data to indicate the precise position and attitude of the camera when the image was taken; Vision Components' GmbH Smart Machine Vision Cameras, which integrate a high-resolution Charge Coupled Device (CCD) sensor with a fast image-processing signal processor, and provide various interfaces to allow communication with the outside world; and Visual Inspection Systems' SMART cameras with on-board DSP capabilities, including frame grabbers and robot guidance systems, among others.

The computer system 82 shown in FIG. 3A may include a memory medium. The memory medium may store a prototyping environment application operable to create a prototype that implements an image processing function. The memory medium may also store one or more computer programs, e.g., the prototyping environment application and/or other programs, which are executable to convert at least a portion of the prototype into a form for configuring a functional unit comprised in the smart camera 190.

As mentioned above, the smart camera 190 may include a functional unit, which may be a programmable hardware element (programmable or reconfigurable hardware), e.g., an FPGA, and/or may be a processor and memory. The functional unit in the smart camera 190 may be configured with a prototype that implements an image processing function. The smart camera 190 may also comprise a camera coupled to the functional unit. The smart camera 190 may also include a memory (a memory medium) coupled to the camera that stores an acquired image. If the smart camera 190 includes an analog camera, the smart camera 190 may further include analog to digital (A/D) logic for converting analog image signals into a digital image for storage in the memory. The smart camera 190 may also optionally include timer/counter logic that may perform timing/counting operations, e.g., during operation of the functional unit. As FIG. 3A shows, in one embodiment, the smart camera may include a housing which encloses some or all of the components of the smart camera.

FIG. 3B—Smart Camera

FIG. 3B illustrates another embodiment of a smart camera 190. As FIG. 3B shows, the smart camera includes a camera, coupled to circuitry/logic (e.g., one or more circuit boards) for performing various image processing and/or acquisition functions. As mentioned above, the circuitry/logic may include a functional unit, such as a programmable hardware element, e.g., an FPGA and/or a processor and memory. As also described above, the functional unit in the smart camera 190 may be configured with a prototype that implements the image processing function, and may also include a memory coupled to the camera for storing an acquired image. If the camera is an analog camera, the smart camera 190 may further include analog to digital (A/D) logic for converting analog image signals into a digital image for storage in the memory. The smart camera 190 may also optionally include timer/counter logic that may perform timing/counting operations, e.g., during operation of the programmable hardware element. The smart camera 190 may also include various I/O ports for communicating with external devices, such as computer system 82. As FIG. 3B shows, in one embodiment, the smart camera may include a frame or structure to support the components comprised in the smart camera. In one embodiment, the smart camera may include a "PC-on-a-Card" which may provide part or all of the functionality of a personal computer.

Figure 4A:
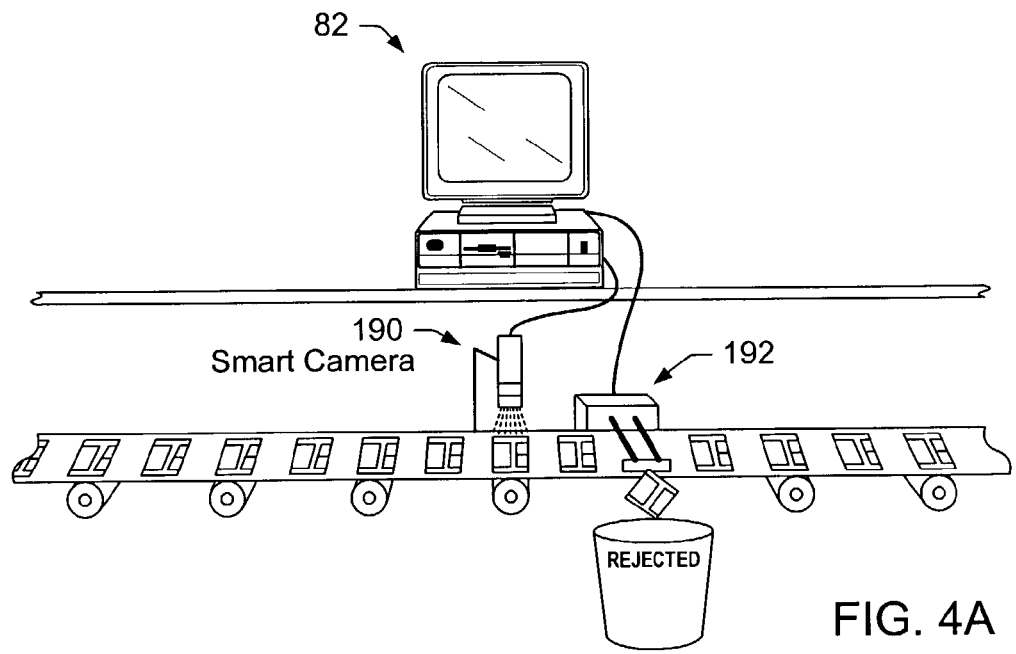
FIGS. 4A and 4B illustrate exemplary image processing or machine vision systems which utilize a smart camera configured to execute a prototype.
Figure 4B:
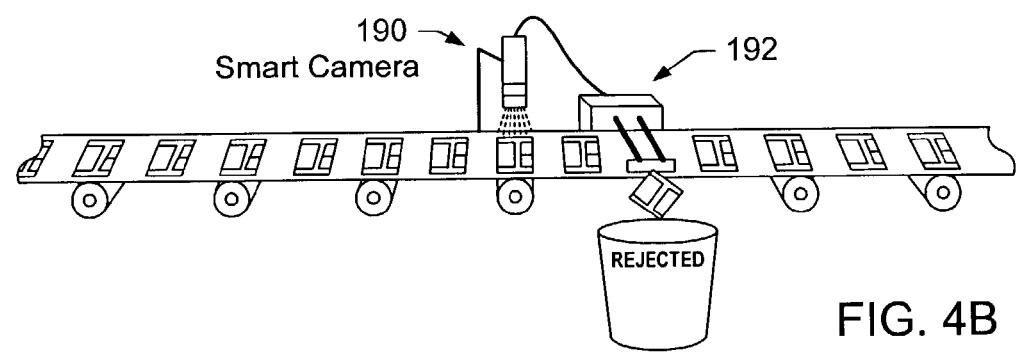

FIGS. 4A and 4B—Image Processing Systems

FIGS. 4A and 4B illustrate image processing or machine vision systems which utilize a smart camera configured to execute a prototype such as described above. The image processing system of FIG. 4A may comprise a computer 82 and a smart camera 190, and may further include a motion control device 192. The image processing system of FIG. 4B may comprise smart camera 190 and motion control device 192, and may not include computer system 82.

The smart camera 190 may include a digital camera that acquires a digital video signal which comprises an image, or a sequence of images, or other data desired to be acquired. In one embodiment, the smart camera 190 may instead include an analog camera that acquires an analog video signal, and the smart camera 190 may further include A/D converters for converting the analog video signal into a digital image.

The smart camera 190 may include a functional unit configured according to a prototype. For example, the functional unit may be configured to perform an image processing function as represented by a prototype. Thus a prototype may have been first created to perform the image processing function, such as with a prototyping environment on the computer system 82 (or another computer system), and the prototype may then have been deployed onto the functional unit of the smart camera to implement the image processing function.

In the machine vision system of FIG. 4A, the digital video signal or digital image may be provided to the functional unit in the smart camera 190, wherein the image processing function is performed.

In the embodiment of FIG. 4A, the functional unit in the smart camera 190 may perform a portion or all of the image processing function, and the computer 82 may perform a portion of the image processing function. For example, the functional unit in the smart camera 190 may perform the actual processing of the image to determine characteristics of the image, and the computer 82 may then perform an operation based on this result, such as rejecting a part from an assembly line, or logging the results to file. As another example, the functional unit in the smart camera 190 may perform the processing of the image to determine characteristics of the image, and may also optionally perform an operation based on this result, and the computer system 82 may execute software to provide a user interface for the system. For example, as described in detail below, a prototype may first be converted to a graphical program, which may optionally have a user interface portion. Thus, the computer system 82 may execute the user interface portion of the graphical program, where the block diagram of the graphical program is used to configure the functional unit in the smart camera 190. Thus, in one embodiment, a first portion of the graphical program, e.g., DSP functions requiring real time performance, may be executed by the smart camera, i.e., the functional unit, and a second portion of the graphical program, e.g., a user interface where real time performance is not required, may be executed by the computer system 82.

In the embodiment of FIG. 4B, the functional unit in the smart camera 190 may perform all of the desired image processing function, including optionally performing an operation based on determined characteristics of the image, and hence the computer system 82 is not necessary during operation of the system. In another embodiment, the smart camera 190 may include a processor and memory (in addition to the functional unit which executes the image processing function) which may execute the operation based on determined characteristics of the image.

In the embodiments of FIGS. 4A and 4B, the functional unit in the smart camera 190 (or the computer system 82 in FIG. 4A) may control the motion control device 192. In an alternate embodiment, the motion control device 192 may also include a functional unit that has been configured with a prototype or that has been configured with a portion of the same prototype used to configure the smart camera, i.e., a portion that involves motion control operations. The functional unit in the motion control device 192 may be configured to perform a motion control function. Thus a prototype may have been first created that performs the motion control function, and the prototype may then have been deployed onto the motion control device 192, similarly as described above. Examples of motion control functions include moving a part or object to be imaged by a camera, rejecting a part on an assembly line, or placing or affixing components on a part being assembled, or a robotics application, among others.

Figure 5:
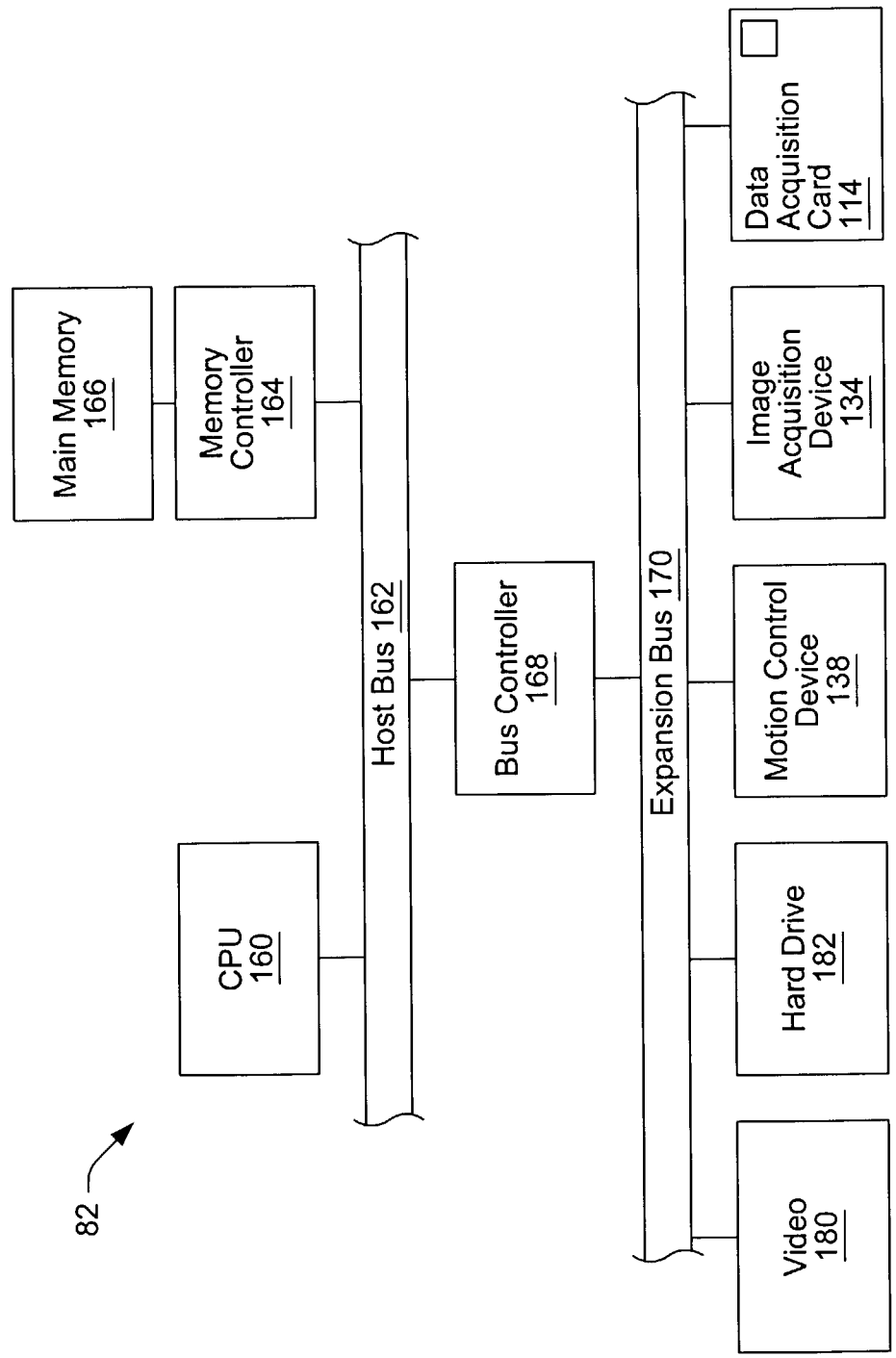
FIG. 5 is an exemplary block diagram of the computer of FIGS. 1, 2, 3A, and 4A.

FIG. 5—Computer System Block Diagram

FIG. 5 is an exemplary block diagram of the computer 82 of FIGS. 1, 2, 3A, and 4A. It is noted that any type of computer system configuration or architecture can be used as desired, and FIG. 5 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer 82 may include at least one central processing unit (CPU) or processor 160 which is coupled to a processor or host bus 162. The CPU 160 may be any of various types, including an x86 processor, a PowerPC processor, a CPU from the Motorola family of processors, a CPU from the SPARC family of RISC processors, as well as others. Main memory 166 is coupled to the host bus 162 by means of memory controller 164.

In one embodiment, the main memory 166 may store a prototyping environment application for graphically creating, configuring, simulating, and/or performing a prototype. In one embodiment, the main memory 166 may store a program that was automatically, i.e., programmatically generated by the prototyping environment, wherein the program is operable to implement a prototype. In one embodiment, the main memory 166 may store other software utilized in programmatically generating a program, in addition to the prototyping environment application. For example, in one embodiment, the prototyping environment may interface with a graphical programming development environment application to programmatically generate a graphical program based on a prototype. The main memory 166 may also store software operable to configure a hardware device to execute a prototype (or this functionality may be included in the other software application(s) stored in the memory). The main memory may also store operating system software, as well as other software for operation of the computer system.

The host bus 162 is coupled to an expansion or input/output bus 170 by means of a bus controller 168 or bus bridge logic. The expansion bus 170 is preferably the PCI (Peripheral Component Interconnect) expansion bus, although other bus types may be used. The expansion bus 170 may include slots for various devices, the examples shown including a motion control device 138, an image acquisition device 134, and a data acquisition device 114 such as described above. The computer 82 may further comprise a video display subsystem 180 and hard drive 182 coupled to the expansion bus 170, also shown.

One or more of the interface cards or devices (e.g., those shown in FIGS. 2, 3A, 3B, 4A and/or 4B) may be coupled to or comprised in the computer 82 and may comprise a functional unit, such as a programmable hardware element (FPGA) and/or processor and memory. The computer 82 may also include a network interface for coupling to a network, wherein the target device containing the functional unit may be coupled to the network. Thus the computer 82 may be used for configuring a functional unit hardware in a target device over a network. In one embodiment, the network may be a wireless network.

Figure 6A:
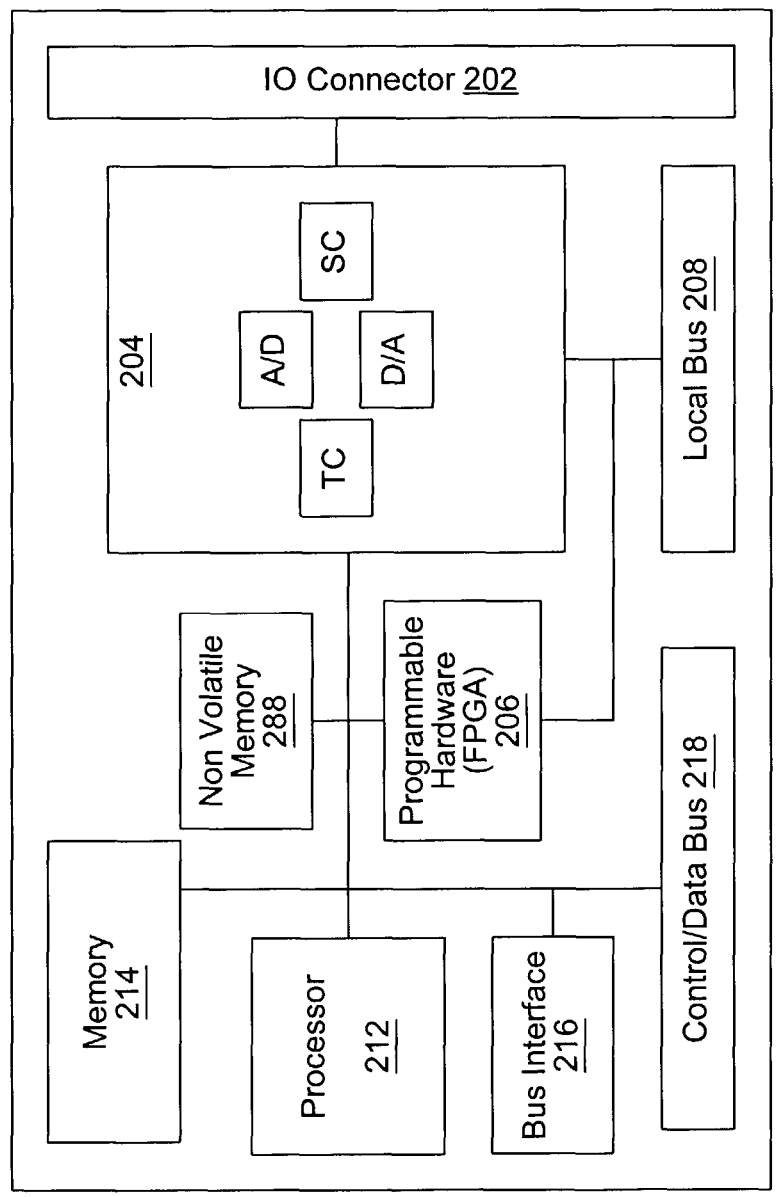
FIGS. 6A-6C illustrating devices, e.g., interface cards, configured with programmable hardware that may be configured to execute a prototype, according to exemplary embodiments.
Figure 6B:
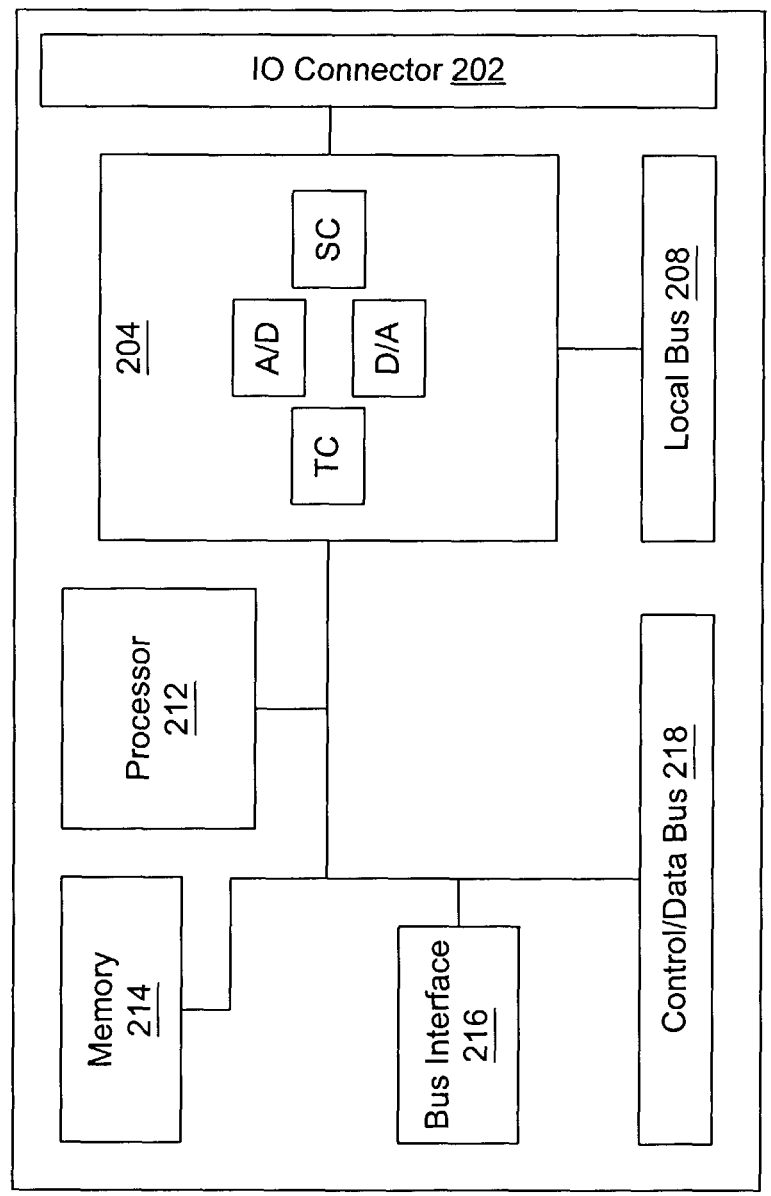
Figure 6C:
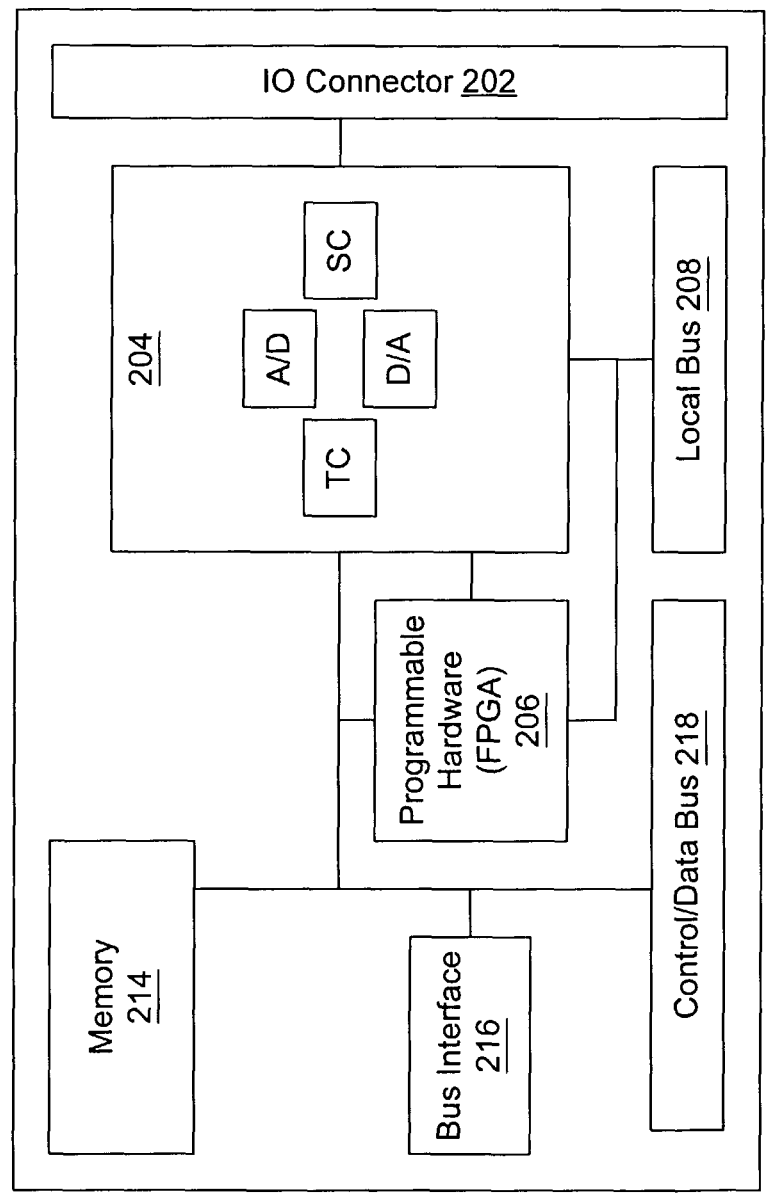

FIGS. 6A-6C: Device Hardware Diagrams

FIG. 6A is a block diagram illustrating a device, e.g., an interface card, configured with programmable hardware according to one embodiment. It is noted that FIG. 6A is exemplary only, and an interface card or device configured with programmable hardware may have various architectures or forms, as desired, and may include various elements or combinations of elements other than those shown in FIGS. 6A-6C. For example, the device may be internal or external to the computer 82, and may be connected to the computer through a network, such as the Internet. The device or interface card illustrated in FIG. 6A may be any of various devices such as shown in FIGS. 2-4, such as the image acquisition card 134, the motion control interface card 138, the DAQ card 114, the smart camera 190, etc.

As shown in FIG. 6A, the device or interface card may include an I/O connector 202 which is operable to send/receive signals. The I/O connector 202 may present analog and/or digital connections for receiving/providing analog or digital signals. For example, in the case of an image acquisition card, the I/O connector may send/receive image signals or pixel data, and the I/O connector 202 may be adapted for coupling to an external camera.

The device or interface card may also include data acquisition (DAQ) logic 204. As shown, the data acquisition logic 204 may comprise analog to digital (A/D) converters, digital to analog (D/A) converters, timer counters (TC) and signal conditioning (SC) logic as shown. The DAQ logic 204 may provide data acquisition functionality of the device or interface card. In one embodiment, the DAQ logic 204 may comprise elements such as 4 A/D converters, 4 D/A converters, 23 digital I/Os, a RTSI connector, and a TIO. This extra hardware may be useful for various applications, e.g., signal processing or motion control applications. The functional unit, e.g., programmable hardware element or FPGA 206 and/or processor 212 may access these resources directly.

In the embodiment of FIG. 6A, the functional unit of the device or interface card may include a programmable hardware element 206 and a processor 212 and memory 214. In one embodiment, the programmable hardware 206 may comprise a field programmable gate array (FPGA) such as those available from Xilinx, Altera, etc. The programmable hardware element 206 may be coupled to the DAQ logic 204 and may also be coupled to a local bus interface 208, described below. Thus a prototype can be created on the computer 82, or on another computer in a networked system, and at least a portion of the prototype can be converted into a hardware implementation form for execution in the FPGA 206. This may enable fast and/or real time execution of the prototype.

In the embodiment of FIG. 6A, the device or interface card may further include a dedicated on-board processor 212 and memory 214. This may enable the prototype or a portion of the prototype to be converted into machine language for storage in the memory 214 and execution by the processor 212. For example, a program, e.g., a graphical program, based on the prototype may be programmatically generated, and the program may then be compiled into machine language for storage in the memory 214 and execution by the processor 212. A portion of the graphical program may also (or instead) be transferred to the memory 214 in its native format for execution by the processor. This may be in addition to a portion of the graphical program being converted into a hardware implementation form in the FPGA 206. The memory 214 may store a real time operating system (RTOS) for execution by the processor 212. Where the graphical program executes in its native format on the device or interface card, the memory may also store a graphical program execution engine that is executed by the processor 212.

Thus, in one embodiment, after a graphical program based on a prototype has been created, a portion of the graphical program may be transferred and/or compiled for execution on the on-board processor 212 and executed locally on the device or interface card via the processor 212 and memory 214, and a second portion of the graphical program may be translated or converted into a hardware executable format and downloaded to the FPGA 206 for hardware implementation.

As one example, a first portion of a block diagram (that requires real time or fast execution) of a graphical program may be converted into a hardware executable format and downloaded to the FPGA 206 for hardware implementation, and a second portion of a block diagram (that may not require real time performance) may be stored in the memory 214 as program instructions and executed by the processor 212, in either a compiled or interpreted manner. As another example, a portion or all of the block diagram portion of the graphical program may be converted into a hardware executable format and downloaded to the FPGA 206 for hardware implementation, and a user interface portion (or front panel portion) of the graphical program may be stored in the memory 214 as program instructions and executed by the processor 212, in either a compiled or interpreted manner. Thus the portion of the graphical program which requires the most real time or deterministic (reliable and consistent) performance may be executed directly in hardware for fast operation, and other parts of the block diagram, or the user interface portion, which may not require real time performance, may execute on the processor 212. Where the processor executes the user interface portion, the processor may then send resulting signals to the video subsystem for display of the user interface on the computer display.

In another embodiment, a text-based program implementing a prototype may be programmatically generated, and the text-based program may be used to configure the device or interface card, similarly as described above with respect to the graphical program.

As shown, the device or interface card may further include bus interface logic 216 and a control/data bus 218. In one embodiment, the interface card may be a PCI bus-compliant interface card adapted for coupling to the PCI bus of the host computer 82, or adapted for coupling to a PXI (PCI eXtensions for Instrumentation) bus. The bus interface logic 216 and the control/data bus 218 may thus present a PCI or PXI interface.

The device or interface card may also include local bus interface logic 208. In one embodiment, the local bus interface logic 208 may present a RTSI (Real Time System Integration) bus for routing timing and trigger signals between the device or interface card and one or more other devices or cards.

In one embodiment, the device or interface card may also include a non-volatile memory 288 coupled to the programmable hardware element 206, the processor 212 and the memory 214. The non-volatile memory 288 may be operable to store a hardware description received from the host computer system to enable execution of the hardware description in the programmable hardware element 206 prior to or during booting of the computer system 82. The non-volatile memory 288 may also store software used by the processor, such as a RTOS and/or a graphical program execution engine.

In the embodiment of FIG. 6B, the programmable hardware element 206 is not included on the device or interface card, and thus the functional unit of the device or interface card comprises only processor 212 and memory 214. Thus, in deploying the prototype, a portion or all of the prototype (or a portion or all of a program based on the prototype) may be transferred to the memory 214 for execution by the processor 212. In one embodiment, a graphical program based on the prototype may be transferred in its native format to the memory 214 and executed by the processor 212 using a graphical program execution engine and possibly a RTOS. Alternatively, the graphical program may be compiled into an executable program (e.g., machine language, a script, or an interpretable data structure) and transferred to the memory 214 for execution by processor 212.

In the embodiment of FIG. 6C, the processor 212 is not included on the device or interface card, i.e., the functional unit of the device or interface card comprises the FPGA 206 and the memory 214. In this embodiment, the memory 214 may be used for storing FPGA state information. Thus in the embodiment of FIG. 6C, any supervisory control portion of the prototype (or any supervisory control portion of a program based on the prototype) which is necessary or desired to execute on a programmable processor in software may be executed by the host CPU in the computer system 82, and is not executed locally by a processor on the device or interface card.

Figure 7A:
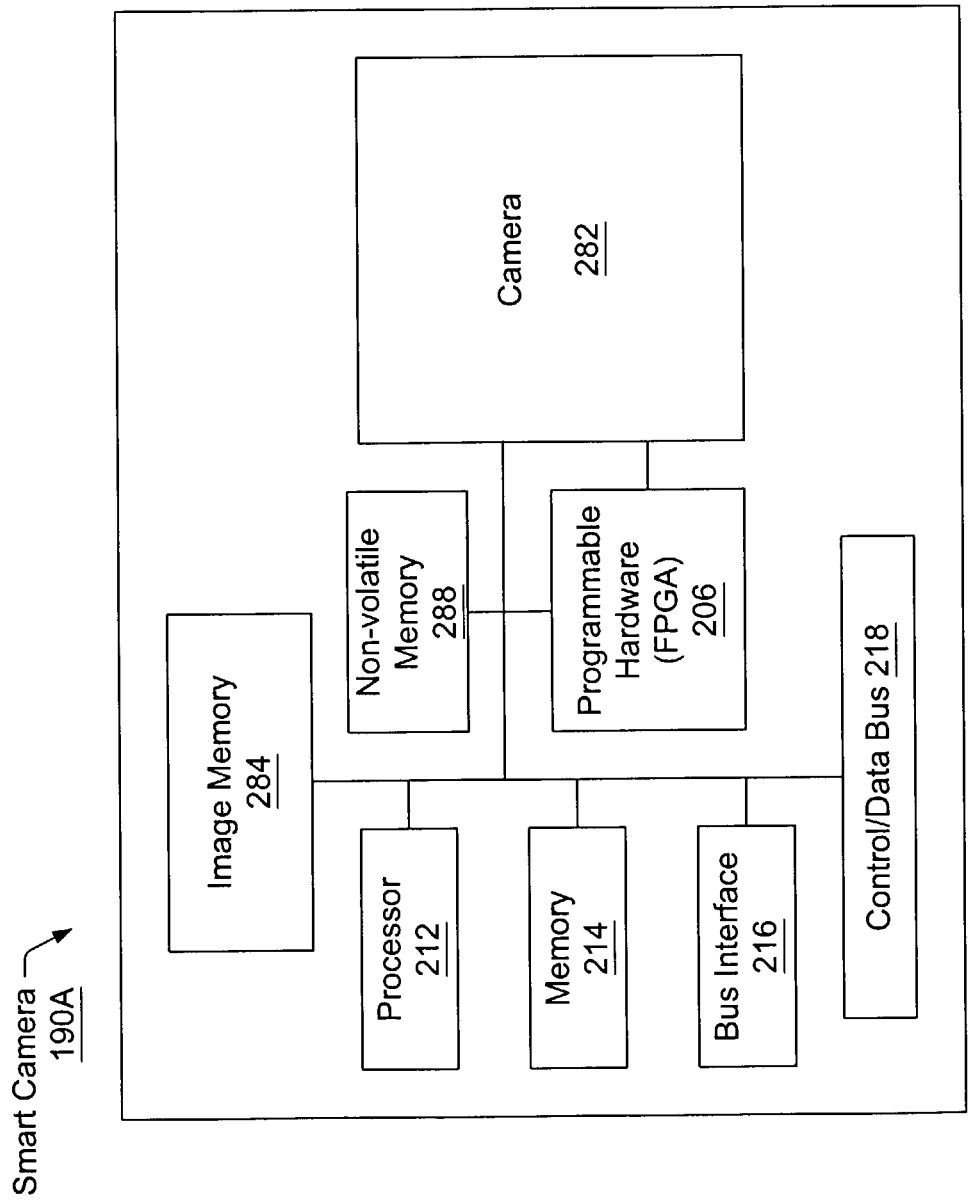

FIGS. 7A-7C: Block Diagrams of Smart Cameras With Programmable Hardware

As described above, any of various types of devices may be configured to execute a prototype. FIGS. 7A-7C are block diagrams of various embodiments of a smart camera 190 with programmable hardware, which may be configured to execute a prototype. As may be seen, the various embodiments share a number of features and configurations with the various devices and interface cards described above with reference to FIGS. 6A-6C, specifically the use of various combinations of processor/memory elements and programmable hardware, e.g., FPGAs, to execute portions of a prototype (or program based on a prototype). It is noted that these embodiments are illustrative only, and are not intended to limit the architecture, components, or form of the smart camera 190.

FIG. 7A illustrates one embodiment of a smart camera 190 which includes a camera 282 and a functional unit. In this embodiment, the functional unit may comprise a programmable hardware element 206, e.g., a field programmable gate array (FPGA) such as those available from Xilinx, Altera, etc, and may also comprise a processor 212 and memory 214. Each of the programmable hardware element 206, processor 212 and memory 214 may be coupled to the camera 282 and/or to an image memory 284.

As shown, the smart camera 190A may also include a non-volatile memory 288 coupled to the programmable hardware element 206, the processor 212, the memory 214 and the image memory 284. The non-volatile memory 288 may be operable to store a hardware description and/or program based on a prototype. The hardware description and/or program may be received from the host computer system to enable execution of the functional unit prior to or during booting of the computer system 82.

Although not shown, the smart camera 190 may include an I/O connector 202 which is operable to send and receive signals. The I/O connector 202 may present analog and/or digital connections for receiving/providing analog or digital signals. For example the I/O connector 202 may enable the smart camera to communicate with computer system 82 to receive a prototype (or program instructions based on a prototype) for performing image processing functions. Thus a prototype can be created on the computer 82, or on another computer in a networked system, and at least a portion of the prototype can be deployed onto a functional unit of the smart camera.

As noted above, the smart camera 190A includes a dedicated on-board processor 212 and memory 214 in addition to the programmable hardware element 206. A program, e.g., a graphical program, based on the prototype may be programmatically generated, and the graphical program may then be compiled into machine language for storage in the memory 214 and execution by the processor 212 (or to execute natively). This is in addition to a portion of the graphical program being converted into a hardware implementation form in the FPGA 206. Thus, in one embodiment, after a graphical program has been created, a portion of the graphical program may be compiled for execution on the on-board processor 212 and executed locally on the smart camera 190A via the processor 212 and memory 214, and a second portion of the graphical program may be translated or converted into a hardware executable format and uploaded to the FPGA 206 for hardware implementation.

For example, in a manner similar to that described above with reference to FIG. 6A, a first portion of a block diagram (that requires real time or fast execution) of a graphical program, e.g., a graphical image processing program programmatically generated based on an image processing prototype, may be converted into a hardware executable format and downloaded to the FPGA 206 for hardware implementation, and a second portion of a block diagram (that may or may not require real time performance) may be stored in the memory 214 as program instructions and executed by the processor 212, in either a compiled or interpreted manner. As another example, a portion or all of the block diagram portion of the graphical program may be converted into a hardware executable format and downloaded to the FPGA 206 for hardware implementation, and a user interface portion (or front panel portion) of the graphical program may be downloaded and stored in the memory 214 as program instructions and executed by the processor 212, in either a compiled or interpreted manner. Thus the portion of the graphical program which requires the most real time or deterministic (reliable and consistent) performance may be executed directly in hardware for fast operation, and other parts of the block diagram, or the user interface portion, which may not require real time performance, may execute on the processor 212. Where the processor executes the user interface portion, the processor may then send resulting signals to a video subsystem (of, for example, the computer system 82) for display of the user interface on the computer display.

As noted above, the smart camera 190A may include image memory 284 which couples to the programmable hardware 206, the camera 282, the processor 212, memory 214, bus interface 216, and the control/data bus 218. The image memory 284 may be operable to store a portion of an image, or one or more images received from the camera 282. The image memory 284 may enable the programmable hardware 206 and/or the processor 212 to retrieve the one or more images, operate on them, and return the modified images to the image memory. Additionally, the images may be retrievable for transmission to external systems, such as the computer system 82, via the I/O connector 202, for example.

As shown, the smart camera 190A may further include bus interface logic 216 and a control/data bus 218. In one embodiment, the smart camera 190A is a PCI bus-compliant interface card adapted for coupling to a PCI bus of the host computer 82, or adapted for coupling to a PXI (PCI eXtensions for Instrumentation) bus. The bus interface logic 216 and the control/data bus 218 may thus present a PCI or PXI interface.

Although not shown, in one embodiment, the smart camera 190A may also include local bus interface logic 208, as shown in FIG. 6A. In one embodiment, the local bus interface logic 208 may present a RTSI (Real Time System Integration) bus for routing timing and trigger signals between the smart camera 190A and one or more other devices or cards, such as other smart camera, motion devices, or other smart sensors.

In yet another embodiment, the smart camera 190A may include data acquisition (DAQ) logic 204, not shown, such as analog to digital (A/D) converters, digital to analog (D/A) converters, timer counters (TC) and signal conditioning (SC) logic, as shown in FIG. 6A. The DAQ logic 204 may be useful for signal processing and motion control applications. The programmable hardware element or FPGA 206 may access these resources directly, thereby enabling creation of very powerful measurement, DSP and control applications, among others. For example, if the camera 282 is an analog camera, the smart camera 190A may further include analog to digital (A/D) logic (not shown) for converting analog image signals into a digital image for storage in the memory.

FIG. 7B illustrates another embodiment of a smart camera 190B, with a configuration similar to that of the device or interface card described above with reference to FIG. 6B. As FIG. 7B shows, in this embodiment, the smart camera 190B includes the camera 282, processor 212, memory 214, image memory 284, control/data bus 218, and bus interface 216 described above with reference to FIG. 7A, but does not include the programmable hardware (e.g., FPGA). Thus, in this embodiment the functional unit comprises only the processor 212 and memory 214. Thus a portion or all of a prototype (or program based on the prototype) may be deployed to the processor/memory component 212/214. As FIG. 7B also shows, timer/counter logic 286 may also be included on the smart camera. The timer/counter logic 286 may be coupled to the other components of the smart camera 190B, and may be operable to provide high-performance timing and counting functions to the various elements of the smart camera 190B. For example, in one embodiment, the timer/counter logic may be used by the processor 212 to accurately control image acquisition by the camera 282, such as for a high speed assembly line, or for capturing images of a fast-moving object.

FIG. 7C illustrates another embodiment of a smart camera 190C, where the smart camera 190C includes programmable hardware 206 and non-volatile memory 288, but does not include the processor 212 and memory 214. Thus in the embodiment of FIG. 7C the functional unit comprises only the FPGA 206. Thus, any supervisory control portion which is necessary or desired to execute on a programmable processor in software may be executed by the host CPU in the computer system 82, and is not executed locally by processor 212, i.e., on the smart camera 190C. As FIG. 7C also shows, the smart camera may include camera 282, bus interface 216, control/data bus 218, image memory 284, and timer/counter logic 286, as described above. Thus, a prototype, in the form of a hardware description, may be converted into a hardware executable format and downloaded to the programmable hardware element 206 for hardware implementation. Note that, as described above, the non-volatile memory 288 (or a separate volatile memory not shown) may be operable to store the hardware description received from the host computer system 82 to enable execution of the hardware description in the programmable hardware element 206 prior to or during booting of the computer system 82.

Figure 8:
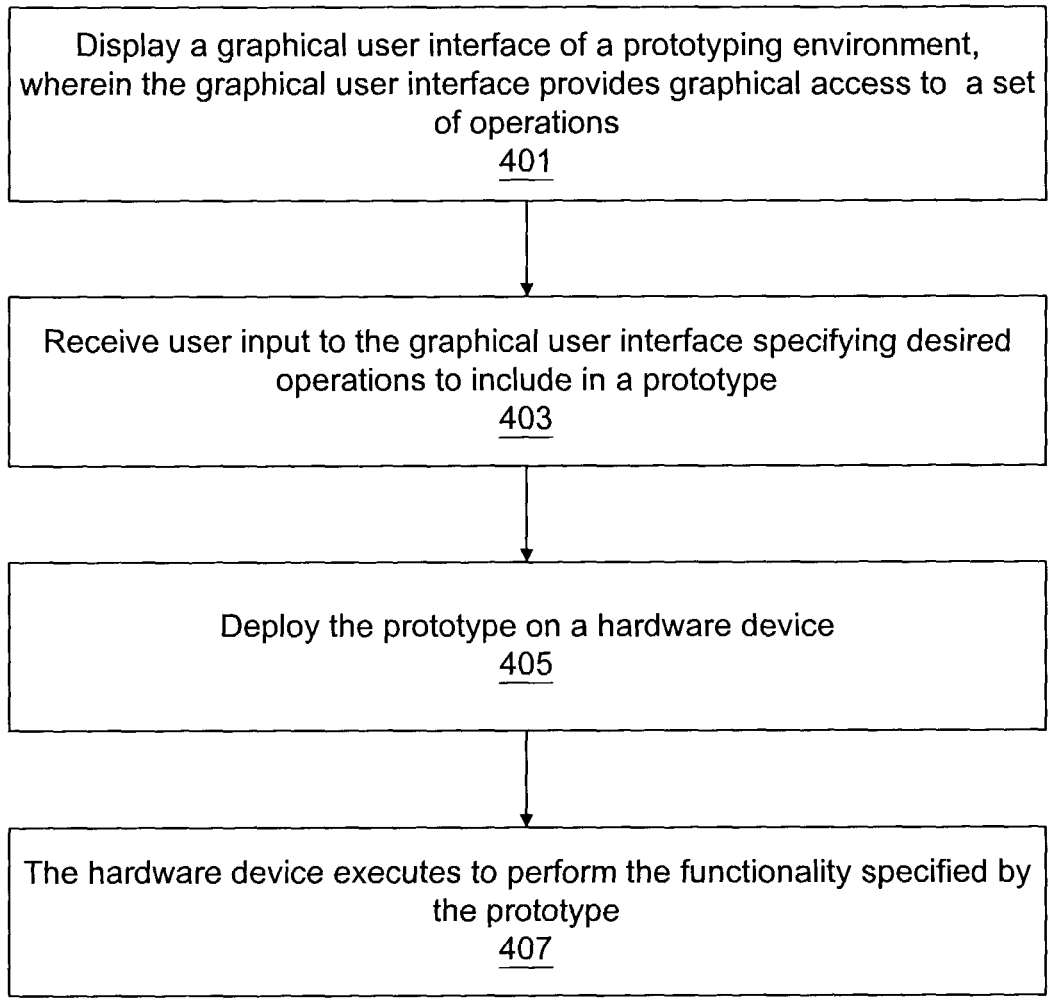
FIG. 8 is a flowchart diagram illustrating one embodiment of a method for creating and performing a prototype, i.e., configuring a hardware device to execute the prototype.

FIG. 8—Creating and Performing a Prototype

FIG. 8 is a flowchart diagram illustrating one embodiment of a method for creating and performing a prototype, i.e., configuring a hardware device to execute the prototype. It is noted that FIG. 8 represents an exemplary embodiment, and various alternative embodiments are contemplated. Also, the steps of FIG. 8 may be performed in various orders or multiple times, and steps may be combined, added, or omitted, etc.

In step 401, a graphical user interface of a prototyping environment may be displayed, wherein the graphical user interface provides graphical access to a set of operations. Two exemplary embodiments of such a graphical user interface, one for an image processing prototyping environment and one for a motion control prototyping environment, are described below. In various embodiments, the prototyping environment may be specialized for creating any of various types of applications using any of various types of operations or technologies. For example, the prototyping environment may be used for creating a prototype to implement a motion control application, a data acquisition and control application, a test and measurement application, an image processing or machine vision application, a process control application, a man-machine interface application, a simulation application, and/or a hardware-in-the-loop validation application, etc.

As noted above, in one embodiment, the motion control prototyping environment may provide integrated access to multiple types of operations, e.g., may provide access to motion control, machine vision, and data acquisition (DAQ) operations. Any of various types of DAQ operations may also be provided. For example, the DAQ operations may include operations related to digital I/O, analog input, analog output, signal conditioning, calibration and configuration (e.g., to calibrate and configure specific devices), counting operations, etc.

In step 403, user input to the graphical user interface may be received, wherein the user input specifies desired operations to include in a prototype. The operations may be related to one another or structured in any of various ways. For example, in one embodiment, the prototype may comprise a sequence of operations. In one embodiment, each operation in the sequence may be performed sequentially. In another embodiment, the user may specify conditional branches which may result in some operations being skipped or performed in different orders, e.g., depending on results of performing previous operations. The user may also specify other types of constructs, such as iteration, looping, jumps, etc. One embodiment of step 403 is described in detail below with reference to FIG. 9.

For each operation added to the prototype, the user may configure or customize the operation, e.g., by interacting with a graphical panel or dialog to configure properties or parameters for the operation. In the preferred embodiment, the user is not required to specify or write any program source code to implement the prototype. Instead, the prototype may be specified graphically by interacting with the graphical user interface of the prototyping environment. The prototyping environment may enable the user to preview, simulate, and/or actually perform the prototype before the prototype is deployed on a hardware device. For example, if the prototype is an image processing prototype that implements an image processing function intended for deployment on a smart camera, the prototyping environment may be operable to execute the operations in the prototype to perform the image processing function, e.g., to test and refine the algorithm before deploying it on the smart camera.

In response to the user input specifying the prototype, information representing the prototype, i.e., information representing the operations in the prototype and their configured properties or parameters, may be stored, e.g., in a data structure representing the prototype. For example, the data structure may specify information regarding the prototype, such as names or other identifiers that identify the operations in the prototype. The data structure may also specify information regarding various properties or parameter values configured for one or more operations in the prototype.

In step 405, the prototype may be deployed on a hardware device. The hardware device may be coupled to the computer system 82 to facilitate the deployment of the prototype. In one embodiment, the hardware device may be comprised in the computer system 82. In other embodiments the hardware device may be coupled to the computer system 82 through a network, such as the Internet, or may be coupled to the computer system 82 through wireless means.

Deploying the prototype on the hardware device may comprise configuring the hardware device to perform at least a portion of the operations in the prototype. As described in more detail below, in one embodiment, a program based on the prototype may be programmatically generated, and deploying the prototype may comprise storing this program or a user-modified version of the program on (at least part of) the functional unit, or configuring the functional unit with all or part of the program, such that after the deployment, the functional unit is operable to execute or implement the functionality of the program.

In various embodiments, any of various methods or techniques may be used in deploying the prototype on the hardware device. In the preferred embodiments, the process of deploying the prototype is fully or mostly automatic so that once the prototype is created, little or no work is required on the user's part to deploy the prototype on the hardware device. For example, the prototyping environment may include functionality for programmatically converting the prototype to a format usable to configure the device and for configuring the device according to this format, or the prototyping environment may interface with one or more other applications to perform the converting and configuring. The user may not be required to provide user input, or may be required to provide a minimal amount of user input. In one embodiment, a graphical user interface wizard, i.e., one or more graphical panels or dialog boxes may be displayed to guide the user through the process of deploying the prototype on the device. One embodiment of step 405 is described below with reference to FIG. 10.

In one embodiment, in addition to deploying the prototype on the hardware device, the hardware device may also be configured according to another program, such as a user-created program.

In step 407, the hardware device may execute to perform the functionality specified by the prototype. The hardware device performing the functionality specified by the prototype may comprise the functional unit on the hardware device executing at least a portion of the operations in the prototype, i.e., executing program instructions and data implementing the operations.

In various embodiments, step 407 may comprise any of various types of hardware devices executing to perform functionality specified by any of various prototypes. As one example, an image processing prototype specifying an image processing function may be deployed on an image acquisition device. In this case, for example, the image processing function may operate to analyze an image and detect, recognize, or characterize one or more features or characteristics of an object, such as position, orientation, color, or possible flaws or lack thereof, among others. In one embodiment, the image acquisition device may perform a control operation after executing to perform the image processing function on the image. In another embodiment, the image acquisition device may generate a pass/fail indication after executing to perform the image processing function on the image. In another embodiment, the image acquisition device executing to perform the image processing function on the acquired image may comprise the image acquisition device determining characteristics of the image after performing the image processing function, and the image acquisition device performing an operation based on the determined characteristics of the image.

For example, in a quality control system in an automated assembly plant, in performing the image processing function on the acquired image, the image acquisition device may determine a characteristic of the image indicating that the imaged object is defective. The image acquisition device may then send a signal, such as a pass/fail indication, to a motion control device which may remove the defective object from the assembly line. An example of such a system is described above with reference to FIGS. 4A and 4B.

As another example, a motion control prototype specifying a motion control function may be deployed on a motion control device. In this case, for example, the motion control device may execute to perform motion control operations in the prototype, such as straight-line movements, arc movements, contoured movements, gearing operations, reference operations, etc. Other operations may relate to the motion control performed by the device, but may not actually cause the motion control device to perform a movement.

As another example, a data acquisition (DAQ) prototype specifying a DAQ function may be deployed on a DAQ device. In this case, for example, the DAQ device may execute to perform DAQ operations in the prototype, e.g., to acquire data from an analog input channel, to cause signal conditioning to be performed on such data, etc.

As noted above, FIG. 8 is exemplary, and steps of FIG. 8 may be performed in various orders or multiple times, and steps may be combined, added, or omitted, etc. As one example, before deploying the prototype on the hardware device, the prototyping environment may execute the prototype on the computer system 82, e.g., to test the function performed by the prototype. The user may then edit the prototype to refine or correct the function performed by the prototype. In one embodiment, executing the prototype on the computer system 82 may comprise the computer system 82 interfacing with a hardware device, e.g., the device on which the prototype will later be deployed or another device, to cause the device to perform the operations specified in the prototype.

In one embodiment, the prototyping environment may execute the prototype by accessing the stored information representing the prototype to determine program instructions corresponding to operations in the prototype and may then execute the program instructions. For example, the prototyping environment may access a library of software routines corresponding to various operations. For each operation included in the prototype, the prototyping environment may execute or invoke the appropriate software routine. If the user configured parameter values or properties for the operations, then the parameter values may be passed to the software routine to cause the software routine to execute properly as configured by the user.

Figure 9:
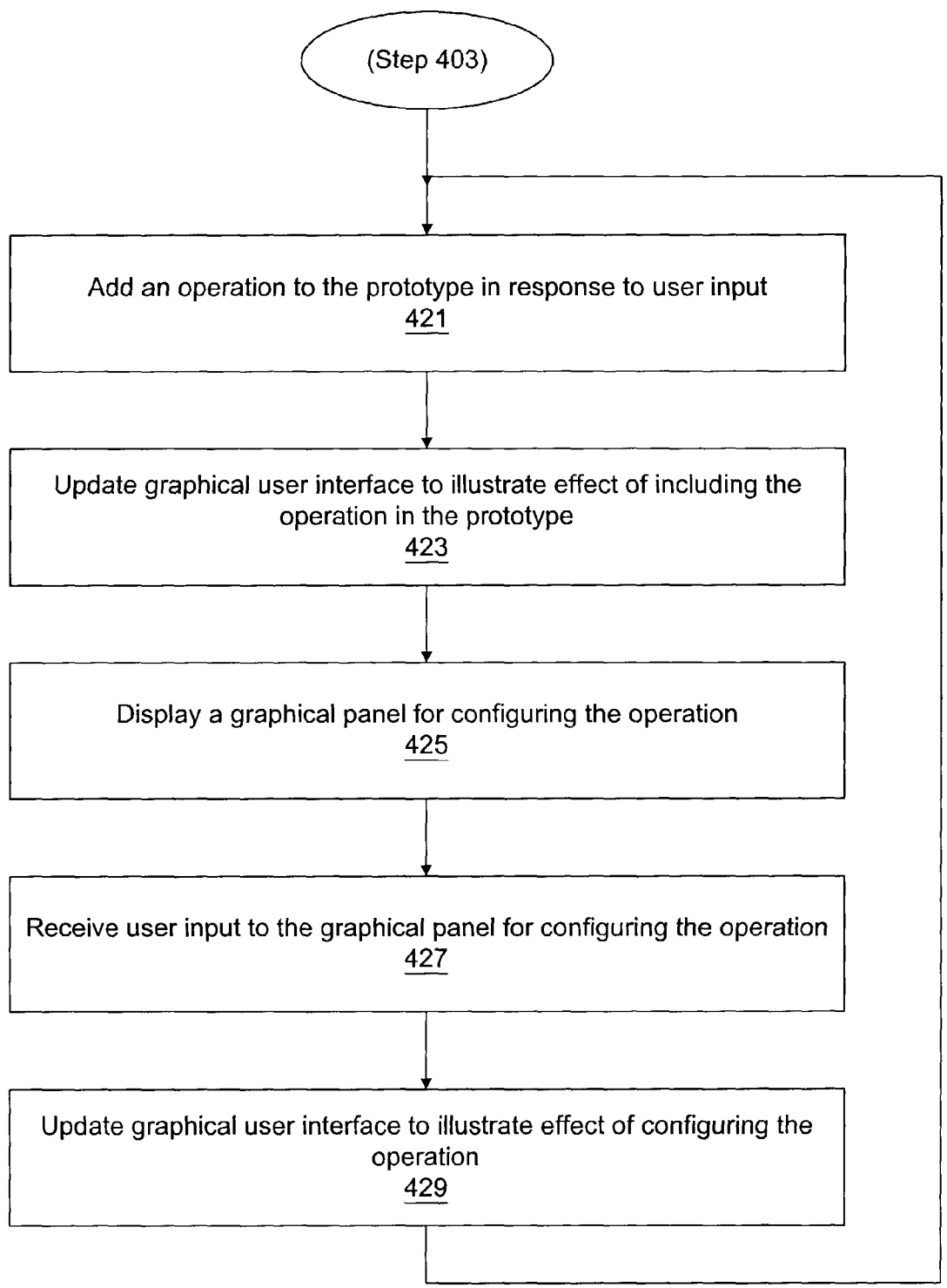
FIG. 9 is a flowchart diagram illustrating one embodiment of receiving user input specifying desired operations to include in a prototype.

FIG. 9—Specifying a Sequence of Motion Control (or MC/MV/DAQ) Operations

FIG. 9 is a flowchart diagram illustrating one embodiment of step 403 of FIG. 8, in which user input specifying desired operations to include in a prototype is received to the graphical user interface of the prototyping environment.

In step 421, an operation may be added to the prototype in response to user input. In various embodiments, the user may interact with the graphical user interface of the prototyping environment in any of various ways to select an operation. For example, in one embodiment, a plurality of buttons may be displayed, each button corresponding to a particular operation. The user may press the appropriate button to add the desired operation. In another embodiment, a plurality of icons may be displayed, each icon corresponding to a particular operation. The user may select the appropriate icon to add the desired operation, e.g., by dragging and dropping the icon onto an area of the display screen representing the prototype. In other embodiments, the user may utilize menu, keyboard, and/or voice commands to add an operation to the prototype. Step 421 preferably does not involve the user specifying or writing any program code. In other words, the user preferably interacts with the graphical user interface at a high level to add the desired operation to the prototype.

In one embodiment, the operations that the user includes in the prototype may be represented to the user graphically, e.g., as a sequence of icons. For example, as shown in FIG. 29A, one area of the graphical user interface may display an icon strip comprising a plurality of icons. Each icon may correspond to an operation in the prototype and may visually indicate that operation. In another embodiment, the operations may be represented textually, e.g., as a list of names of the operations. For example, a motion control prototyping environment may display operation names such as "Straight-line move", "Arc move", etc.

In step 423, the graphical user interface of the prototyping environment may be updated to illustrate the effect of adding the new operation selected in step 421 to the prototype. As one example, the graphical user interface of a motion control prototyping environment may display one or more views of the motion control performed by the prototype, such as a two-dimensional and/or three-dimensional view of the cumulative movement specified by the prototype, as well as other types of views, such as a graph indicating a velocity profile for the sequence. Thus, in step 423 these views may be updated to illustrate the effect of a new motion control operation. As another example, the graphical user interface of an image processing prototyping environment may display an image, and in step 423 the image may be updated to illustrate the effect of applying a new image processing operation included in the prototype to the image.

Each operation may have various associated properties, attributes, or parameters affecting the operation. For example, an arc move motion control operation may have parameters or properties such as a radius, a start angle, and a travel angle. These parameters may initially have default values, e.g., 180 degrees for the travel angle of an arc move. In step 423, the graphical user interface may be updated according to these default values. In steps 425 and 427, the user may configure these parameters to customize the function performed by each operation.

In the preferred embodiment, the user may configure the parameters of the operations graphically, without having to write any program code. Thus, in step 425, a graphical panel for configuring the operation may be displayed. This panel may be automatically displayed in response to adding the operation to the prototype, or the panel may be displayed in response to user input requesting to configure the operation. In step 427, user input for configuring the operation may be received to the graphical panel. For example, the panel may include various user interface elements for changing parameter or property values of the operation, such as numeric GUI controls, check boxes, etc.

In step 429, the graphical user interface may then be updated again to illustrate the effect of configuring the operation. For example, if the user changed a travel angle parameter of an arc move operation in a motion control prototype, then one or more views of the motion control performed by the prototype may be updated to visually reflect the new travel angle performed by the arc move operation.

As indicated by the flowchart arrow from step 429 to step 421, the process described above may be repeated for new operations the user adds to the prototype. Where the prototype comprises a sequence, new operations may be added any place within the sequence, e.g., at the beginning, end, or between two other operations. The user may select any operation in the prototype to view or edit its configuration. As the user changes the prototype, the graphical views illustrating the function performed by the prototype may be updated accordingly.

Thus, the method of FIG. 9 may enable the user to easily create a prototype including a plurality of executable operations without requiring the user to write program code.

Figure 10:
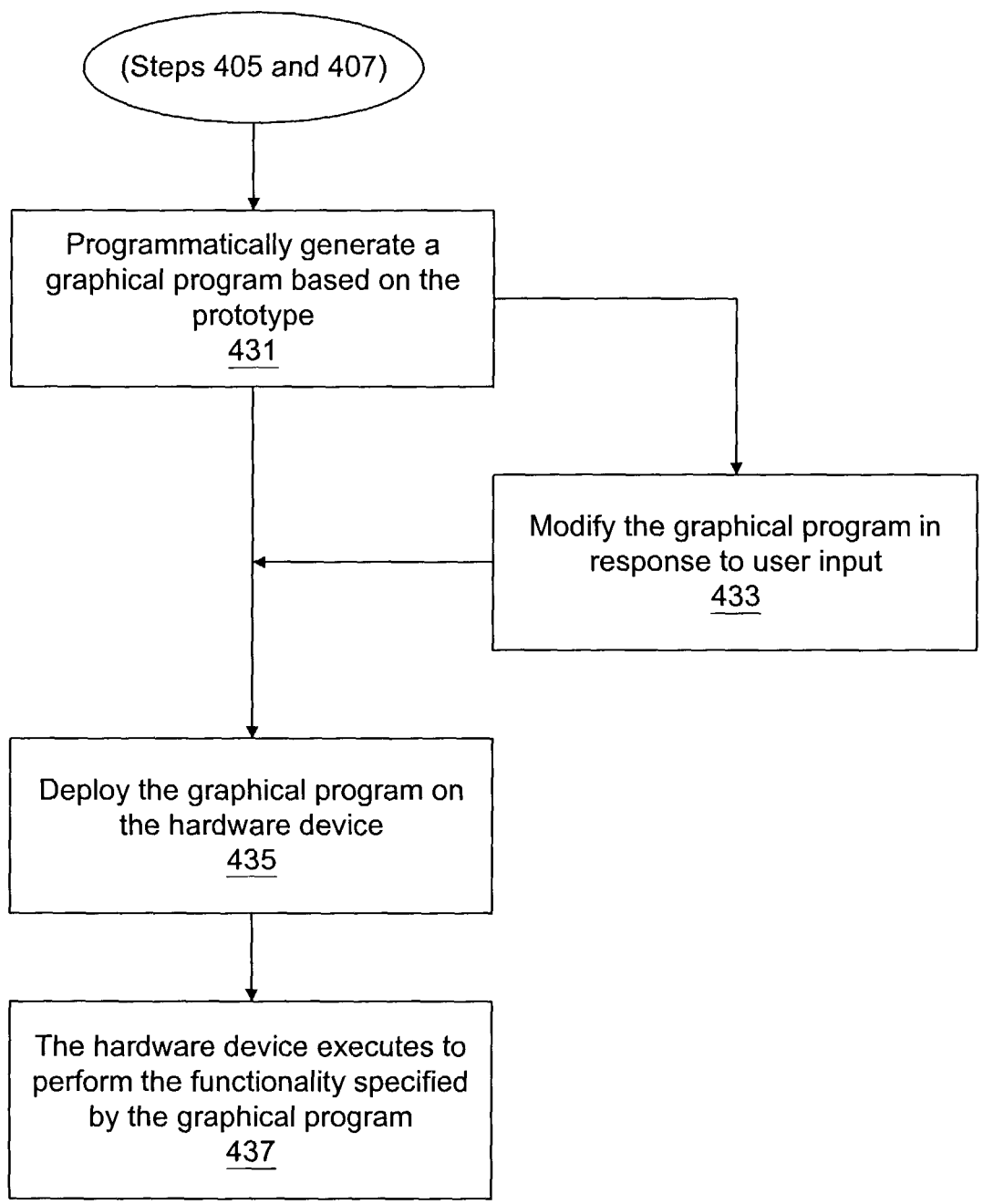
FIG. 10 is a flowchart diagram illustrating one embodiment of a method for deploying a prototype on a hardware device, involving programmatically generating a graphical program based on the prototype and then deploying the generated graphical program on the hardware device.

FIG. 10—Deploying a Graphical Program Based on a Prototype on a Hardware Device As described above, in one embodiment, deploying a prototype on a hardware device (step 405 of FIG. 8) may comprise programmatically generating a program based on the prototype, and then deploying the generated program on the hardware device. FIG. 10 is a flowchart diagram illustrating one embodiment steps 405 and 407 of FIG. 8, in which the program generated based on the prototype is a graphical program.

In step 431, a graphical program based on the prototype may be programmatically generated. The generated graphical program may include various interconnected nodes or icons which visually represent the operations in the prototype and which are executable to perform the operations as configured by the user. In various embodiments, this programmatic generation may be performed in any of various ways. In one embodiment, the prototyping environment application may include functionality for both creating the prototype and generating the graphical program. In another embodiment, the prototyping environment application may interface with another program, e.g., a graphical programming development environment application, to request the graphical program to be generated, e.g., according to a client/server methodology.

The graphical program may be programmatically generated with little or no user input received during the generation process. In one embodiment, the graphical program is programmatically generated with no user input required. In another embodiment, the user may be prompted for certain decisions during or prior to the programmatic generation, such as the type of graphical program to generate, a file name or location for the graphical program, the look and feel of a user interface for the graphical program, the number or degree of comments contained within the graphical program, etc.

Various objects may be included in the generated graphical program, such as nodes and/or programmatic structures (e.g., loops, case structures, etc.) included in a block diagram of the graphical program. The graphical program may also include a user interface portion including various user interface objects, such as one or more user interface panels having controls for specifying user input to the graphical program and/or indicators for displaying output from the graphical program. As described above, block diagram objects in a graphical program are typically interconnected so as to visually indicate functionality of the program. Thus, generating the graphical program may also comprise connecting or wiring together the block diagram objects appropriately. Also, the positions and/or sizes of the objects may be specified (e.g., to create an easily readable block diagram), among other properties or configuration of the objects (e.g., configuration of data types, parameters, etc.).

Programmatically generating the graphical program may comprise generating one or more files or data structures defining or representing the graphical program. When a user interactively develops a graphical program from within a graphical programming development environment, the graphical programming development environment may create one or more program files. For example, the program files may specify information such as a set of nodes included in the graphical program, interconnections among these nodes, programmatic structures such as loops, etc. Also, the program files may store various data structures, e.g., in binary form, which the graphical programming development environment uses to directly represent the graphical program. Thus, in programmatically generating the graphical program, one or more files or data structures representing the graphical program may be programmatically generated, wherein these files may be structured or formatted appropriately for a particular graphical programming development environment.

In various embodiments, any of various types of graphical programs may be generated. The generated graphical program may be targeted toward a particular graphical programming development environment. Thus, in programmatically generating the program, files may be created that are formatted in a manner expected by the targeted graphical programming development environment. This may be desirable or necessary, for example, when the graphical programming development environment includes a runtime environment that is required for the generated graphical program to execute. Examples of graphical programming development environments include LABVIEW™, DASYLAB™, and DIADEM™ from National Instruments, VEE™ from Agilent, WIT™ from Coreco, VISION PROGRAM MANAGER™ from PPT Vision, SOFTWIRE™ from Measurement Computing, SIMULINK™ from the MathWorks, SANSCRIPT™ from Northwoods Software, KHOROS™ from Khoral Research, SNAPMASTER™ from HEM Data, VISSIM™ from Visual Solutions, OBJECTBENCH™ by SES (Scientific and Engineering Software), and VISIDAQ™ from Advantech, among others.

In one embodiment, a database may be utilized in programmatically generating the graphical program, wherein the database stores information specifying how to generate graphical source code to implement each possible operation in the prototype. In one embodiment, the targeted graphical programming development environment may provide nodes that correspond directly to operations in the prototype. For example, to implement a straight-line move operation included in a motion control prototype, a corresponding straight-line move node may be included in the graphical program, wherein the node is executable to perform the configured straight-line move. For example, properties of the straight-line move operation that were configured graphically in a motion control prototyping environment, such as the X position value, the Y position value, etc., may be specified as parameters to the straight-line move node.

In another embodiment, there may not be a graphical program node directly corresponding to one or more of the operations in the prototype. Thus, these operations may need to be implemented using a combination of nodes provided by the graphical programming development environment. For example, in one embodiment, a straight-line move operation may be implemented using a plurality of low-level nodes operable to produce appropriate control signals to perform a straight-line move. The graphical source code programmatically generated for the straight-line move operation may also include programming constructs such as loops, timers, etc.

In one embodiment, the program that generates the graphical program based on the prototype e.g., the prototyping environment application, may be a self-contained program that includes all executable logic necessary for programmatically generating the new graphical program. In another embodiment, a client/server programming model may be utilized, in which the client portion creates and/or processes the prototype information and determines the graphical program to be generated based on this information (i.e., determines the block diagram objects to be included in the program, the interconnections among these objects, etc.). The client portion may then call an API provided by the server portion to request the server portion to perform the actual creation of the graphical program, e.g., by creating files and/or other data structures representing the graphical program. The server portion may execute on the same computer system as the client portion or may execute on a different computer system, e.g., a different computer system connected by a network. In one embodiment, the server portion may be an instance of a graphical programming development environment application, which provides an API enabling client programs to programmatically create and/or edit graphical programs.

The program that generates the graphical program based on the prototype, e.g., the prototyping environment application, may itself be constructed using any of various programming languages, methodologies, or techniques, e.g., may itself be a graphical program, may be a text-based program, or may be constructed using a combination of graphical and text-based programming environments.

As shown in step 433, the user may optionally modify the graphical program that was programmatically generated in step 431, e.g., to develop a customized or optimized graphical program. For example, the user may desire to add functionality to the graphical program which was not included in the prototype from which the graphical program was generated. For example, by directly modifying the graphical source code of the program, the user may be able to customize the graphical program to perform operations not available from within the prototyping environment. The user may utilize a graphical programming development environment separate from the prototyping environment to interactively modify the generated program.

In step 435, the graphical program or the user-modified version of the graphical program may be deployed on the hardware device to configure the device to perform the function implemented by the graphical program, and thus to perform the function specified by the prototype on which the graphical program is based. As described above with reference to FIGS. 6A-6C and also described in detail below, deploying the graphical program on the hardware device may comprise storing the graphical program on (at least part of) the functional unit of the hardware device, or configuring the functional unit with all or part of the graphical program, such that after the deployment, the functional unit is operable to execute or implement the functionality of the graphical program. As described below, in one embodiment, the graphical program may be converted to one or more additional formats that facilitate configuring of the hardware device.

In various embodiments, the process of converting the prototype to a graphical program and then configuring the device according to the graphical program may vary in terms of the flow experienced by the user. For example, in one embodiment, the user may create a prototype in the prototyping environment and may then request the prototyping environment to deploy the prototype on a hardware device. For example, the user may invoke a dialog box or wizard to specify information regarding the deployment, such as a selected hardware device on which to deploy the prototype, selected operations of the prototype to deploy, etc.

After the user has filled in the information in the dialog box or wizard, a graphical program based on the prototype may be automatically generated, and the hardware device may then be configured to execute the graphical program. As described above, the prototyping environment may interact with one or more other applications in this process, such as a graphical programming development environment. For example, the prototyping environment may interface with the graphical programming development environment to generate the graphical program and may then request the graphical programming development environment to configure the selected hardware device according to the graphical program. However, this may appear to the user as a seamless process, and the user may never know that the graphical programming development environment was involved and may not even know that a graphical program was ever generated.

In another embodiment, the entire process of moving from the prototype to the configured hardware device may be slightly less integrated. For example, the prototyping environment may only be operable to programmatically generate the graphical program. The user may then need to open the graphical program in a graphical programming development environment and request the graphical programming development environment to deploy the generated graphical program on a selected hardware device. Also, as described above, the user may first modify the generated graphical program before requesting the graphical program to be deployed on the device.

In step 437, the hardware device may execute to perform the functionality specified by the graphical program, similarly as described above with reference to FIGS. 6A-6C.

Various alternative embodiments of deploying a prototype on a hardware device are contemplated. For example, in one embodiment, instead of a graphical program, a text-based program based on the prototype may be automatically generated. The text-based program may include program code in any of various text-based programming languages, such as C, C++, VISUAL C++™, VISUAL BASIC™, JAVA™, PASCAL™, etc. The generated text-based program may include various functions or methods which are executable to perform the operations configured by the user in the prototype. The text-based program may then be used in configuring the hardware device, similarly as described above.

In another embodiment, the process of deploying the prototype on the hardware device may not involve programmatically generating a program based on the prototype. Instead, the prototype may be deployed directly on the device, without first being converted to another form. As described above, when the prototyping environment creates the prototype, the prototyping environment may store information representing the prototype. Thus, this information may be directly deployed on the hardware device. For example, where the hardware device includes a processor and memory, the memory of the hardware device may store a prototype execution engine that is executable to execute the prototype in its native form. Thus, the prototype may be stored in the memory of the hardware device, and the processor of the hardware device may execute the prototype execution engine to execute the prototype.

Also, in one embodiment, in addition to configuring the hardware device to execute the prototype (or execute a program based on the prototype), the hardware device may also be configured according to another program, such as a user-created program. For example, in one embodiment, a first processor of the hardware device may be configured to execute the program based on the prototype, and a second processor may be configured to execute the user-created program. In another embodiment, a first programmable hardware element (e.g., FPGA) of the hardware device may be configured to execute the program based on the prototype, and a second programmable hardware element may be configured to execute the user-created program. In another embodiment, a programmable hardware element of the hardware device may be configured to execute the program based on the prototype, and a processor of the hardware device may be configured to execute the user-created program, or vice versa.

FIGS. 11-18: Image Processing Prototyping Environment User Interface

Figure 11:
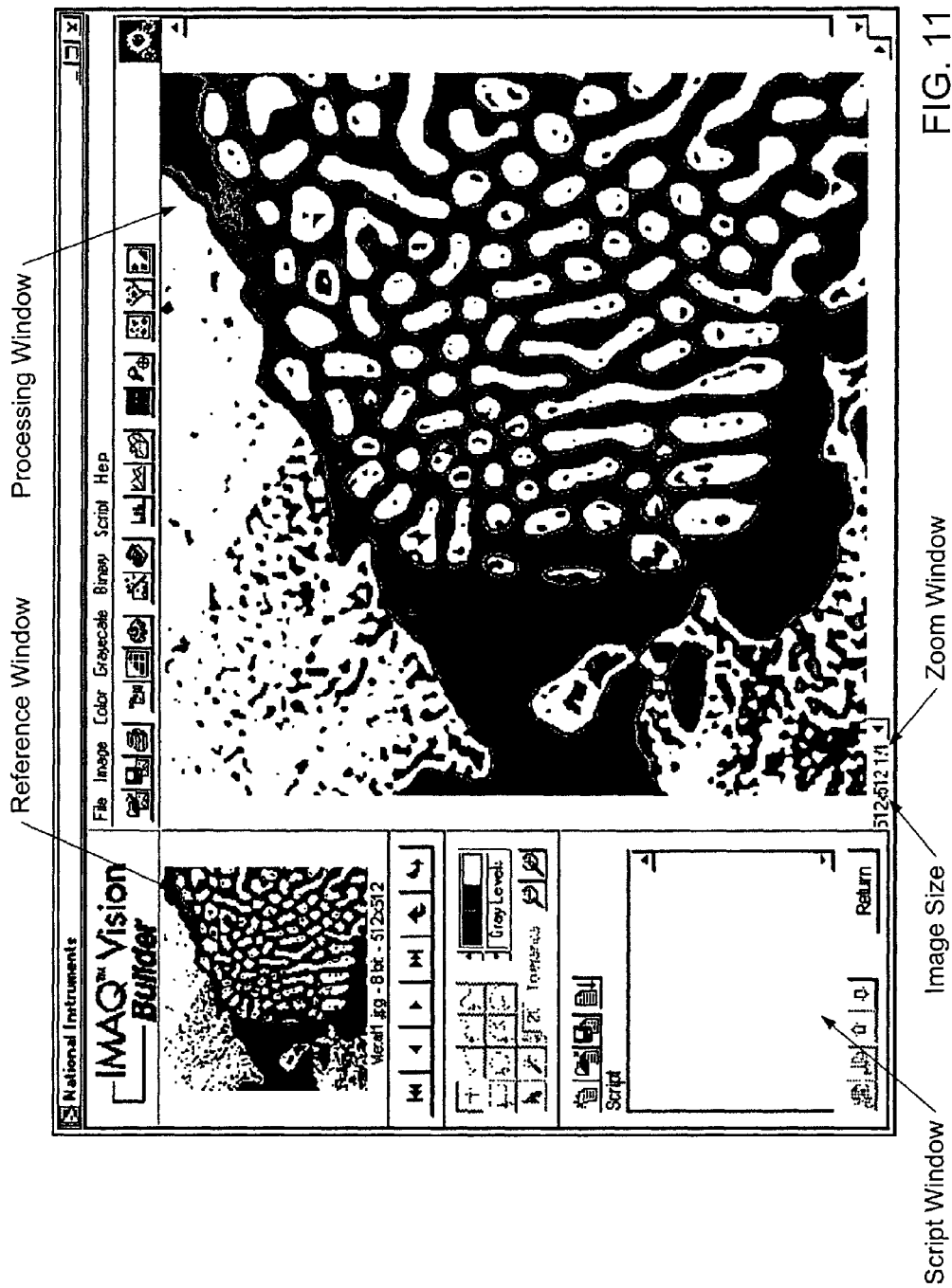
FIGS. 11-18 illustrate an exemplary graphical user interface for one embodiment of an image processing prototyping environment.

FIG. 11 illustrates an exemplary user interface for one example of a prototyping environment, an image processing prototyping environment. The image processing prototyping environment may enable a user to easily load an image and quickly apply various image processing functions or operations to the image, immediately seeing the results. The image processing operations selected and applied by the user are preferably recorded as a script. In this case, the image processing operations in the script may comprise the prototype. Once the desired image processing function (algorithm) has been developed, the image processing prototyping environment may then automatically configure a hardware device to perform the image processing function, or may generate a standalone program that implements the image processing function, and this program may then be used in configuring the hardware device.

In various embodiments, the image processing prototyping environment may be operable to load and manipulate any of various types of images, including gray-level and color images. The prototyping environment may also support complex images in which pixel values have a real part and an imaginary part. The images may be obtained from any of various sources. The images may, for example, be obtained from an image file, such as a BMP, TIFF, AIPD, PNG, JPG, or GIF file, or a file formatted according to another image format. The images may also be obtained from a hardware device, such as a camera or from any of various other types of devices, including framegrabbers, etc.

The image processing prototyping environment may support any of various image processing functions or operations. As used herein, the term "image processing" may include image processing, image analysis, and machine vision functions or operations, among others.

Image processing functions for processing an image may include functions such as:
 filtering functions for smoothing, edge detection, convolution, etc.
 morphology functions for modifying the shape of objects in an image, including erosion, dilation, opening, closing, etc.
 thresholding functions for selecting ranges of pixel values in grayscale and color images
 particle filtering functions to filter objects based on shape measurements The term "image processing" may also include functions for performing various types of image analysis, including:
 a histogram function that counts the total number of pixels in each grayscale value and graphs it
 a line profile function that returns the grayscale values of the pixels along a line drawn through the image with a line tool and graphs the values particle analysis functions that computes such measurements on objects in an image as their areas and perimeters a 3D view function that displays an image using an isometric view in which each pixel from the image source is represented as a column of pixels in the 3D view, where the pixel value corresponds to the altitude.

The term "image processing" may also include functions useful in machine vision applications, including:

an edge detection function that finds edges along a line drawn through the image with a line tool a pattern matching function that locates regions of a grayscale image that match a predetermined template a shape matching function that searches for the presence of a shape in a binary image and specifies the location of each matching shape a caliper function that computes measurements such as distances, areas, and angles based on results returned from other image processing functions a color matching function that quantifies which colors and how much of each color exist in a region of an image and uses this information to check if another image contains the same colors in the same ratio It is noted that the image processing functions listed above are exemplary only and that, in various embodiments of the image processing prototyping environment, other types of image processing functions or operations may be supported.

The user interface of the image processing prototyping environment may enable the user to load or select an image and easily select image processing functions to apply to the image. One element illustrated in FIG. 11 is labeled as a "reference window". FIG. 11 also illustrates a "processing window". As the user applies various image processing functions to the loaded image, the processing window may display the resulting image, while the reference window displays the original unmodified image. The user may select an image processing function to apply by choosing the desired function from a menu bar or by clicking on an icon, etc.

The FIG. 11 user interface also illustrates a "script window". Each image processing function that the user applies to the image may be displayed in this script window. The image processing operations that a user applies to an image may result in a script of image processing operations specifying an algorithm that can be applied to analyze or manipulate other images. As an example, FIGS. 12-18 illustrate a process of developing an image processing script (prototype) useful for "blob analysis".

A "blob" (Binary Large OBject) is a connected region or grouping of pixels in an image in which all pixels have the same intensity level. In a binary image, the background is zero, and every non-zero pixel is part of a binary object. Finding the size, number, or location of blob regions in an image may be useful for many applications, such as detecting flaws on silicon wafers, detecting soldering defects on electronic boards, locating objects in motion control applications, etc.

Figure 12:
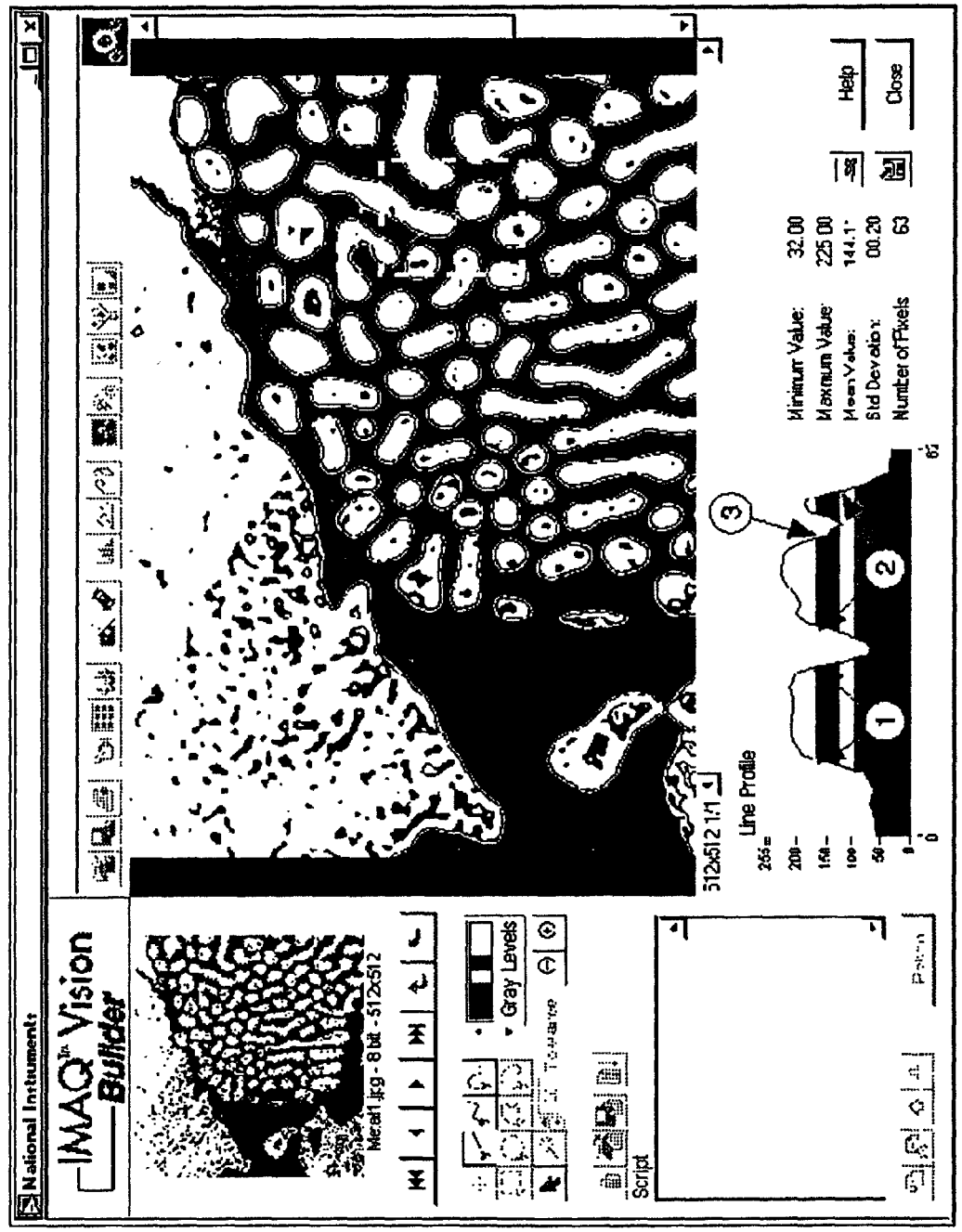

FIG. 12 illustrates an image for which the user desires to perform blob analysis. In FIG. 12, the user has selected a line profile tool and has drawn a straight line through a portion of the image in the processing window. A rectangle in the processing window indicates the location of this line. In response, the prototyping environment displays grayscale values of the line drawn with the line profile tool, such as the minimum and maximum pixel values, in the bottom of the window. Note that details regarding the image processing functions applied in FIGS. 12-18 are omitted. For background information on image processing in general or the particular image processing functions referred to herein, please refer to available literature, such as the *IMAQ Vision User Manual*, available from National Instruments Corporation.

Figure 13:
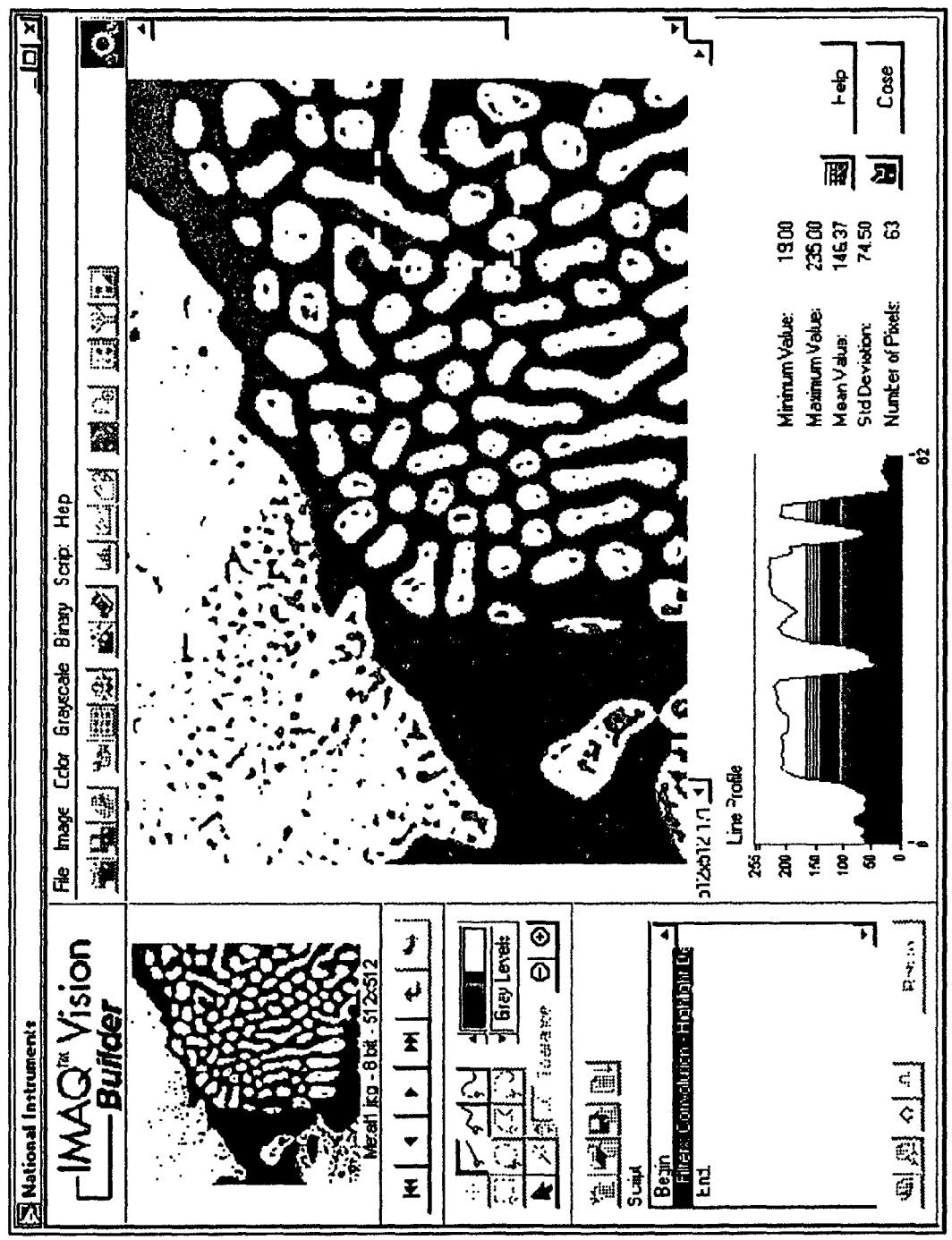
Figure 14:
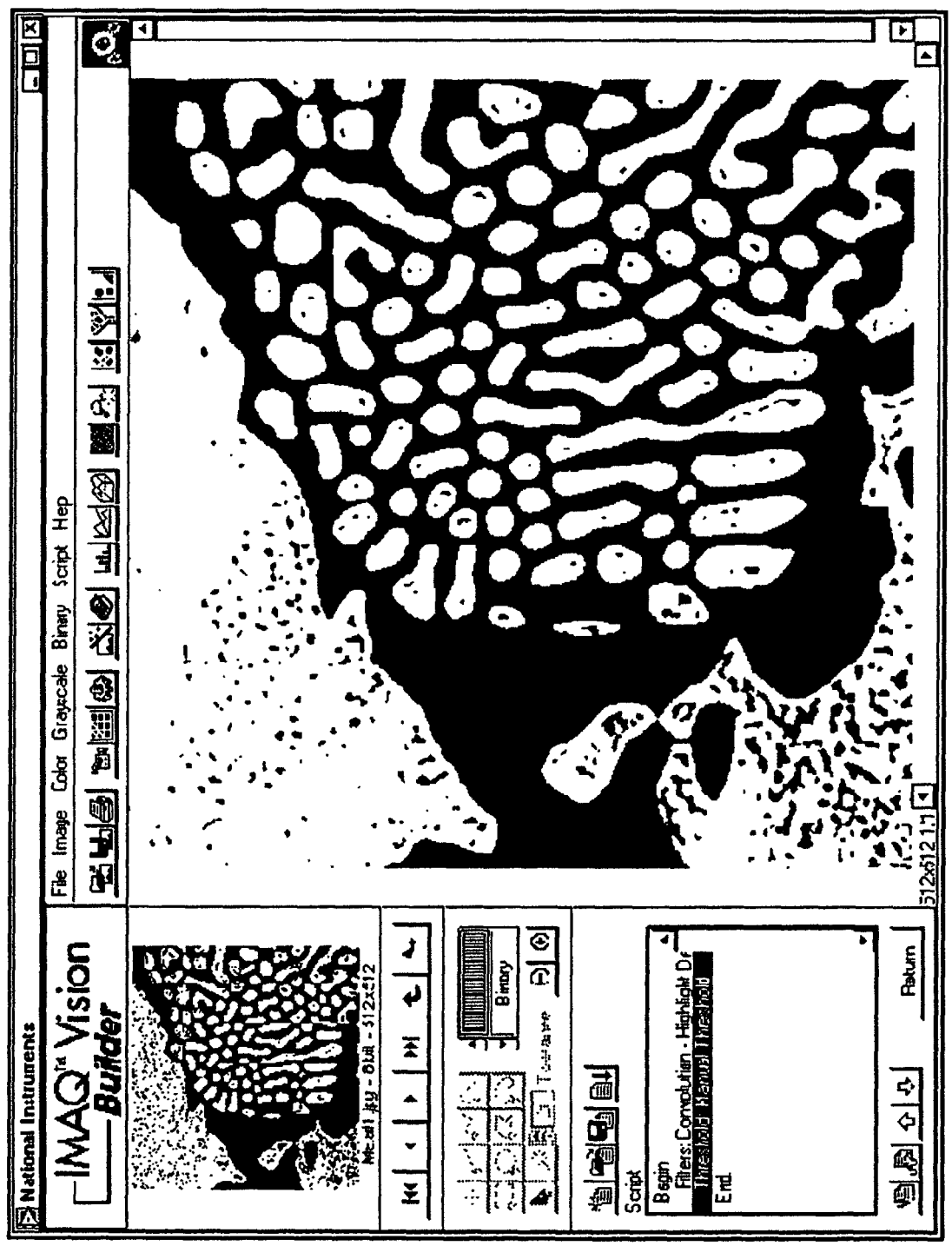

Based on the line profile grayscale values shown in FIG. 12, the user may then apply a filter to the image, e.g., to sharpen edges in the image and to create contrast between the particles and the background. The prototyping environment may provide various types of filters that may be applied, e.g., by selecting the desired filter from a menu bar. FIG. 13 illustrates the resulting image after the user has applied a "Convolution—Highlight Details" filter to the original image. Due to this filter operation, the FIG. 13 image appears to be sharper than the original image. Note that the filtering operation the user applied is recorded in the script window of FIG. 13. Note also that the grayscale values of a line drawn with the line profile tool have changed from the values shown in FIG. 12.

The next step the user may want to perform in the blob analysis is a thresholding operation to separate the particles from the background. A thresholding operation converts the grayscale image to a binary image, keeping the pixels of interest and removing the remaining pixels. The FIG. 14 processing window illustrates the results of applying a thresholding operation in which pixels with a value of 130 to 255 are kept and other pixels are removed. The thresholding operation applied to the image is recorded in the script window of FIG. 14.

For each type of image processing function supported, the image processing prototyping environment may be operable to display intermediate windows or screens that the user interacts with. These intermediate windows or screens may enable the user to specify various parameters or settings that apply to a particular image processing function. When the image processing function is added to the script, the specified parameters may be associated with the image processing function. Various image processing functions may have output parameters as well as input parameters.

Figure 15:
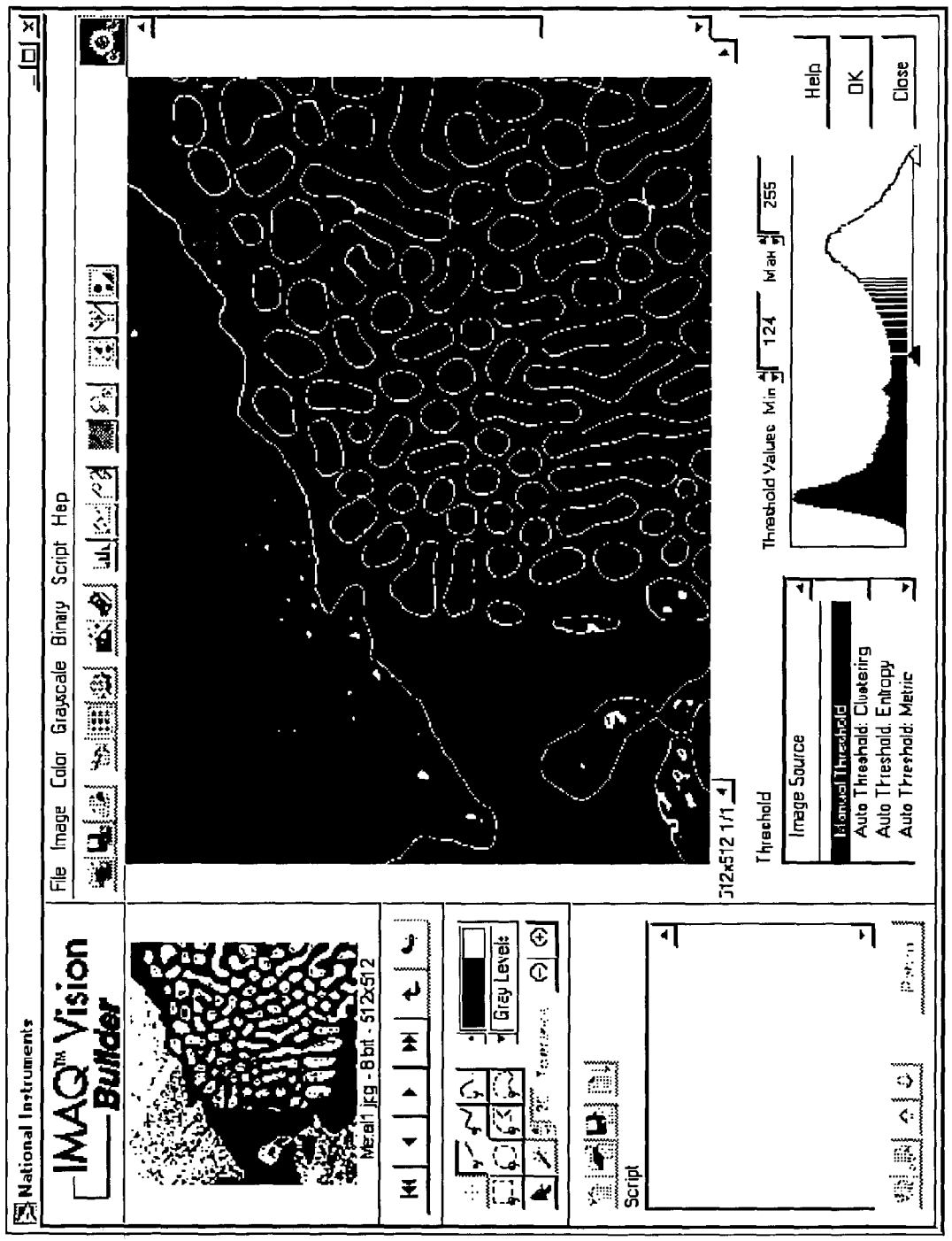
Figure 16:
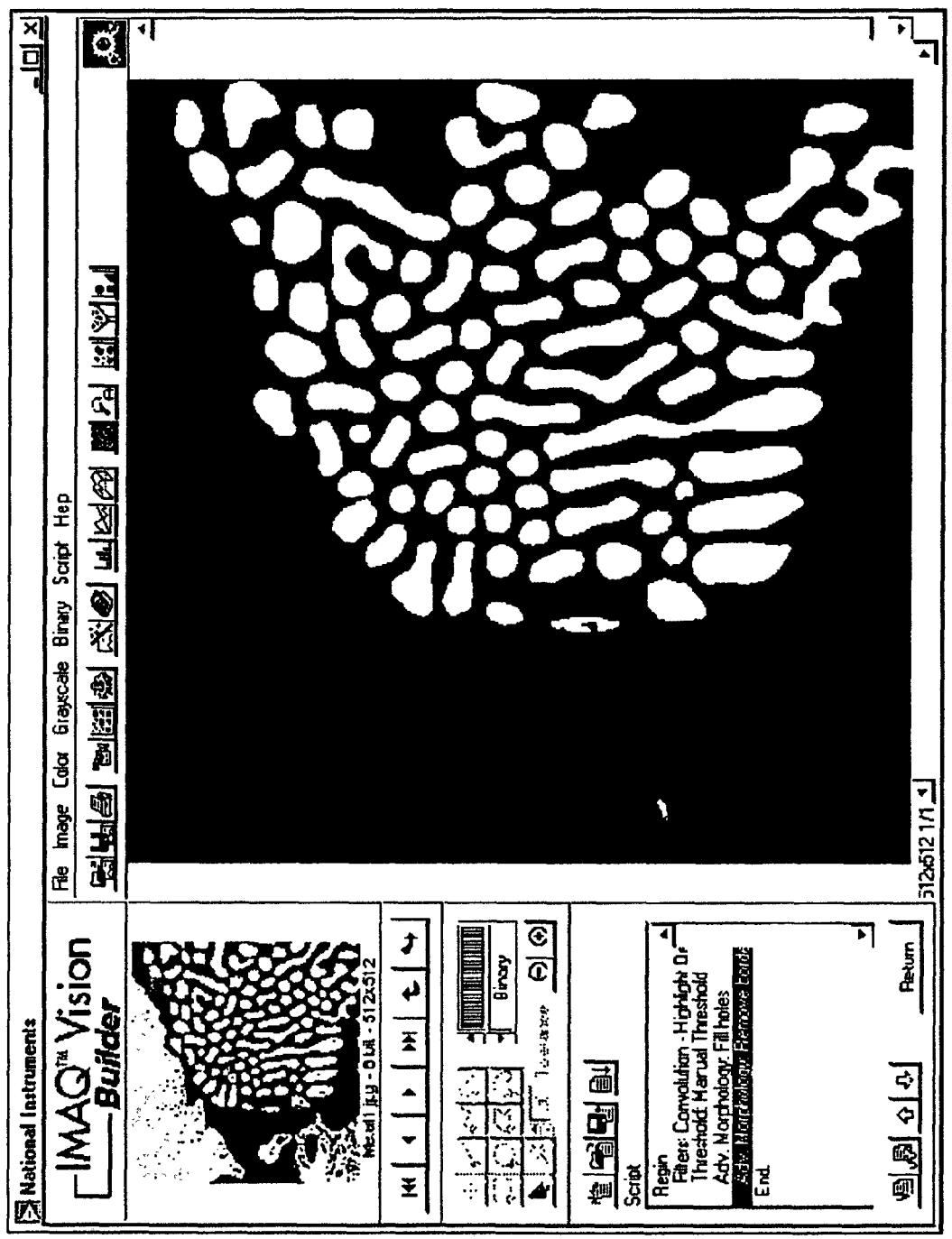
Figure 17:
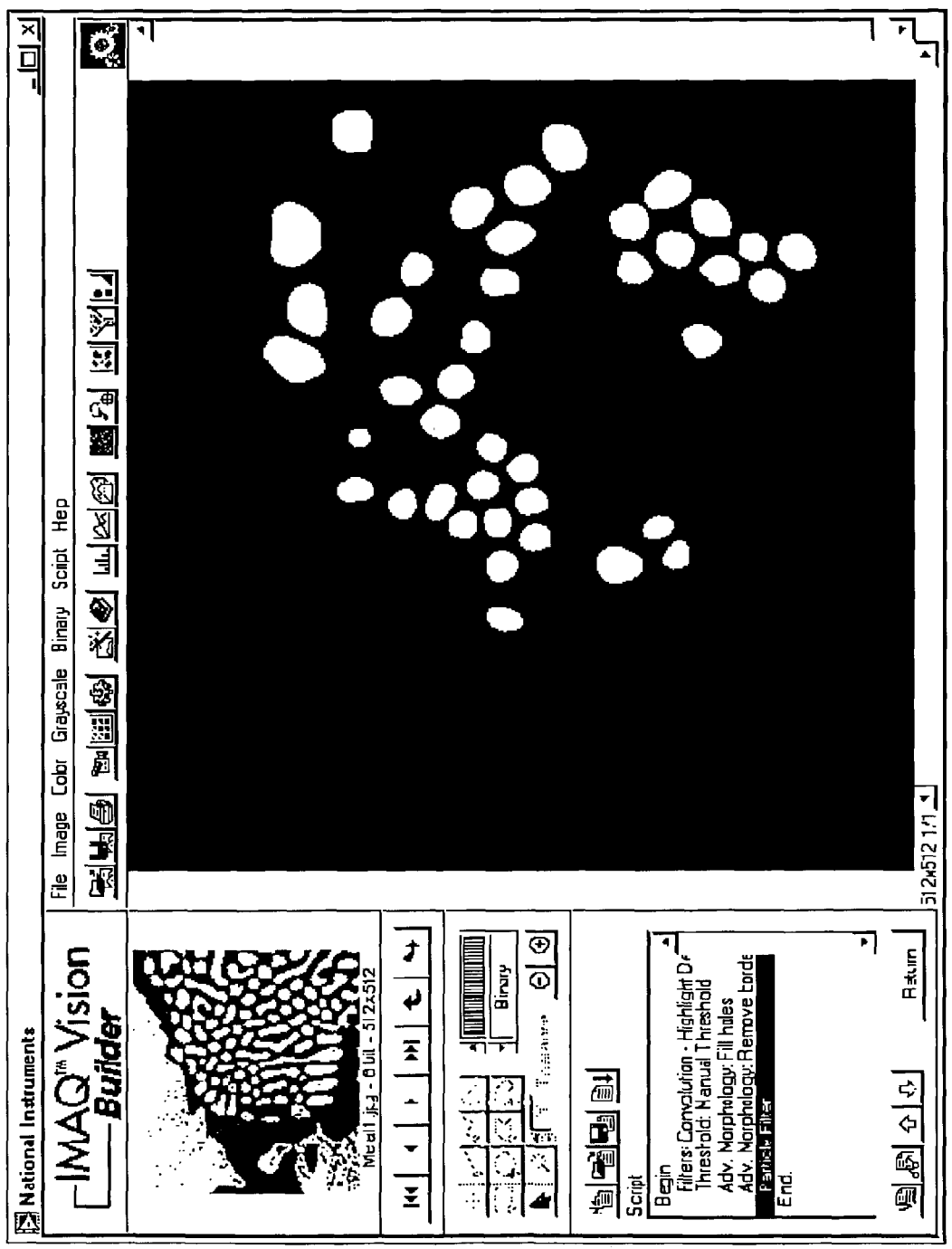

The process of developing an image processing algorithm may typically involve experimenting with various image processing functions and settings for the functions. However, FIGS. 12-18 omit such intermediate states and simply illustrate the result of applying each step in the algorithm to the image. For example, when performing a threshold operation, an intermediate screen such as shown in FIG. 15 may appear. FIG. 15 illustrates a selection box enabling the user to select the particular type of threshold operation to apply and illustrates an interactive graph with minimum and maximum threshold values that the user may adjust in order to find the desired threshold pixel values to use. When the threshold operation step is added to the script, the specified minimum and maximum values may be associated with the step.

Continuing with the blob analysis example, after the thresholding operation is applied, the FIG. 15 binary image is obtained. The FIG. 15 particles are referred to as blobs. The user may then apply morphological functions to the image, where the morphological functions affect each blob on an individual basis. The FIG. 16 processing window illustrates the results of applying two successive morphological functions to the image: a "Fill Holes" function to fill holes in the particles, and a "Remove Border Objects" function to remove objects that touch the border of the image. These morphological functions are also displayed in the FIG. 16 script window.

The user may next want to apply a particle filter function which isolates and keeps the circular blobs and removes the non-circular blobs from the image. The FIG. 17 processing window illustrates the results of applying such a particle filter. The particle filter operation is displayed in the FIG. 17 script window.

Figure 18:
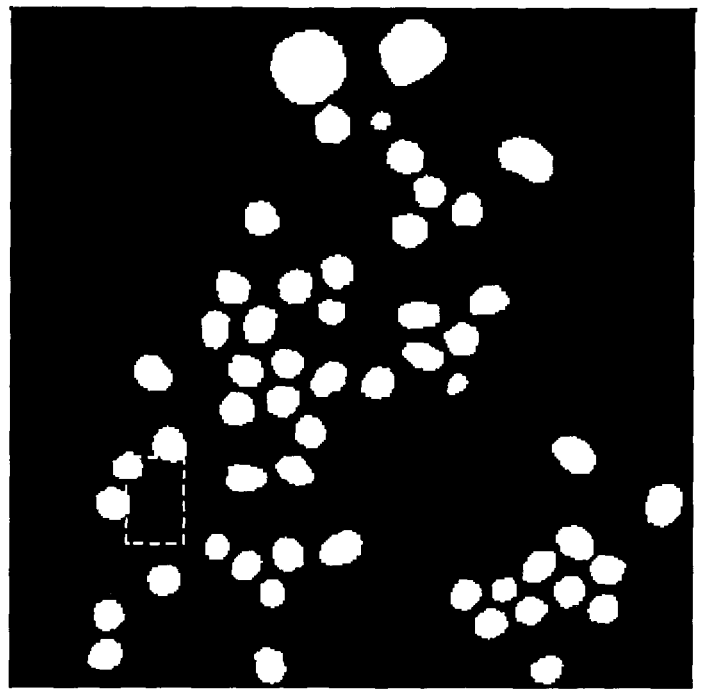
Figure 18:
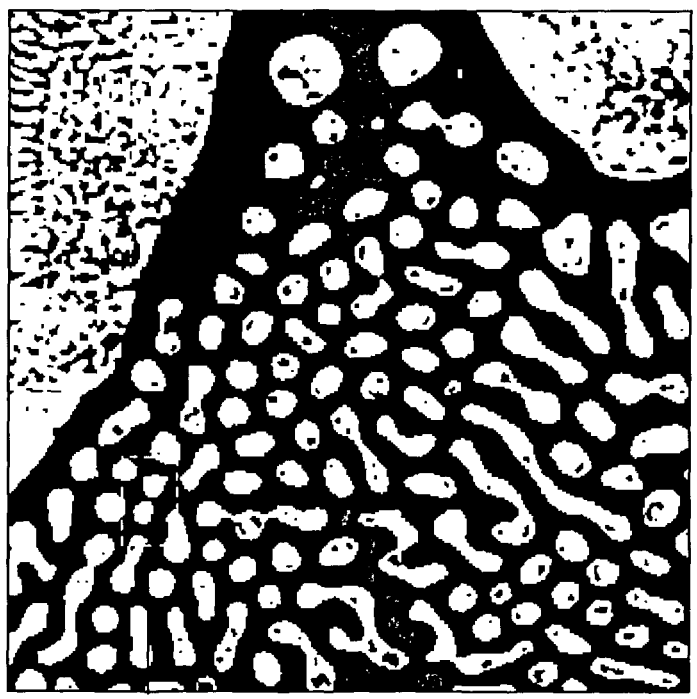

Once the user has developed the desired image processing algorithm in the image processing prototyping environment, the user may test the algorithm on other images. As described above, a script (prototype) describing each step of the algorithm may be recorded, and the prototyping environment may be operable to "replay" this script on other images. For example, FIG. 18 illustrates an original image (Metal3.jpg) and the image that results from applying the script described above for FIGS. 12-17. Notice that the resulting image is similar to the FIG. 17 result, in which circular blobs are isolated. Of course, the blob analysis algorithm discussed above is exemplary only, and image processing algorithms to perform any of various other types of image processing, manipulations, or analyses may be developed.

Figure 19:
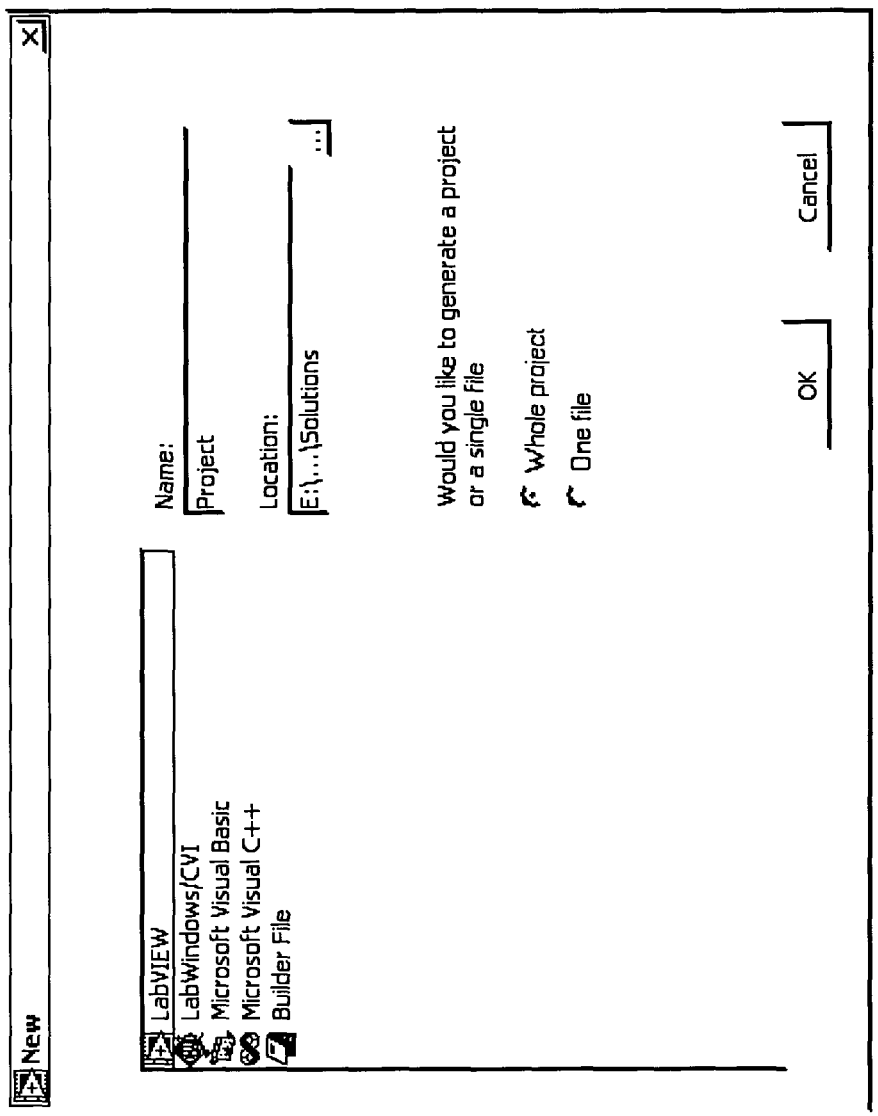
FIGS. 19-21 illustrate an examplary code generation wizard for receiving user input information related to a program to generate based on an image prototype.
Figure 20:
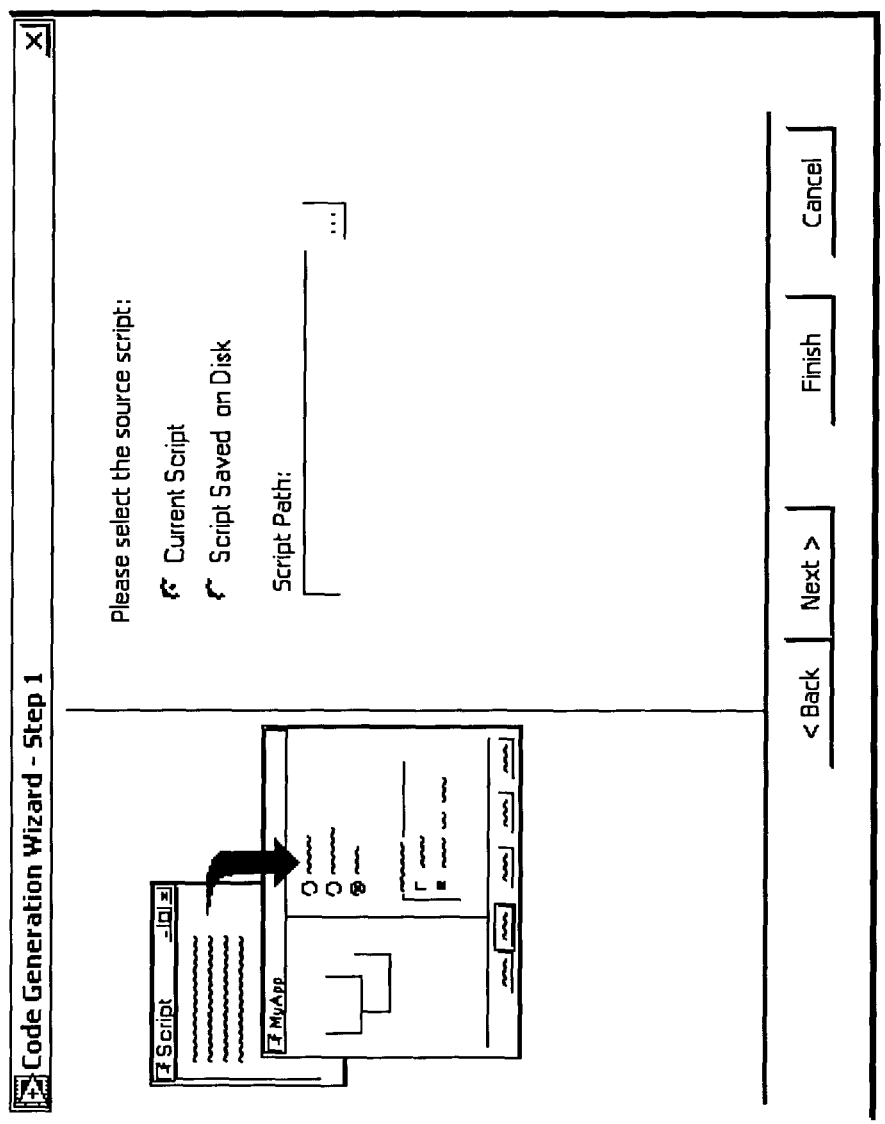
Figure 21:
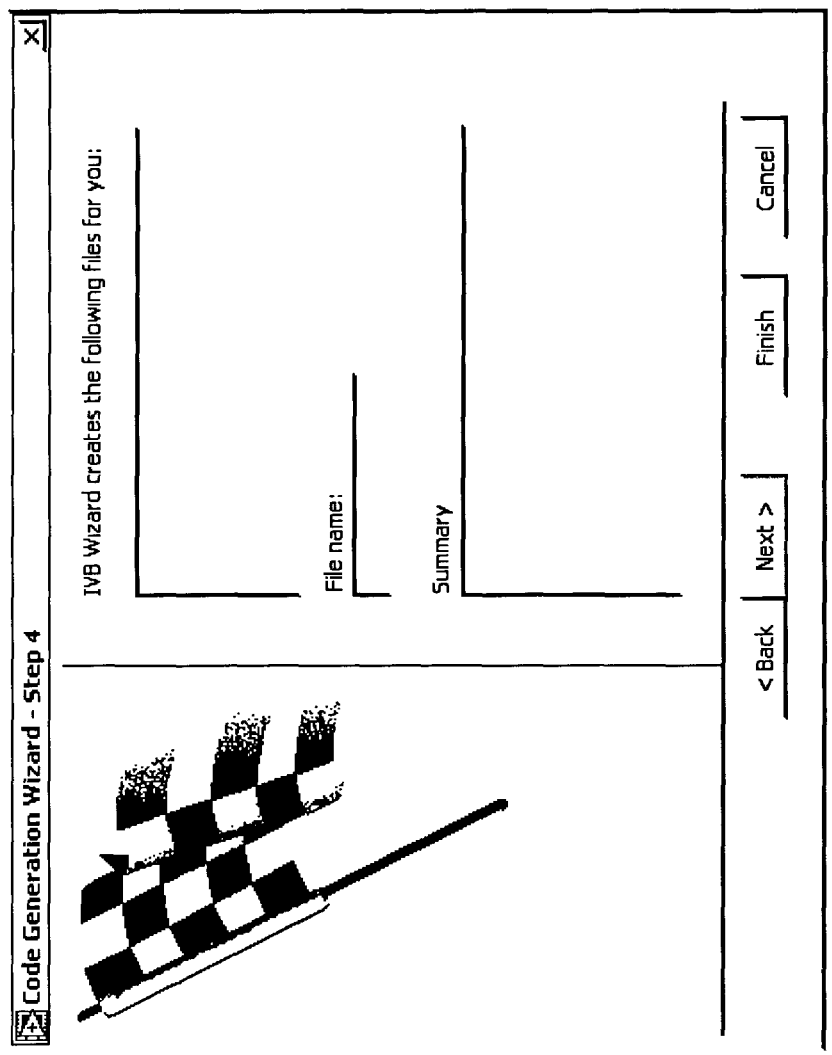

FIGS. 19-21: Requesting a Program to be Generated from a Script

As described above, in one embodiment, the image processing prototyping environment may be operable to programmatically generate a program based on a script o prototype, which may facilitate configuring a hardware device to perform the image processing algorithm specified by the script or prototype. In one embodiment, a code generation "wizard", i.e., a series of related user interface dialogs, may be employed to receive user input information related to the program to generate. FIGS. 19-21 illustrate an example of such a code generation wizard. For example, once the user has developed a script as described above, the user may then issue a command to generate a program from the script, and the code generation wizard may be displayed in response.

In various embodiments, any of various types of programs, including text-based and graphical programs, may be generated to implement the image processing algorithm. Thus, input specifying a type of program to create may be received. The input received may specify a particular programming language to use in generating the program and/or may specify a particular programming development environment where the generated program will be used. Many programming development environments support proprietary dialects of programming languages. If a particular programming development environment is specified, the generated program may utilize proprietary programming or development features, or may adhere to proprietary requirements.

FIG. 19 illustrates a user interface for receiving information specifying a program type to create. A selectable list of various programming development environments is shown. In this example, the list includes a graphical programming development environment, LABVIEW™, as well as various text-based programming environments, including LABWINDOWS™/CVI, Microsoft VISUALBASIC™, and MICROSOFT VISUAL C++™. In alternative embodiments, any of various other programming languages or development systems may be supported.

As shown in FIG. 19, the user may also specify whether to generate additional files or other elements associated with the generated program. For example, many programming development environments utilize proprietary file types, such as project files that specify information or settings for an application. For an embodiment supporting such programming development environments, the user may specify whether to generate only the file(s) implementing the program or to also generate a project file or other relevant files associated with the program.

Input specifying a particular script to use in generating the program may also be received. For example, a script developed as described above may be saved to a script file, which the user then specifies. Alternatively, a current script, i.e., a script that is currently open or in use, may be specified. FIG. 20 illustrates a user interface for receiving this information. In one embodiment, the current script is automatically used in generating the program.

The program may then be automatically generated. The program may be generated in any of various ways as appropriate for a particular programming language or program development environment. For example, each step recorded in a script may correspond to a particular function or group of functions (or to a particular node or group of nodes), and the prototyping environment may create a program that calls the appropriate functions. One or more files including program code may be generated. FIG. 21 illustrates a user interface for receiving input specifying a file name for a program file. Also, generating the program may comprise generating other files, e.g., project files, in addition to the file(s) specifying the program code.

Figure 22:
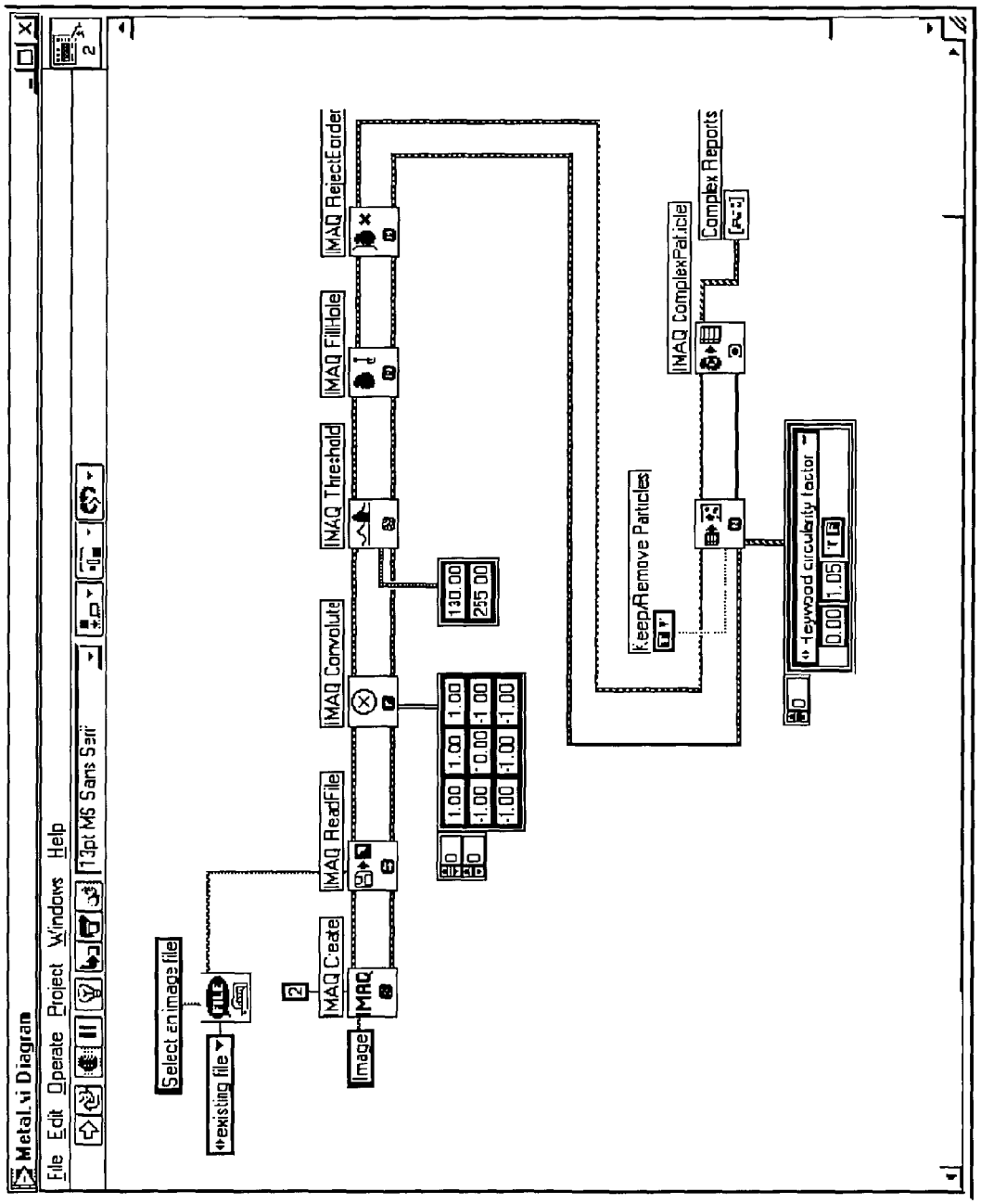
FIG. 22 illustrates an exemplary graphical program that was automatically (programmatically) generated based on an image processing prototype.

FIG. 22 illustrates an exemplary graphical program that is automatically generated from the image processing algorithm script example discussed with reference to FIGS. 12-18.

Figure 23:
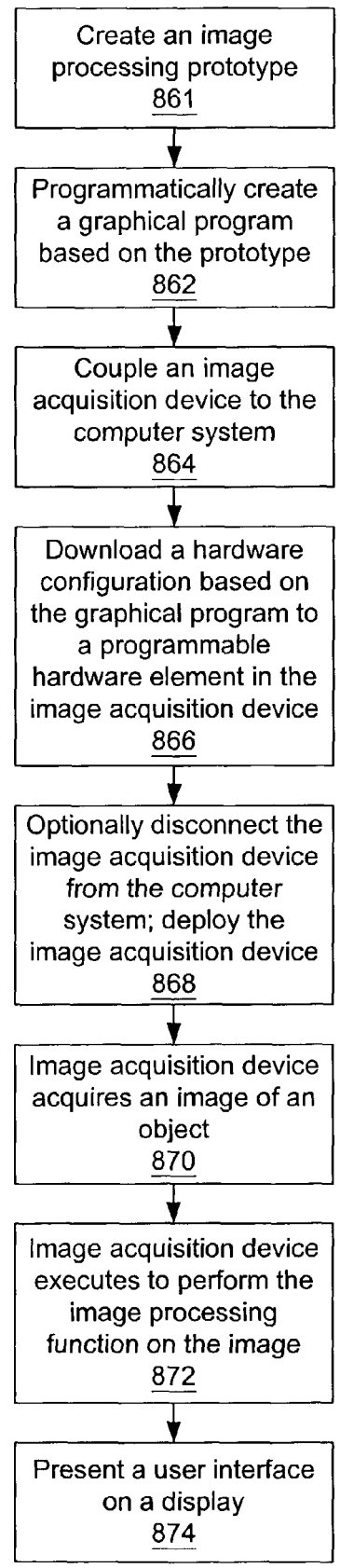
FIGS. 23 and 24 are flowchart diagrams illustrating exemplary embodiments of a method for configuring an image acquisition device or smart camera to execute a graphical program generated based on an image processing prototype.
Figure 24:
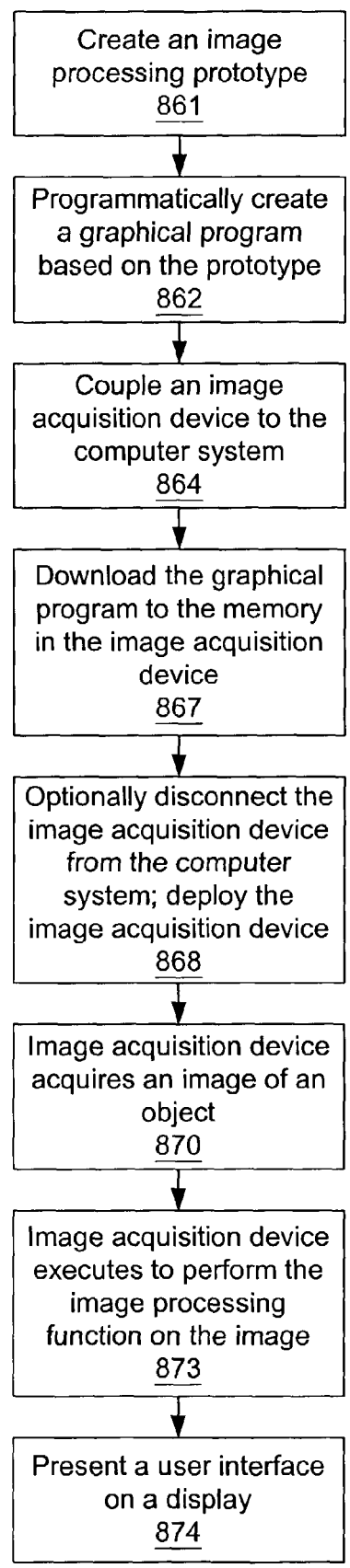

FIGS. 23 and 24—Configuring an Image Acquisition Device or Smart Camera to Execute a Graphical Program Based on an Image Processing Prototype FIG. 23 is an exemplary embodiment illustrating a method for configuring an image acquisition device, such as smart camera 190, to execute a graphical program based on an image processing prototype, where the image acquisition device includes a functional unit, more specifically, a programmable hardware element 206. It is noted that in various embodiments, various steps in the method may occur concurrently, or in a different order than shown. Additionally, some steps may be omitted, or additional steps performed which are not shown, as desired. As shown, this method may operate as follows.

In step 861, an image processing prototype may be created as described above.

In step 862, a graphical program based on the image processing prototype may be programmatically created as described above. The user may optionally modify the graphical program as described above.

In step 864 the image acquisition device (e.g., smart camera 190) may be coupled to the computer system 82. The image acquisition device (e.g., smart camera 190) may be coupled to the computer system 82 over a network, via communication cable(s), through wireless means, or by any other method of coupling, as desired. As noted above, the smart camera 190 may comprise a camera and a programmable hardware element 206. It is noted that the image acquisition device may be connected to the computer system 82 before, during or after the graphical program is created.

In step 866 a hardware configuration based on the graphical program may be downloaded onto the programmable hardware element 206 in the image acquisition device (e.g., smart camera 190) to configure the programmable hardware element 206. For example, in the embodiment where the image acquisition device is coupled to the computer system 82 over a network, deploying the graphical program may comprise the computer system 82 deploying the graphical program over the network to the image acquisition device. The hardware configuration corresponds to a hardware implementation of the graphical program. In one embodiment, downloading the hardware configuration onto the programmable hardware element 206 may comprise the following steps: generating a hardware description based on the graphical program, where the hardware description describes a hardware implementation of the graphical program; converting the hardware description into a netlist; compiling the netlist format into a hardware program file; and downloading the hardware program file to the programmable hardware element to configure the programmable hardware element. These steps are discussed below.

After the downloading step is performed, the programmable hardware element is configured with a hardware implementation of the graphical program. At this point, in step 868 the image acquisition device (e.g., smart camera 190) may be optionally disconnected from the computer system 82, and may possibly be deployed for operation. For example, in the case of smart camera 190, the smart camera 190 may be disconnected from the computer system 82 and deployed in a vision application, such as a manufacturing vision inspection application, a manufacturing assembly application, or other vision application. If the image acquisition device is an image acquisition card or board that is designed to be located in a slot of the computer 82, the image acquisition card or board may optionally remain in the computer system 82 for use, or may be transferred to a different computer system. Alternatively, the method described above may be repetitively used to manufacture a plurality of image acquisition devices (e.g., smart cameras 190) for later sale. As another alternative, the method described above may be used to configure an image acquisition device that has already been deployed, where the image acquisition device is configured over a network, i.e., where the hardware configuration is downloaded onto the image acquisition device (or other instrument) over a network.

After the programmable hardware element 206 in the image acquisition device (e.g., smart camera 190) is configured with a hardware implementation of the graphical program, the image acquisition device can be used in an application. Thus the image acquisition device or smart camera 190 may acquire an image of an object in step 870, e.g., from a camera, or the camera in smart camera 190 may acquire the image. The programmable hardware element 206 in the image acquisition device may then execute in step 872 to perform the image processing function on the image.

While the programmable hardware element 206 in the image acquisition device executes to perform the image processing function on the image, if the graphical program includes a user interface portion, this user interface portion may optionally be presented on a display during this time in step 874. The code corresponding to the user interface portion may be executed by a processor 160 in the computer system 82 or by a processor 212 on the image acquisition device. The user interface portion may operate as a front panel for the image acquisition device. The user may optionally provide user input to the user interface portion on the display to control the image acquisition device while the programmable hardware element 206 in the image acquisition device executes to perform the image processing function on the image. For example, the user interface portion may be compiled into executable code for execution by a processor (160 or 212) and stored in a memory (166 or 214) accessible by the processor. The processor may then execute the executable code (the user interface portion) from the memory to present the user interface portion on the display.

In an embodiment where the image acquisition device (or smart camera 190) includes the processor 212 and the memory 214, the processor 212 in the image acquisition device may execute the executable code from the memory 214 to present the user interface portion on the display during the image acquisition device (or smart camera 190) executing to perform the image processing function on the image.

In another embodiment, the processor 160 of the computer system 82 may execute the executable code from the memory 166 to present the user interface portion on the display during the image acquisition device (or smart camera 190) executing to perform the image processing function on the image.

FIG. 24 is an exemplary embodiment illustrating a method for configuring an image acquisition device, such as smart camera 190, to execute a graphical program based on an image processing prototype, where the image acquisition device (or smart camera 190) includes a functional unit, more specifically, a processor 212 and memory 214. The method shown in FIG. 24 is similar to the method described above with reference to FIG. 23, differing from that method only in steps 866 and 872. Thus, in describing this embodiment of the method, where the steps are the same as described above, an abbreviated description is provided. As noted above, in various embodiments, various steps in the method may occur concurrently, or in a different order than shown. Additionally, some steps may be omitted, or additional steps performed which are not shown, as desired. As shown, this method may operate as follows.

In step 861, an image processing prototype may be created as described above.

In step 862, a graphical program based on the image processing prototype may be programmatically created as described above. The user may optionally modify the graphical program as described above.

In step 864 the image acquisition device (e.g., smart camera 190) may be coupled to the computer system 82, such as over a network, communication cable(s), through wireless means, or by any other method of coupling, as described above with reference to FIG. 23, step 864.

In step 867 the graphical program may be downloaded to the memory 214 of the image acquisition device (e.g., smart camera 190). As mentioned above, downloading the graphical program onto the memory 214 may comprise the following steps: generating an executable program (an executable program) based on the graphical program which implements the functionality of the graphical program; and transferring the executable program to the memory 214 on the image acquisition device. As also mentioned above, downloading the graphical program onto the memory 214 may comprise downloading the graphical program (or executable program) onto the memory 214 over a network.

After the downloading step is performed, the image acquisition device is configured to perform the image processing function implemented by the graphical program. At this point, in step 868 the image acquisition device (e.g., smart camera 190) may be optionally disconnected from the computer system 82, and may possibly be deployed for operation, as described above in step 868 of FIG. 23.

After the image acquisition device (e.g., smart camera 190) is configured with the graphical program, i.e., after the graphical program is loaded into the memory 214, the image acquisition device can be used in an application. Thus the image acquisition device or smart camera 190 may acquire an image of an object in step 870, e.g., from a camera, or the camera in smart camera 190 may acquire the image. The image acquisition device may then execute to perform the image processing function on the image, as indicated in step 873.

While the image acquisition device executes to perform the image processing function on the image, if the graphical program includes a user interface portion, this user interface portion may optionally be presented on a display during this time in step 874, as described above in step 874 of FIG. 23.

In one embodiment, the user may optionally provide user input to the user interface portion on the display to control the image acquisition device while the image acquisition device (i.e., the processor 212 and memory 214) executes to perform the image processing function on the image.

In one embodiment, the image acquisition device executing to perform the image processing function on the image may comprise the processor 212 in the image acquisition device executing the graphical program from the memory 214. In the embodiment where the executable program is generated from the graphical program, the image acquisition device executing to perform the image processing function on the image may comprise the processor in the image acquisition device executing the executable program (in executable form) from the memory 214.

In one embodiment, the processor 212 in the image acquisition device may execute the executable code from the memory 214 to present the user interface portion on the display during the image acquisition device (or smart camera 190) executing to perform the image processing function on the image. In other words, the processor 212 may execute both portions of the graphical program concurrently, such as by threading or multi-tasking. In another embodiment, the image acquisition device (or smart camera 190) may include multiple processors, e.g., 212A and 212B, in which case the first portion of the graphical program (such as the user interface portion) may be executed by processor 212A from memory 214 (or a first memory 214A), while the second portion (such as the image processing portion) may be executed by processor 212B from memory 214 (or a second memory 214B), or from image memory 284.

FIGS. 25A-25F: Motion Control Prototyping Environment User Interface

FIGS. 25A-25F illustrate an exemplary user interface for another example of a prototyping environment, a motion control prototyping environment. The motion control prototyping environment may be designed to enable a user to easily and efficiently develop/prototype a motion control sequence without requiring the user to perform programming, e.g., without needing to write or construct code in any programming language. For example, the environment may provide a graphical user interface (GUI) enabling the user to develop/prototype the motion control sequence at a high level, by selecting from and configuring a sequence of motion control operations using the GUI. The motion control operations in the sequence may comprise the prototype.

A graphical user interface of the motion control prototyping environment may be displayed, wherein the graphical user interface provides graphical access to a set of motion control operations. In various embodiments, any of various motion control operations may be provided. For example, the set of operations may include operations such as: a reference operation (to establish home and index), a straight-line move operation, an arc move operation, a contoured move operation, a gearing operation, etc.

User input to the graphical user interface may be received, wherein the user input specifies a desired sequence of the motion control operations. For each operation added to the motion control sequence, the user may configure or customize the operation, e.g., by interacting with a graphical panel or dialog. The user is preferably not required to specify or write any program source code to implement the motion control sequence. Instead, the motion control sequence may be specified graphically by interacting with the graphical user interface of the motion control prototyping environment. The motion control prototyping environment may also enable the user to preview various aspects of the motion performed by the sequence, e.g., velocity profile, acceleration profile, position plots, etc.

In the particular embodiment illustrated in FIGS. 25A-25F, the prototyping environment provides access to motion control operations only. However, as discussed above, other embodiments of the prototyping environment may provide access to machine vision (image processing) operations, DAQ operations, and/or other kinds of operations as well. In addition, in various embodiments of a motion control prototyping environment, the graphical user interface may take any of various forms, and the GUI illustrated in FIGS. 25A-25F is exemplary only.

Figure 25A:
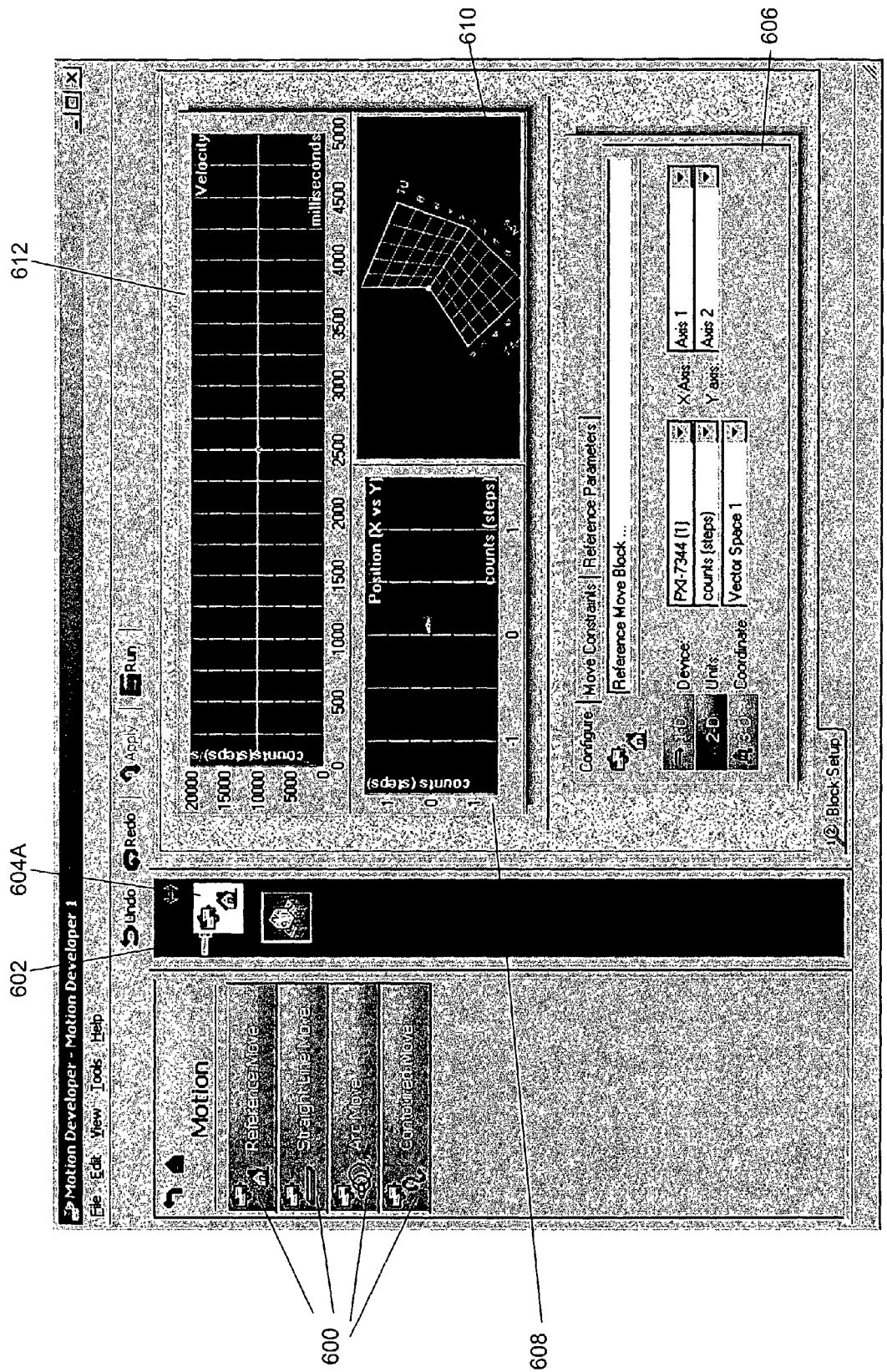
FIGS. 25A-25F illustrate an exemplary graphical user interface (GUI) for one embodiment of a motion control prototyping environment application.

As shown in FIG. 25A, the GUI includes several buttons 600 which the user may press to add a new motion control operation to the motion control sequence, such as a reference operation, a straight-line move operation, an arc move operation, or a contoured move operation.

The GUI also includes an icon strip 602 that displays icons representing the operations currently in the motion control sequence. In FIG. 25A, the motion control sequence includes only one operation, a reference move operation represented by the icon 604A.

The GUI also includes a graphical panel 606 that enables the user to configure a currently selected motion control operation. The properties displayed on the graphical panel 606 may differ for each possible type of move operation. In FIG. 25A, the only operation currently in the motion control sequence is selected, i.e., the reference move operation. Thus, the graphical panel 606 displays properties of this reference move operation. As shown, the graphical panel includes multiple tabs labeled, "Configure", "Move Constraints", and "Reference Parameters". The user may select the desired tab to view/edit the desired properties of the selected operation.

The GUI also includes three views of the motion that the sequence is configured to perform. These include a two-dimensional view 608 and a three-dimensional view 610 of the cumulative movement specified by the sequence, as well as a graph 612 indicating a velocity profile for the sequence. The reference operation may cause movement. However, as the reference move seeks or finds the reference (home and index) length of the move, the move is not known, and hence the geometry is not displayed.

Figure 25B:
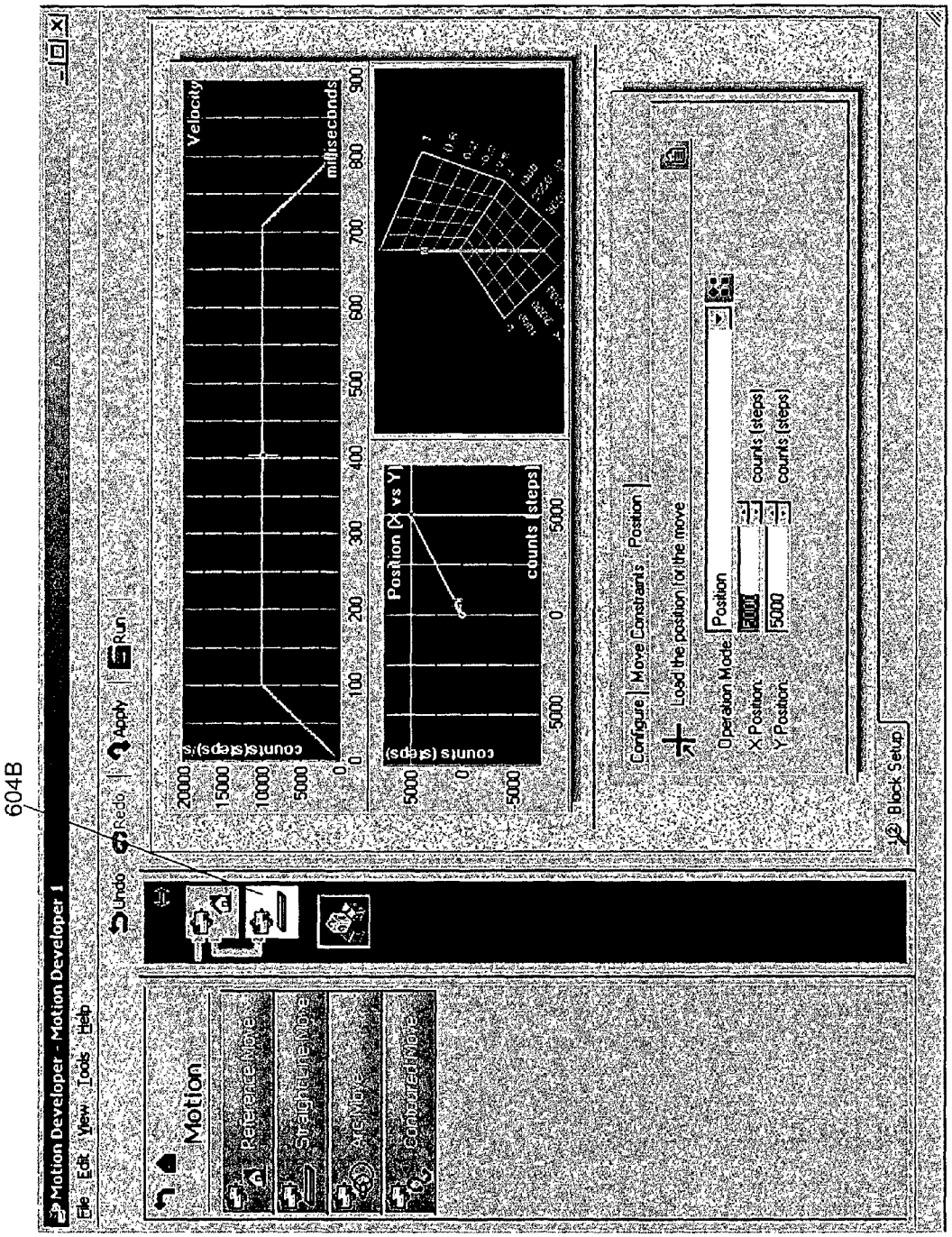

FIG. 25B illustrates the GUI after the user has included a straight-line move operation in the sequence, represented by the icon 604B in the icon strip 602. In FIG. 25B, this straight-line move operation is currently selected, and the "Position" tab of the graphical panel 606 displays some of its properties. When the move is initially added to the sequence, it may have default property values, such as the illustrated values of 5000 for both the X and Y positions. (The X and Y position values specify the desired ending location for the motion control device performing a straight-line move from the starting location.) In one embodiment, the user may configure the default property values to use when an operation is initially added to a sequence. The views 608, 610, and 612 visually indicate the effect of performing the straight-line move operation, as it is currently configured.

Figure 25C:
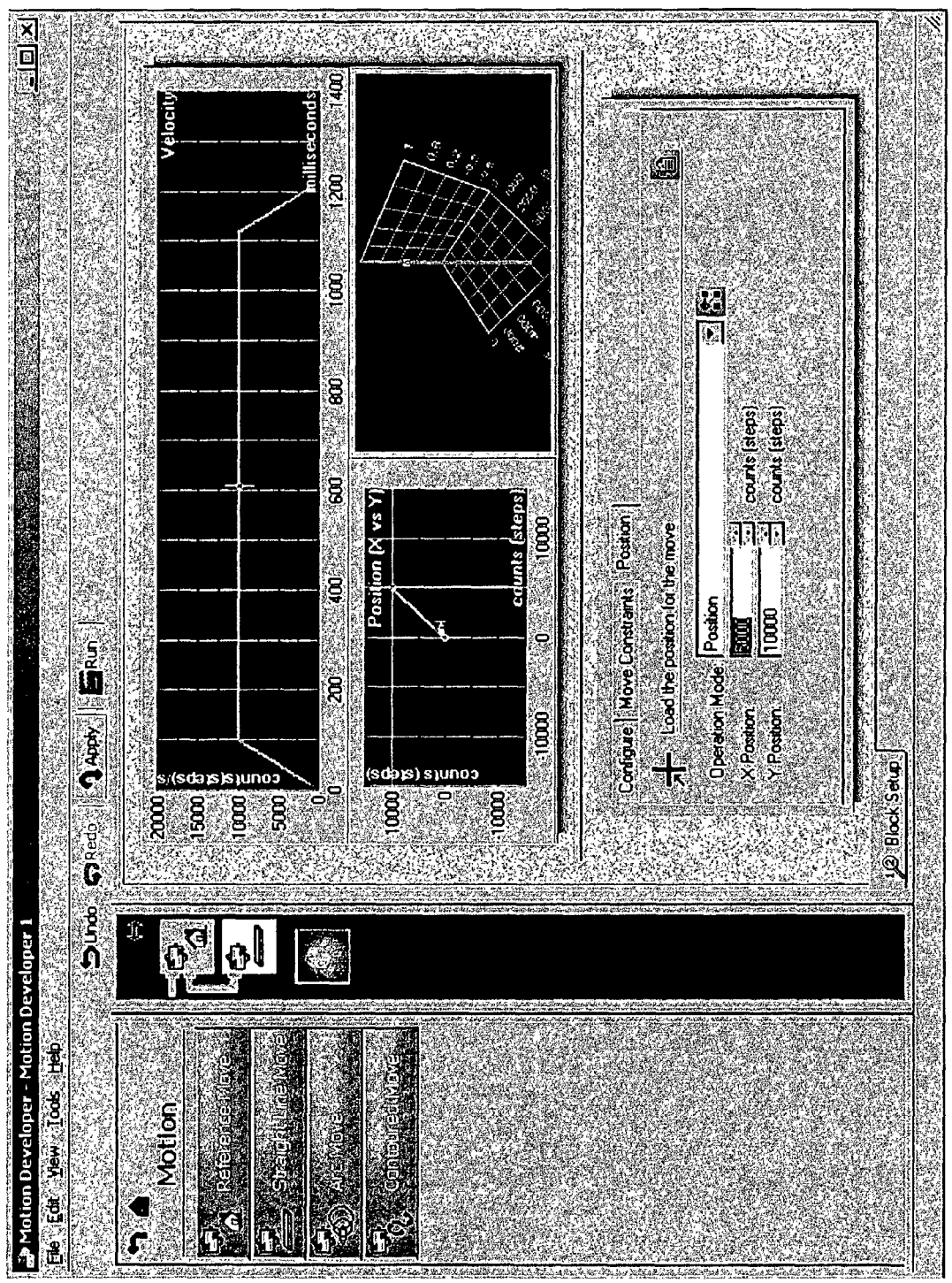

In FIG. 25C, the user has changed the Y position property value from 5000 to 10000. Note that the views 608 and 610 are updated to illustrate the new Y position.

Figure 25D:
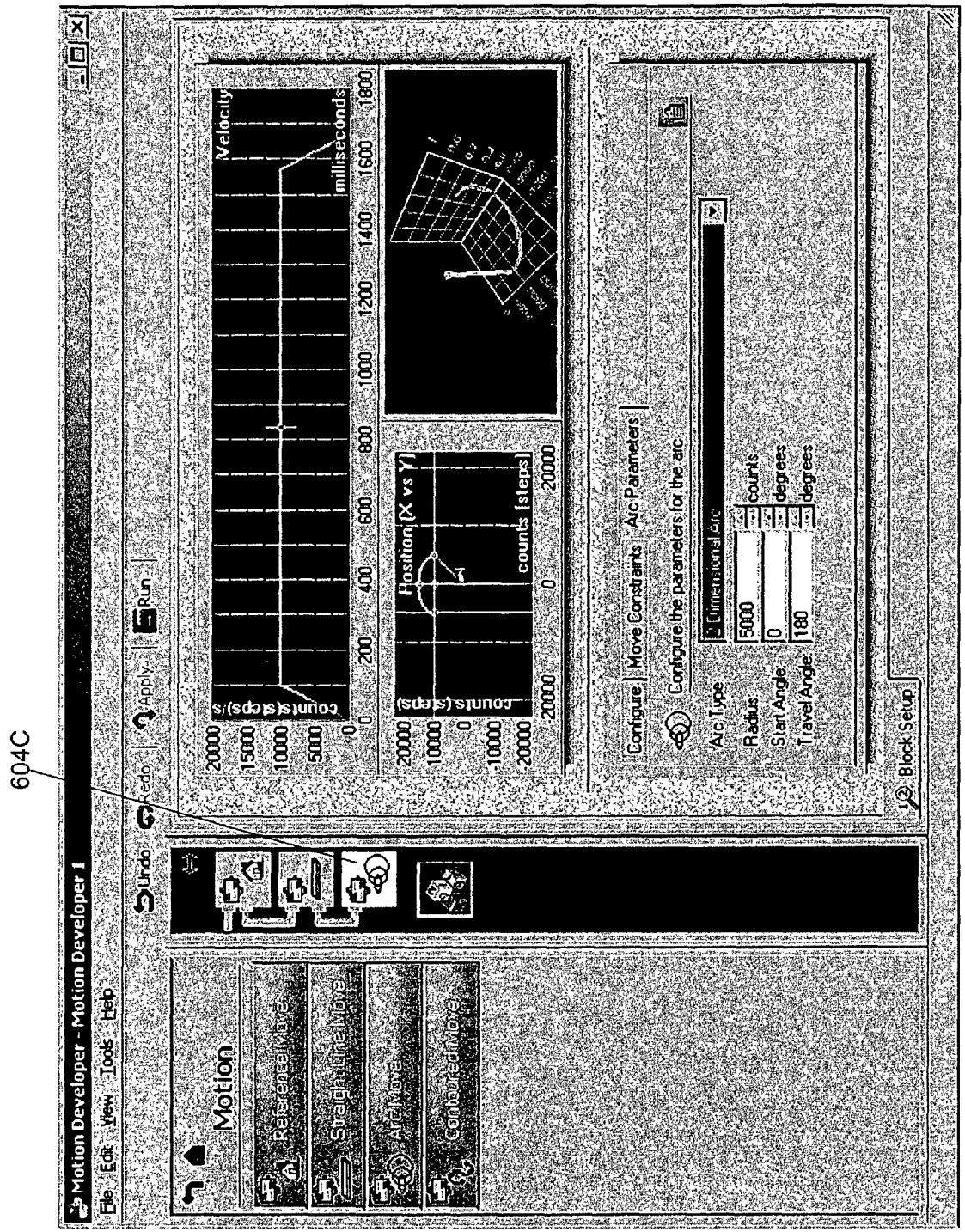

FIG. 25D illustrates the GUI after the user has included a two-dimensional arc move operation in the sequence, represented by the icon 604C in the icon strip 602. In FIG. 25D, this arc move operation is currently selected, and the "Arc Parameters" tab of the graphical panel 606 displays some of its properties. When the move is initially added to the sequence, it may have default property values, such as the illustrated values of 5000 for the radius, 0 for the start angle, and 180 for the travel angle. The views 608, 610, and 612 visually indicate the effect of performing the cumulative movement of the sequence as it is currently configured, i.e., the effect of performing the straight-line move operation followed by the arc move operation.

Figure 25E:
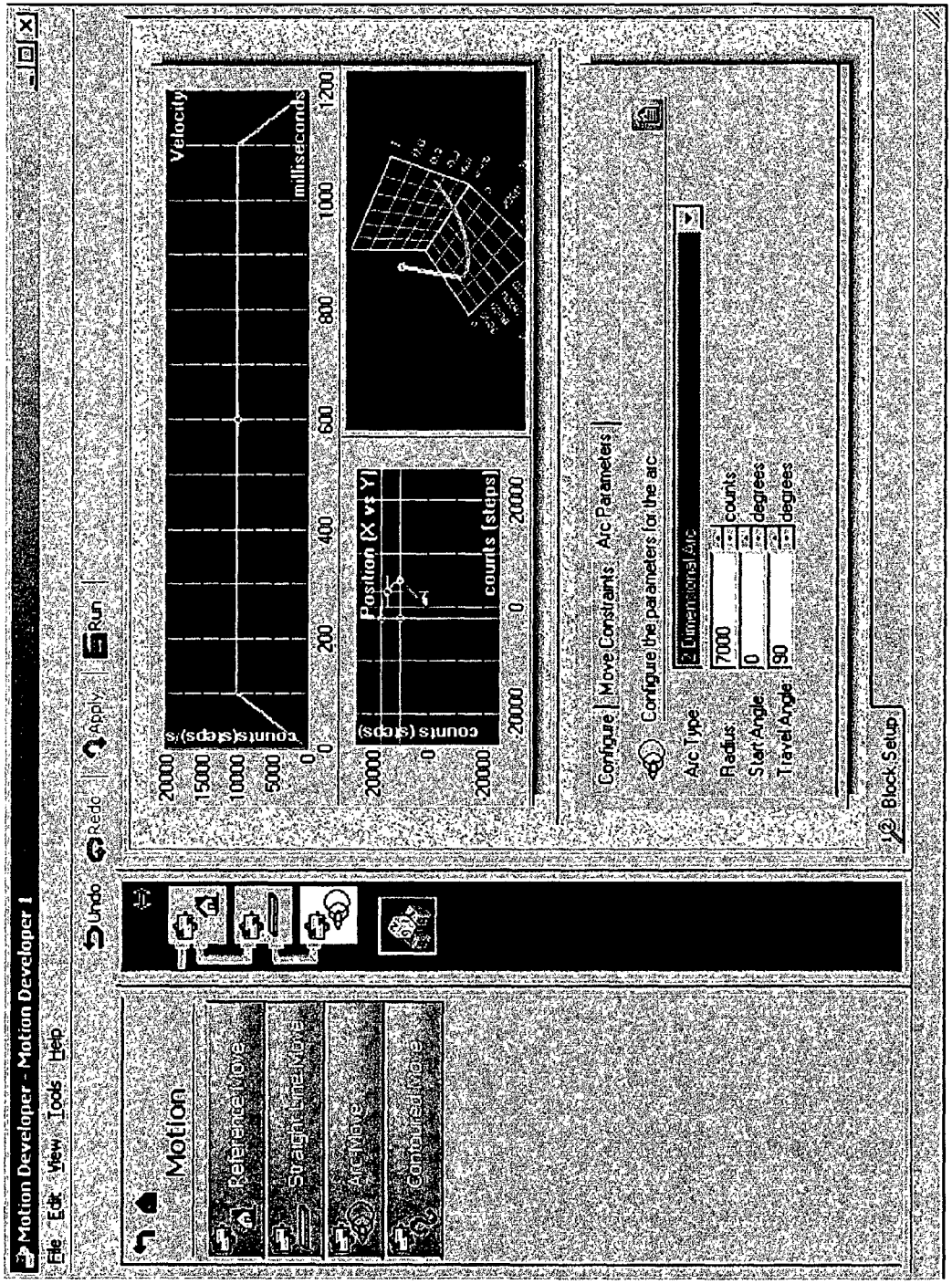

In FIG. 25E, the user has changed the radius property value from 5000 to 7000 and the travel angle property value from 180 to 90. Note that the views 608 and 610 are updated to illustrate the new motion performed by the motion control sequence.

Figure 25F:
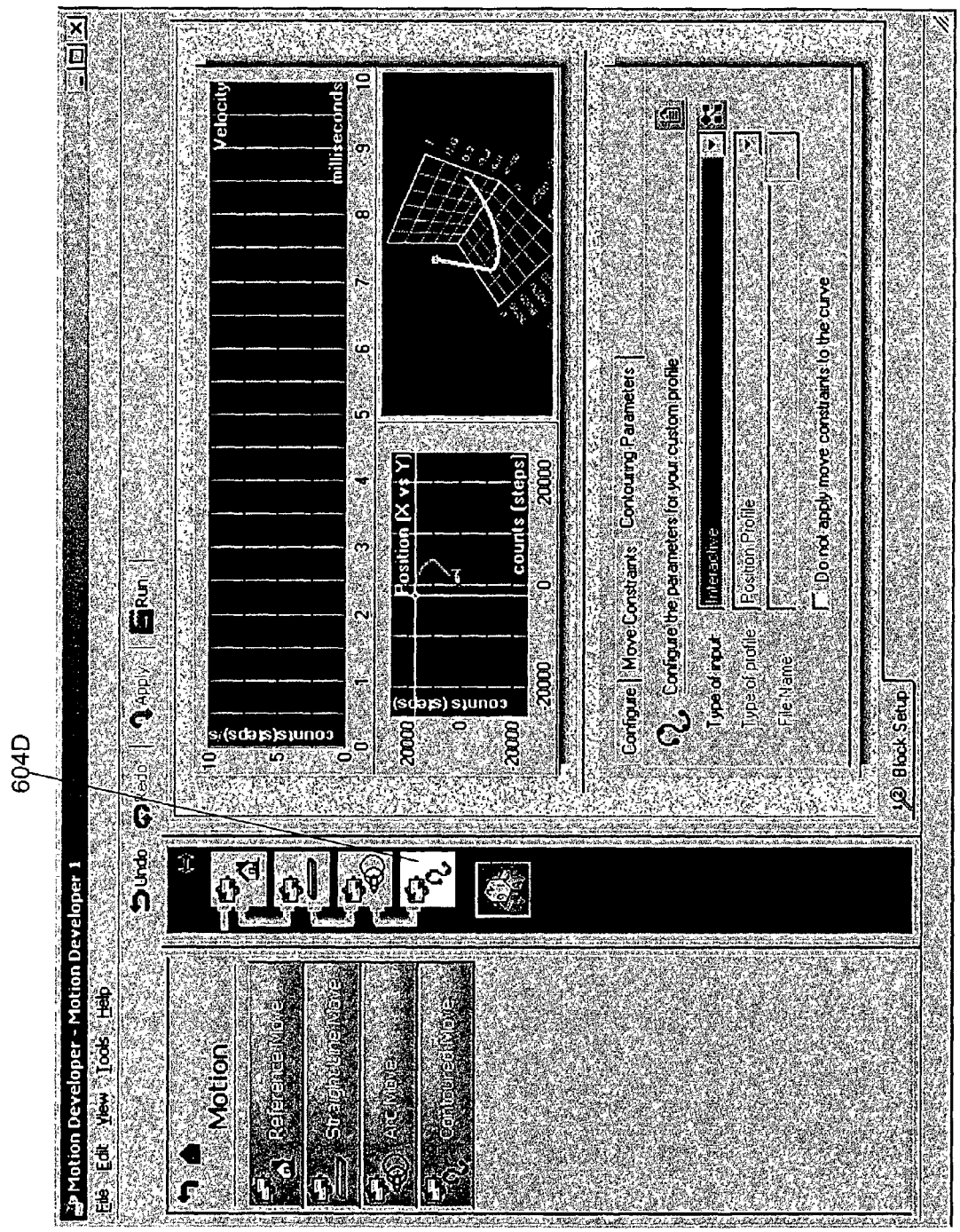
Figure 26A:
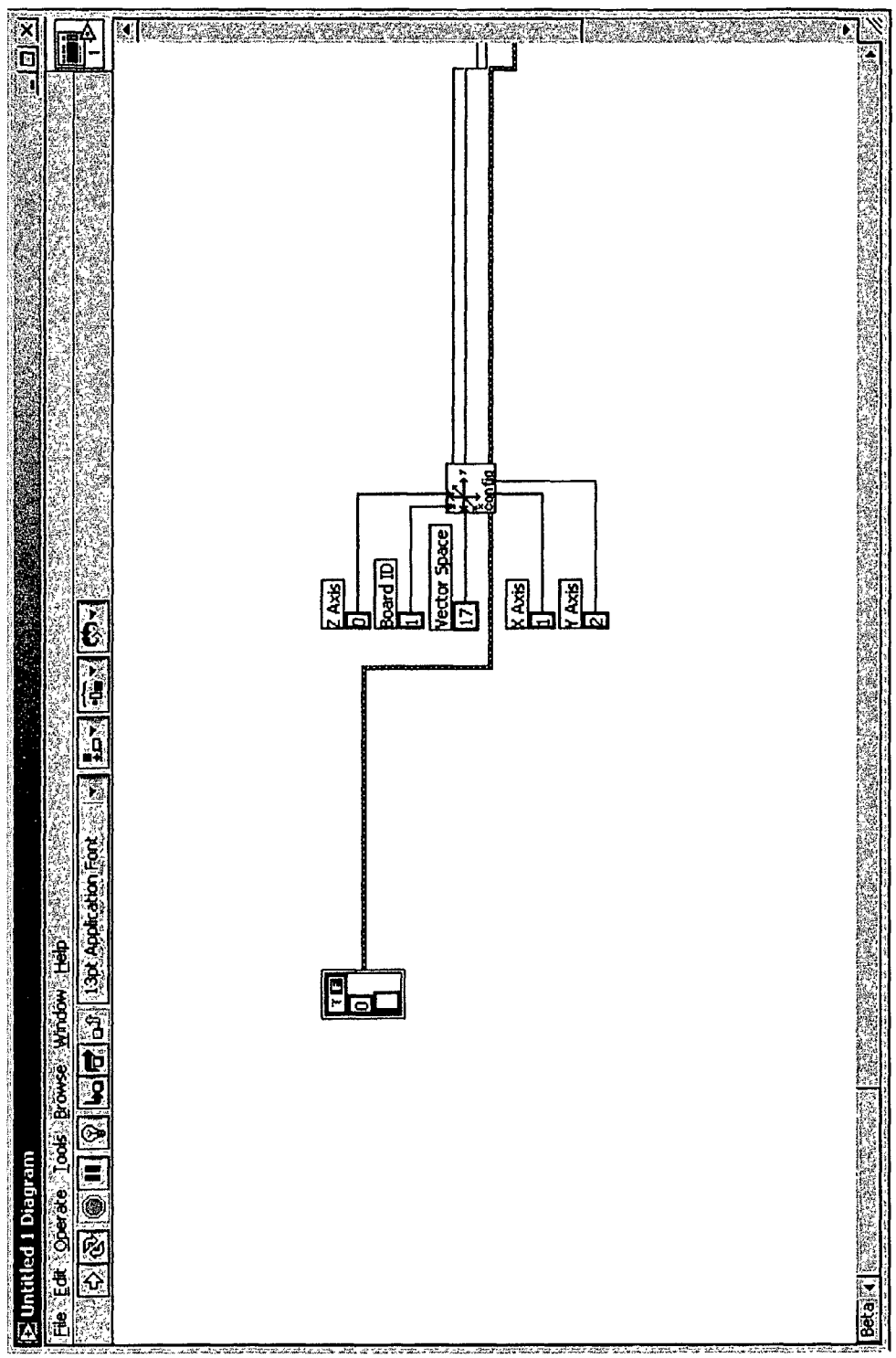
FIGS. 26A-26G illustrate a graphical program executable to implement the motion control prototype described with reference to FIGS. 25A-25F.
Figure 26B:
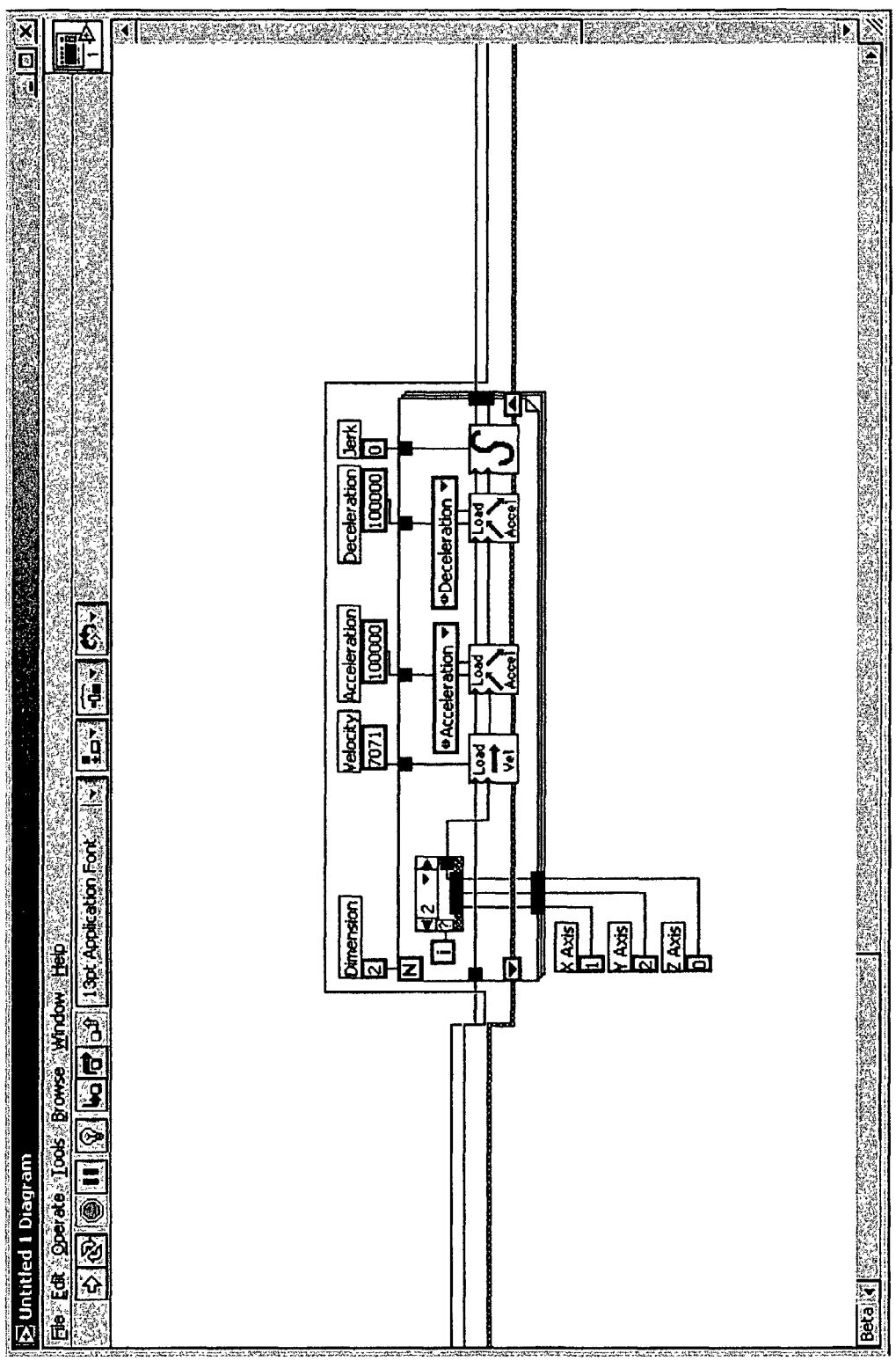
Figure 26C:
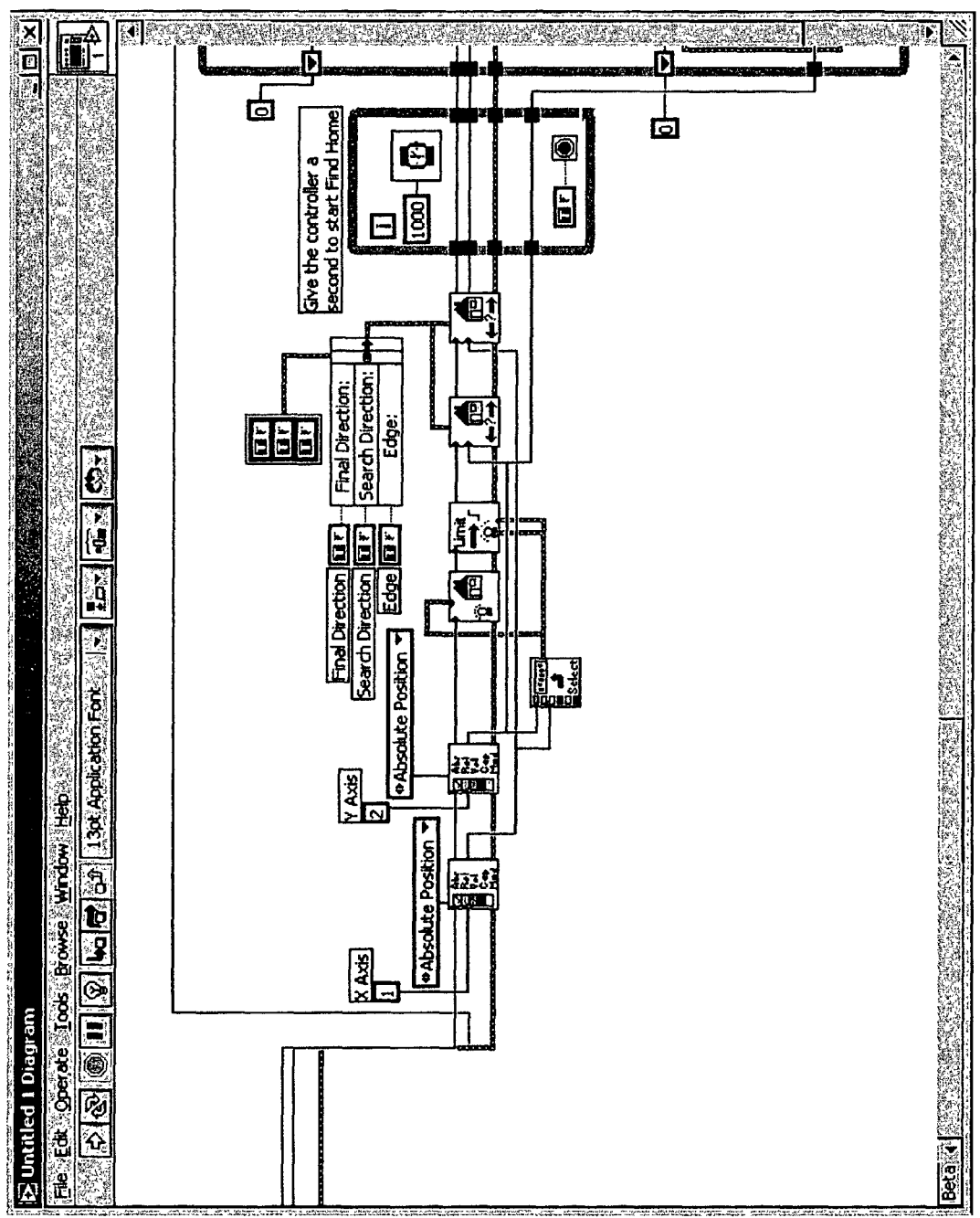
Figure 26D:
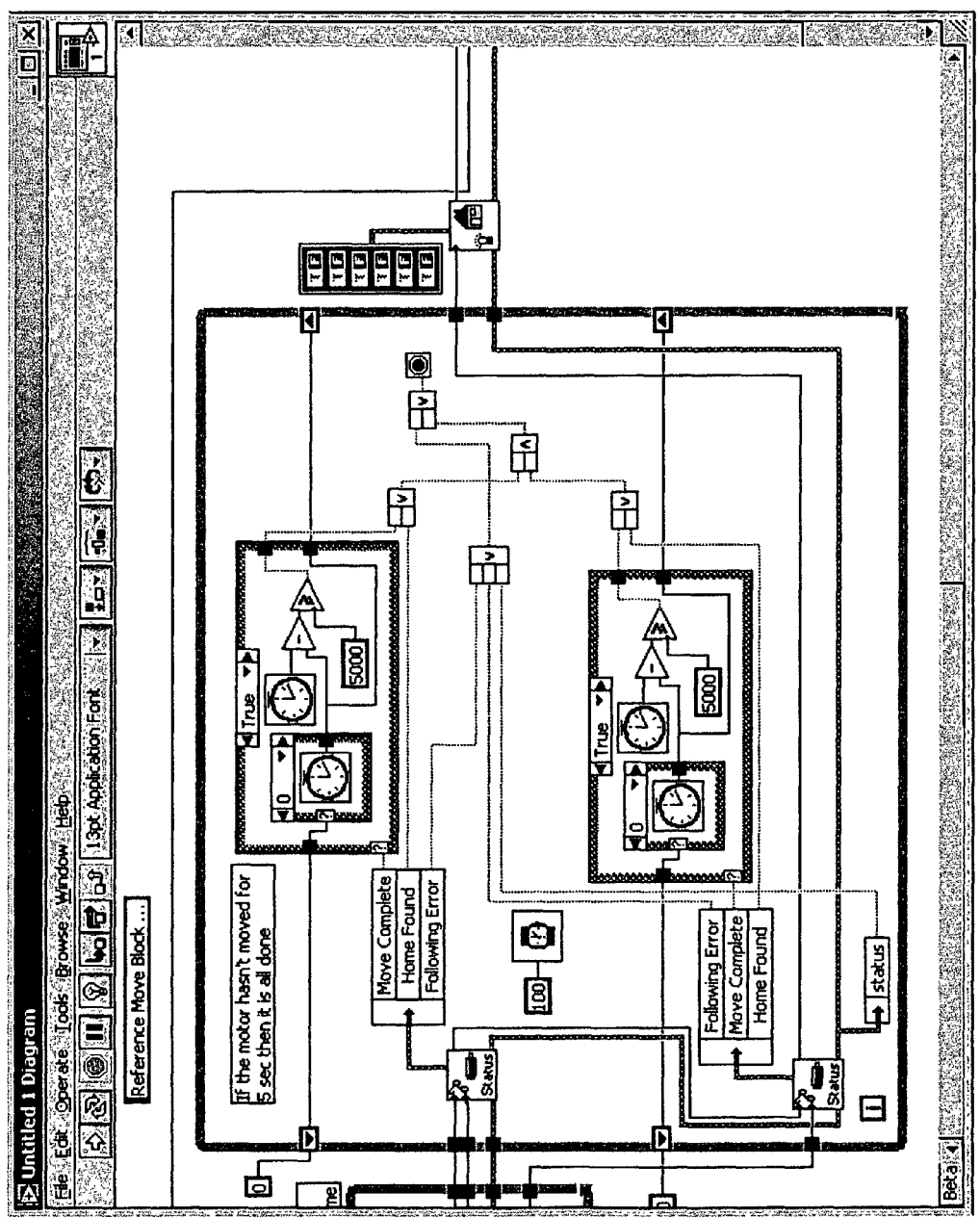
Figure 26E:
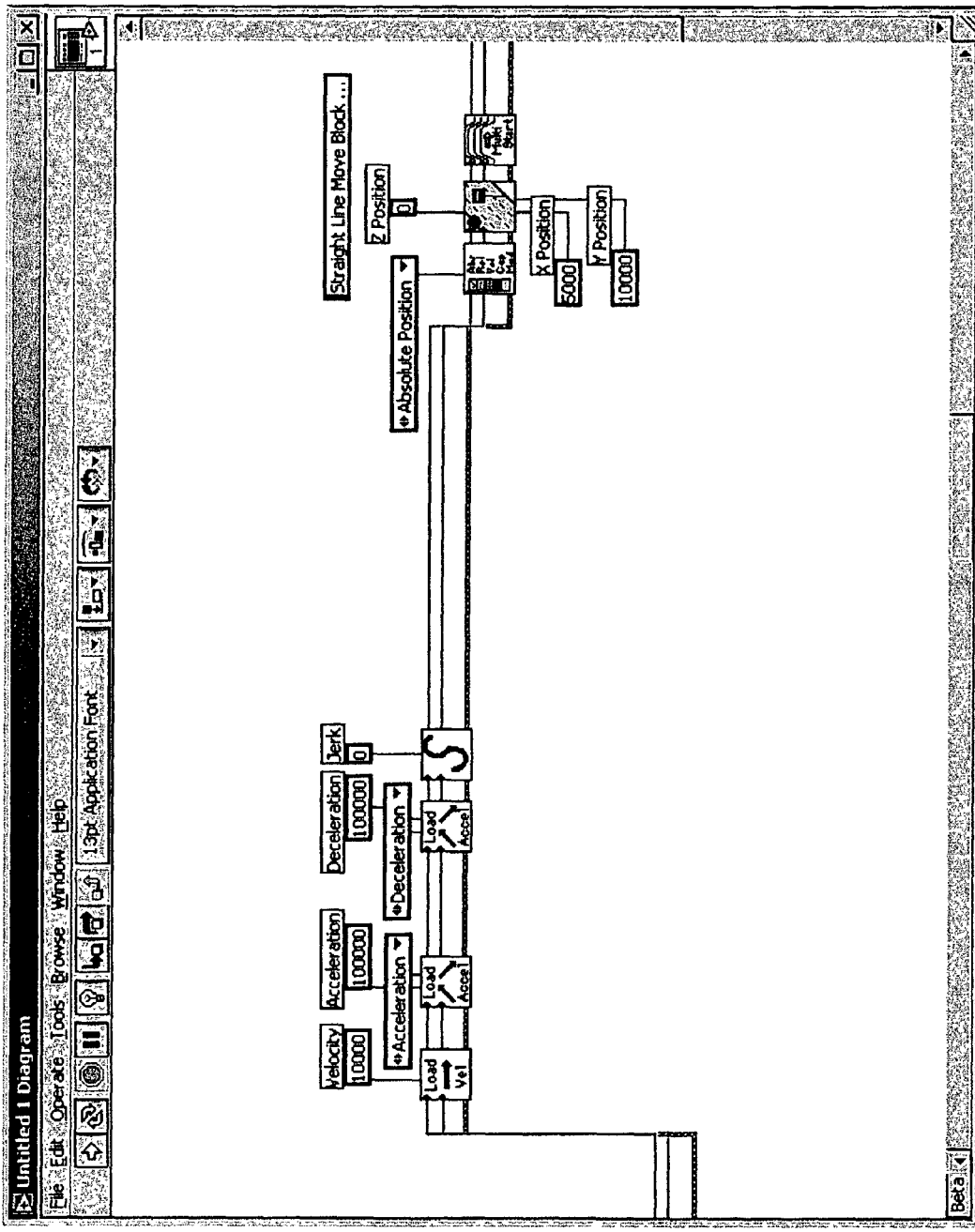
Figure 26F:
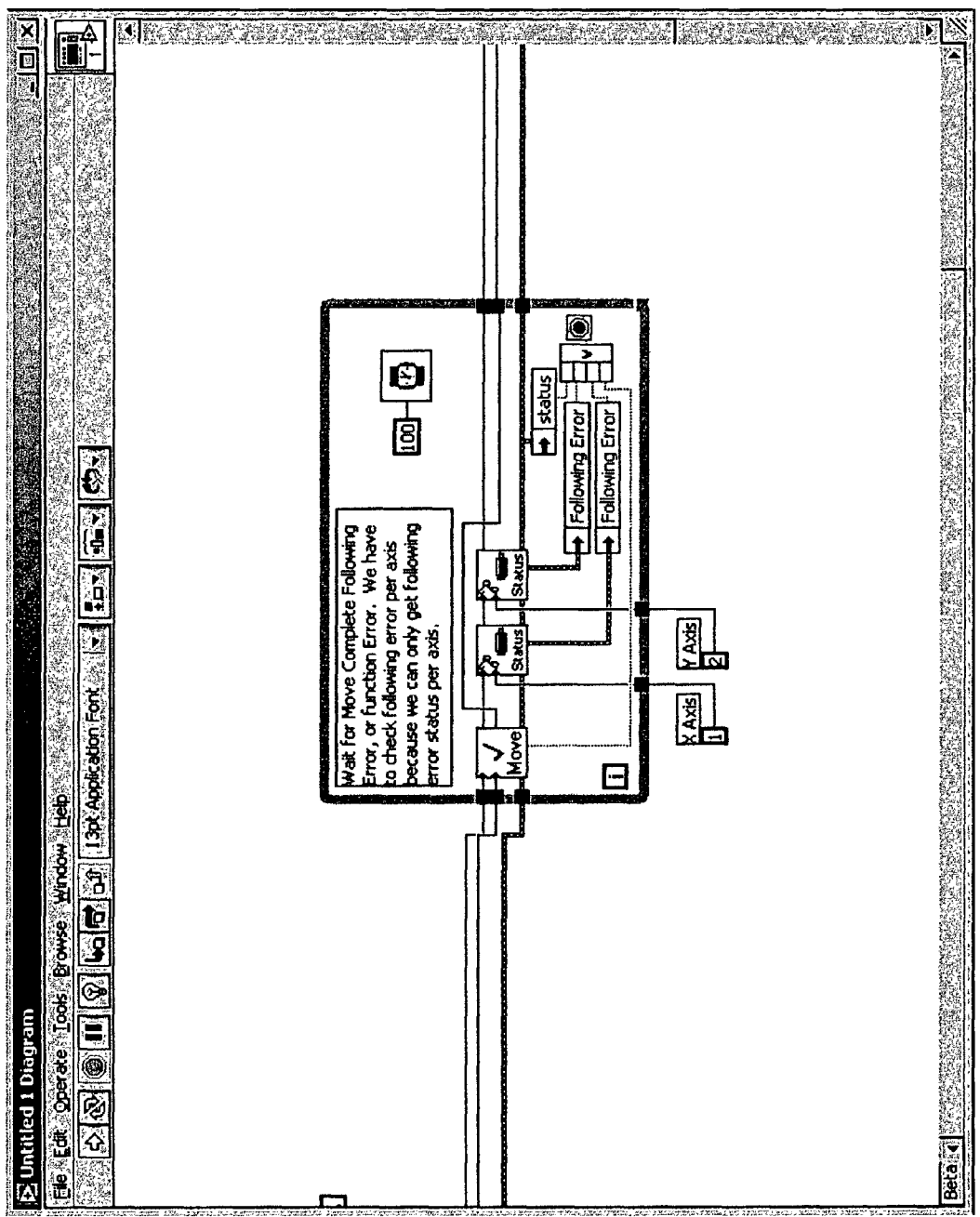
Figure 26G:
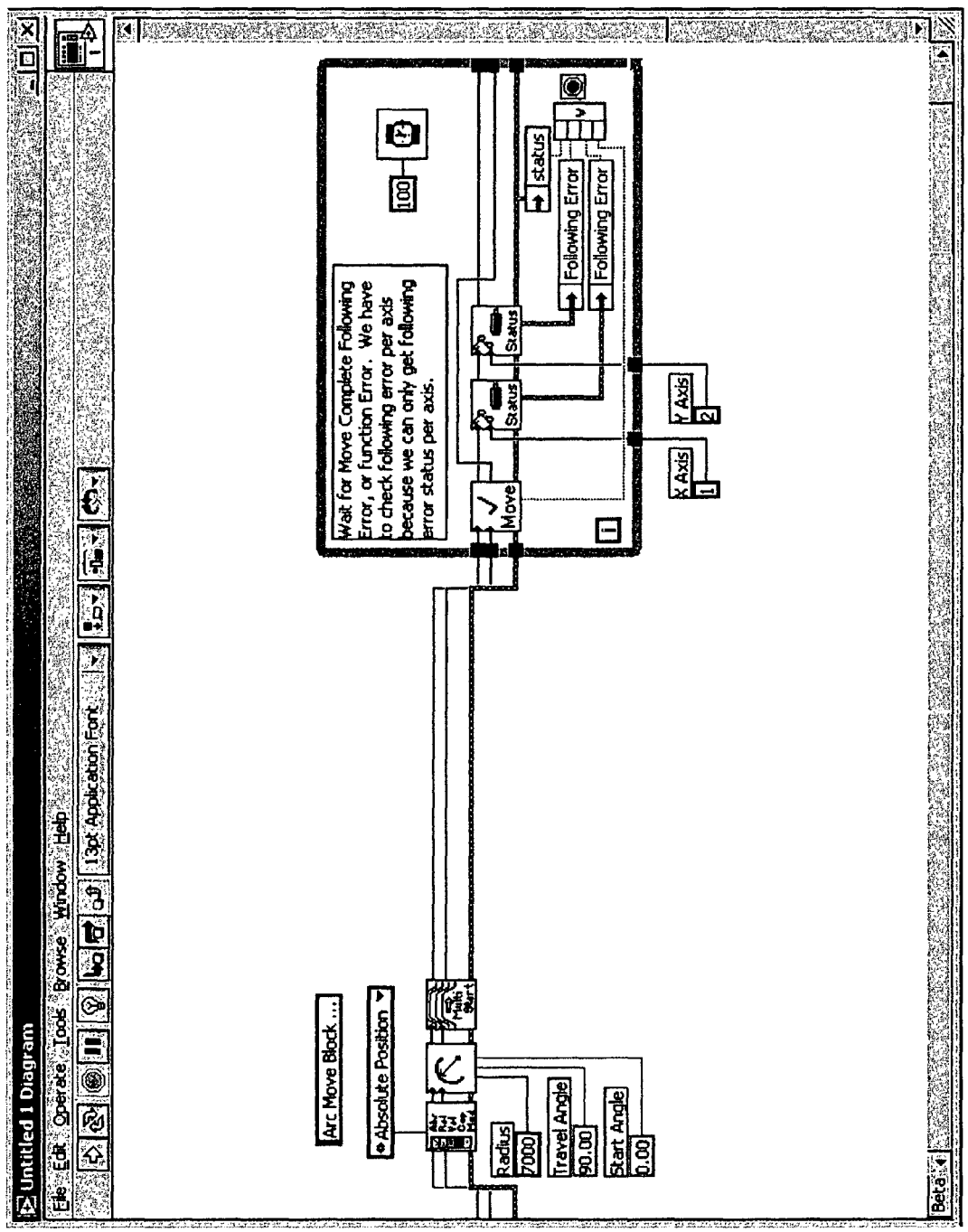

FIG. 25F illustrates the GUI after the user has included a contoured move operation in the sequence, represented by the icon 604D in the icon strip 602.

Motion Control Operations

This section describes possible motion control operations which the user can include and configure in a motion control sequence, according to one embodiment of a motion control prototyping environment.

Straight Line Move Operation—This operation performs a straight-line move in 1-D, 2-D, or 3-D space. The user can choose a controller, the axes for his "motion space" and specify the move constraints such as velocity, acceleration, deceleration, and jerk. The user may utilize a graphical panel to specify desired values for these properties. The user may also graphically edit the position and velocity profiles for the operation and view the changes caused to the property values.

Arc Move Operation—This operation performs an arc in 2-D or 3-D space. The user can choose a controller, the axes for his "motion space" and specify the move constraints such as velocity, acceleration, deceleration, and jerk. The user may utilize a graphical panel to specify desired values for these properties. The user may also graphically edit the position and velocity profiles for the operation and view the changes caused to the property values.

Contoured Move Operation—This operation performs a custom-profiled move for 1-D, 2-D, or 3-D space. For example, the custom-profiled move may follow the outline of the sole of a shoe. The user can choose a controller and the axes for his "motion space" and may then create a custom position profile or may customize his velocity profile or acceleration profile based on a position profile. This operation may allow the user to specify a spreadsheet of position/velocity/acceleration data, e.g., as an ASCII text or Excel spreadsheet.

Reference Operation—This operation may be used for initialization purposes. It allows the user to specify the reference for his axis or axes in 1-D, 2-D or 3-D space. This operation may cause the motion controller to find the home switch and/or the encoder index for the axis or axes specified.

Gearing Configuration Operation—This operation allows an axis to be electronically geared to a feedback device or another axis. It may also allow users to specify a CAM table if supported by the motion control hardware.

Views Provided by the Motion Control Prototyping Environment

As described above, the graphical user interface of the motion control prototyping environment may display one or more views of the motion produced by the motion control sequence or of various characteristics of this motion, such as velocity and acceleration profiles. This section describes a set of views provided by the motion control prototyping environment, according to one embodiment.

2D Position view—This view may display the entire position profile for the motion control sequence in a two-dimensional display. The user can edit the position data of operations in the sequence by interacting graphically with the data displayed in this view. The user may also edit the position data by entering text data into the graphical panels for configuring the operations. The user may select to view and edit the position data in the XY, YZ, or the ZX plane. The view 608 shown in FIG. 25A illustrates one example of a 2D position view.

3D position view—This view may display the entire position profile for the motion control sequence in a three-dimensional display. The view 610 shown in FIG. 25A illustrates one example of a 3D position view.

Velocity view—This view may display the trapezoidal/S-curve or custom profile (only applicable if a contoured move operation is currently selected) of the velocity for the selected operation. The user may edit the velocity profile data of operations in the sequence by interacting graphically with the data displayed in this view. The user may also edit the velocity profile data by entering text data into the graphical panels for configuring the operations.

Acceleration view—This view may display the profile of the acceleration/deceleration for the selected operation. This view may be editable only if a contoured move operation is selected.

In addition to these views the motion control prototyping environment may provide tools available to display other information, such as:

Status Tool—This tool may display status information for each axis/vector space, e.g., in a separate window or tab. This provides a way to monitor the status of the motion control hardware.

Real World View Tool—This tool may display a real world view of the setup of the motion control system, e.g., in a separate window or tab. For example, a selection of stages/cartesian robot models may be provided so that the user can view the motion in the real mechanical sense of his system.

Previewing Motion Performed by a Motion Control Sequence

The motion control prototyping environment may enable the user to preview various aspects of the motion performed by a motion control sequence in one or more preview windows, e.g., a velocity profile, an acceleration profile, position plots, etc., in advance before commanding the motor to perform the sequence of moves. For example, the 2D and 3D position views discussed above may enable the user to preview the motion in two and three dimensions, respectively.

The preview window(s) may be updated dynamically as the user interacts with the motion control prototyping environment to create and edit the sequence. For example, after each new operation the user adds to the sequence, the motion control prototyping environment may update the preview window(s) to visually indicate the effect of adding the new operation. Also, when the user edits or changes an operation, the motion control prototyping environment may update the preview window(s) to visually indicate the change.

Velocity moves may display a velocity profile, and spatial moves may display displacement versus time for one axis moves, planar displacement for two axis moves, and 3D Cartesian displacement for three axis moves. Spatial moves may also take into account configured acceleration and deceleration profiles. Captures and breakpoints may be displayed along the trajectory.

The user may also be able to edit the motion by interacting directly with the preview windows. For example, in response to receiving user input to the 2D position view to specify a new location within an XY plane, the motion control prototyping environment may change properties of one or more operations in the motion control sequence such that the operations are updated to be operable to control a device to travel to the new location.

In one embodiment, the preview window(s) may display data for all of the operations in the motion control sequence. For example, if there are three move operations in the sequence, a preview window displaying position data may plot the trajectory for all three of the move operations. In another embodiment, the preview window(s) may display data for only a subset of the operations in the motion control sequence. For example, the user may select one or more operations which he desires to preview.

In one embodiment, the preview window(s) may display the information in the preview window(s) such that the user can view the entire cumulative motion at a glance. For example, if the sequence includes three motion control operations, the preview window(s) may indicate the motion trajectory of all three operations.

In another embodiment, the user may be able to request the motion control prototyping environment to simulate the motion trajectory such that the trajectory is interactively traced out in the preview window(s) as the user watches. For example, the preview window(s) may initially be empty (or may only display a coordinate grid), and the motion trajectory may gradually be plotted in the preview window(s). This may help the user to understand how the motion control device moves through space over time. This type of simulation may aid the user in performing offline development and prototyping; in other words, the user may watch a simulation of the motion even if no motion control device is coupled to the computer system.

The motion control prototyping environment may provide the user with various options relating to the speed at which the motion trajectory is interactively traced out in the preview window(s). For example, in some cases the user may desire for the trajectory to be drawn at a speed such that the time taken to draw the complete trajectory is the same as the time the actual motion would take if performed by the real motion control hardware. In other cases, the user may desire to speed up and/or slow down the drawing speed. For example, if the actual motion would take five minutes to complete on the real hardware, the user may request the motion control prototyping environment to draw the trajectory faster in the preview window, to increase the efficiency of previewing the sequence.

The motion control prototyping environment may also allow the user to configure the scale at which the trajectory is drawn in the preview window(s). For example, in some cases the user may desire to view the entire motion space at once, e.g., to achieve an overview of the overall sequence. At other times, the user may desire to "zoom in" to certain portions of the motion space. For example, if one portion of the motion sequence involves performing very small and complex movements, the user may request to zoom in to magnify the preview for that portion of the sequence.

Breakpoints/High Speed Capture

In one embodiment, the user may be able to specify various breakpoints in the motion control sequence. When the motion control sequence is performed, the motion device will trigger a digital line at the position specified.

The user may specify the breakpoints in various ways. For example, in one embodiment, the user may specify associate a breakpoint with a move by specifying the coordinates at which to perform the breakpoint. In another embodiment, the user may specify a breakpoint graphically. For example, the user may click on a point within the 2D view to specify that a breakpoint should be performed at that point. After the user has created the breakpoint graphically in this manner, he may fine-tune the location of the breakpoint, e.g., by utilizing a text-box to type precise coordinates.

The user may also be able to enable high-speed capture to be performed at a particular time during a move. This will allow the motion device to be triggered externally. In addition, the user will be able to write to a digital I/O bit before a move has started or a move has been completed.

In one embodiment, the GUI of the motion control prototyping environment may provide separate operations for inclusion in the motion control sequence for configuring breakpoints, enabling high-speed capture, and enabling writing to the digital output on the motion controller. Thus, in this embodiment, the user may add the desired operation to the motion control sequence rather than configuring another operation already in the sequence, e.g., a move operation, to perform the breakpoint/high-speed capture/write operation. This may help to keep the motion trajectory performed by the sequence separate from other aspects of the sequence.

Use Case 1—Wafer Defect Inspection

Several exemplary use cases are presented below to further illustrate how a motion control prototyping environment such as described above may be utilized to solve real-world motion control problems. In the use cases below, the described motion control sequences (prototypes) developed in the motion control prototyping environment may be deployed on a motion control device.

The first use case pertains to wafers to be inspected for defects. The wafers are retrieved from a cassette carrier and loaded on an inspection table by a robotic handler. The wafers are then rotated and moved laterally along their radius while a fixed laser beam is directed at the wafer surface. Scattered laser light is collected by multiple detectors and fed to an analysis system. The wafers are removed by another robot and put in output cassettes according to their defect levels.

This application may be implemented using a sequence developed in the motion control prototyping environment with four move operations:

a) A straight-line move operation that moves the robotic arm over the inspection table. A value maybe written to a digital output bit before the move is performed to lift the wafer. Another value may be written to a digital output bit after the move is performed to release the wafer.

b) A straight-line move operation to move the robotic arm away from the inspection table to its initial position.

c) A straight-line move operation to cause the rotary stage on the inspection table to rotate the wafer while the laser beam is directed at its surface. The laser can be activated by writing a value to another digital output bit on the motion controller before this move starts, and may be shut off with another write value after the move is performed.

d) A straight-line move operation that moves the rotating assembly laterally. This operation may be synchronized with the rotary motion, e.g., using a "synchronized start" event such as described above.

After the analysis step, the wafer may be moved by another robotic arm to either a "defect" parts tray or a "good" parts tray.

To facilitate this application, the motion control operations may be synchronized with other types of operations such as data acquisition (DAQ) operations. For example, a DAQ operation may cause a DAQ device to acquire the intensity of the laser beam. At every scan, the DAQ operation may trigger the high-speed capture on the motion device. This may cause synchronized position-intensity readings that make it easy to map the wafer with the defects.

Use Case 2—Glue Dispensing

The second example use case pertains to glue that needs to be applied to the sole of a shoe. The glue gun is installed on a fixture including two motors. The glue needs to be dispensed consistently; thus, the 2D-vector velocity at which the glue gun traverses the path of the sole must be constant throughout the move.

This application may be implemented using a sequence developed in the motion control prototyping environment with two operations:

a) a reference move operation to move the X and Y axes into their reference starting positions.

b) a contoured move operation to follow the path of the sole. Position data describing the shape of the sole may be read in. This data may then be used to plot the profile of the move in 2D space. Based on the move constraints such as velocity, acceleration, deceleration and jerk, the points read in may be re-mapped to achieve the desired velocity profile. On execution, the Contoured move operation may cause the motion controller to move through the desired space at constant velocity.

Use Case 3—Capturing Images While Moving

The third example use case pertains to capturing images while moving. It is required to take images while an XY stage is moving through a pre-determined sequence. Images may be taken based on the hardware triggering the camera.

This application may be implemented using a sequence developed in the motion control prototyping environment with two or more operations. The move profile may be defined, e.g., using straight-line, blended, and/or contoured moves. Breakpoints may then be set at the appropriate points within the position plot where the camera needs to be triggered. This enables the breakpoints in the hardware at those positions. When the move operations are executed, the breakpoints may trigger the camera, causing it to capture the images at the desired positions.

Use Case 4—Testing Resistors

The fourth example use case pertains to retrofitting a system used to test resistors. Assume that the potentiometer head is currently moved manually, and the resistance value of the resistor is tested using a DAQ device. It may be desirable to automate the system using a motor that can move the potentiometer head automatically. Using a single axis, the potentiometer head can be moved in a sinusoidal fashion at different frequencies, and analysis of resistance readings can be performed in conjunction with a DAQ device.

This application may be implemented using a sequence developed in the motion control prototyping environment, wherein the sequence includes a contoured move operation. A table of position values describing the sinusoidal motion may be loaded, and the contoured move operation may cause the desired sinusoidal motion. For different frequencies, different tables can be specified.

Use Case 5—Flying Welding

The fifth example use case pertains to a flying welding application. The objective is to weld one spot on a part moving on a conveyor belt. The welding gun is installed on a linear arm controlled by a linear motor. The welding needs to happen without stopping the conveyor belt.

This application may be implemented using a sequence developed in the motion control prototyping environment as follows:

A reference move operation to move the arm to its starting position waiting for a part.

A gearing operation which may start on a high-speed capture trigger. This operation gears the linear axis to an encoder mounted on the conveyor belt. The gearing ratio is set at 2:1.

A wait block to wait for a pre-determined amount of time, to allow the linear arm to be positioned over the piece to be welded.

A gearing configuration operation to change the gear ratio to 1:1. It writes to a digital output bit to start the welding. The arm may now move at the same speed as the conveyor and perform the welding while moving.

Another gearing operation to shut off the welding flame by writing to the digital output and then disable gearing.

FIGS. 26A-26G: Example of Programmatically Generated Graphical Program

In one embodiment, the motion control prototyping environment may be operable to programmatically generate a graphical program implementing a motion control sequence (prototype). The generated graphical program may be used in configuring a motion control device to perform the motion control operations specified by the sequence, as described above. The programmatically generated graphical program may be associated with any of various graphical programming development environments. The graphical source code included in the graphical program may vary depending on the particular development environment. FIGS. 26A-26G illustrate exemplary graphical source code which may be programmatically generated for the LABVIEW™ graphical programming development environment. These figures illustrate a graphical program executable to implement the motion control sequence described above with reference to FIGS. 25A-25F. (FIGS. 26A-26G illustrate a single graphical program, but the size of the program requires it to be separated into multiple drawings.) For more information on the operation of the illustrated LABVIEW™ graphical source code, please refer to the LABVIEW™ user documentation, available from National Instruments Corp., which is hereby incorporated by reference.

Figure 27:
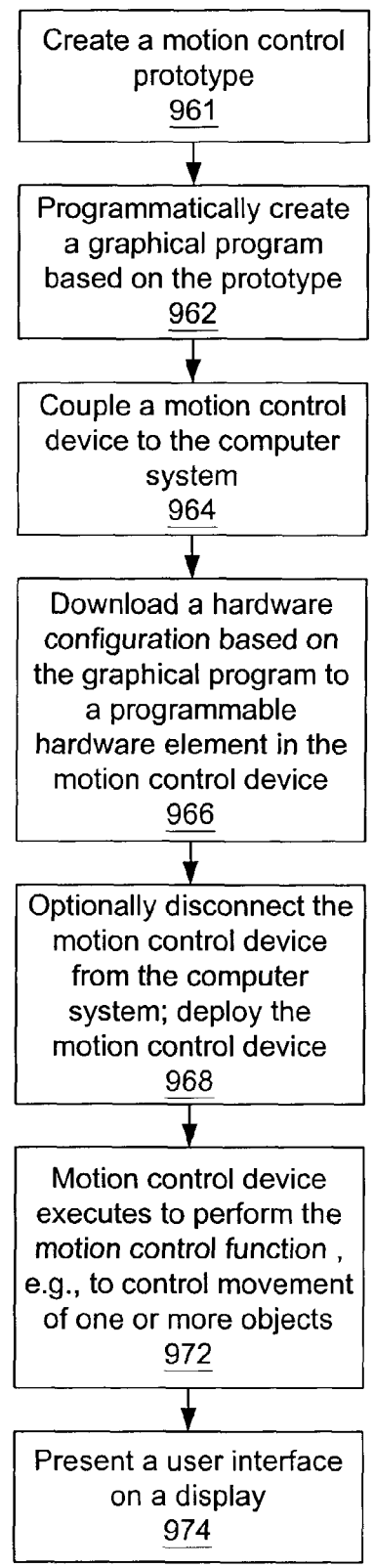
FIGS. 27 and 28 are flowchart diagrams illustrating exemplary embodiments of a method for configuring a motion control device to execute a graphical program generated based on a motion control prototype.
Figure 28:
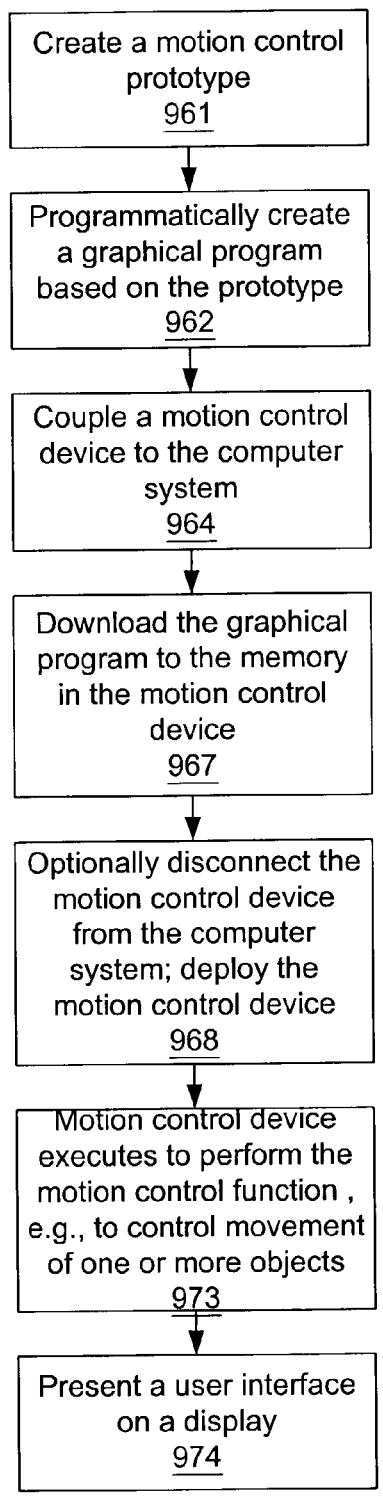

FIGS. 27 and 28—Configuring a Motion Control Device to Execute a Graphical Program Based on a Motion Control Prototype FIG. 27 is an exemplary embodiment illustrating a method for configuring a motion control device to execute a graphical program based on a motion control sequence or prototype, where the motion control device includes a functional unit, more specifically, a programmable hardware element 206. It is noted that in various embodiments, various steps in the method may occur concurrently, or in a different order than shown. Additionally, some steps may be omitted, or additional steps performed which are not shown, as desired. As shown, this method may operate as follows.

In step 961, a motion control prototype or sequence may be created as described above.

In step 962, a graphical program based on the motion control prototype or sequence may be programmatically generated as described above. The user may optionally modify the graphical program as described above.

In step 964 the motion control device may be coupled to the computer system 82. The motion control device may be coupled to the computer system 82 over a network, via communication cable(s), through wireless means, or by any other method of coupling, as desired. It is noted that the motion control device may be connected to the computer system 82 before, during or after the graphical program is generated.

In step 966 a hardware configuration based on the graphical program may be downloaded onto the programmable hardware element 206 in the motion control device to configure the programmable hardware element 206. For example, in the embodiment where the motion control device is coupled to the computer system 82 over a network, deploying the graphical program may comprise the computer system 82 deploying the graphical program over the network to the motion control device. The hardware configuration corresponds to a hardware implementation of the graphical program. In one embodiment, downloading the hardware configuration onto the programmable hardware element 206 may comprise the following steps: generating a hardware description based on the graphical program, where the hardware description describes a hardware implementation of the graphical program; converting the hardware description into a netlist; compiling the netlist format into a hardware program file; and downloading the hardware program file to the programmable hardware element to configure the programmable hardware element. These steps are discussed below.

After the downloading step is performed, the programmable hardware element is configured with a hardware implementation of the graphical program. At this point, in step 968 the motion control device may be optionally disconnected from the computer system 82, and may possibly be deployed for operation. For example, the motion control device may be disconnected from the computer system 82 and deployed in a motion control application, such as a manufacturing inspection application, a manufacturing assembly application, or other motion control application. If the motion control device is a motion control card or board that is designed to be located in a slot of the computer 82, the motion control card or board may optionally remain in the computer system 82 for use, or may be transferred to a different computer system. Alternatively, the method described above may be repetitively used to manufacture a plurality of motion control devices for later sale. As another alternative, the method described above may be used to configure a motion control device that has already been deployed, where the motion control device is configured over a network, i.e., where the hardware configuration is downloaded onto the motion control device (or other instrument) over a network.

After the programmable hardware element 206 in the motion control device is configured with a hardware implementation of the graphical program, the motion control device can be used in an application. Thus the programmable hardware element 206 in the motion control device may execute in step 972 to cause the motion control device to perform the motion control function, e.g., the one or more motion control operations, specified by the motion control prototype or sequence. For example, in performing the one or more motion control operations, the motion control device may control the movement of one or more objects, e.g., for a manufacturing inspection application or a manufacturing assembly application.

While the programmable hardware element 206 in the motion control device executes to perform the one or more motion control operations, if the graphical program includes a user interface portion, this user interface portion may optionally be presented on a display during this time in step 974. The code corresponding to the user interface portion may be executed by a processor 160 in the computer system 82 or by a processor 212 on the motion control device. The user interface portion may operate as a front panel for the motion control device. The user may optionally provide user input to the user interface portion on the display to control the motion control device while the programmable hardware element 206 in the motion control device executes to perform the one or more motion control operations. For example, the user interface portion may be compiled into executable code for execution by a processor (160 or 212) and stored in a memory (166 or 214) accessible by the processor. The processor may then execute the executable code (the user interface portion) from the memory to present the user interface portion on the display.

In an embodiment where the motion control device includes the processor 212 and the memory 214, the processor 212 in the motion control device may execute the executable code from the memory 214 to present the user interface portion on the display during the motion control device executing to perform the one or more motion control operations.

In another embodiment, the processor 160 of the computer system 82 may execute the executable code from the memory 166 to present the user interface portion on the display during the motion control device executing to perform the one or more motion control operations.

FIG. 28 is an exemplary embodiment illustrating a method for configuring a motion control device to execute a graphical program based on a motion control prototype or sequence, where the motion control device includes a functional unit, more specifically, a processor 212 and memory 214. The method shown in FIG. 28 is similar to the method described above with reference to FIG. 27, differing from that method only in steps 966 and 972. Thus, in describing this embodiment of the method, where the steps are the same as described above, an abbreviated description is provided. As noted above, in various embodiments, various steps in the method may occur concurrently, or in a different order than shown. Additionally, some steps may be omitted, or additional steps performed which are not shown, as desired. As shown, this method may operate as follows.

In step 961, a motion control prototype or sequence may be created as described above.

In step 962, a graphical program based on the motion control prototype or sequence may be programmatically generated as described above. The user may optionally modify the graphical program as described above.

In step 964 the motion control device may be coupled to the computer system 82, such as over a network, communication cable(s), through wireless means, or by any other method of coupling, as described above with reference to FIG. 27, step 964.

In step 967 the graphical program may be downloaded to the memory 214 of the motion control device. As mentioned above, downloading the graphical program onto the memory 214 may comprise the following steps: generating an executable program (an executable program) based on the graphical program which implements the functionality of the graphical program; and transferring the executable program to the memory 214 on the motion control device. As also mentioned above, downloading the graphical program onto the memory 214 may comprise downloading the graphical program (or executable program) onto the memory 214 over a network.

After the downloading step is performed, the motion control device is configured to perform the motion control function implemented by the graphical program, i.e, is configured to perform the one or more motion control operations specified by the motion control prototype or sequence. At this point, in step 968 the motion control device may be optionally disconnected from the computer system 82, and may possibly be deployed for operation, as described above in step 968 of FIG. 27. After the motion control device is configured with the graphical program, i.e., after the graphical program is loaded into the memory 214, the motion control device can be used in an application. In step 973, the motion control device may execute to perform the one or more motion control operations specified by the motion control prototype or sequence. For example, in performing the one or more motion control operations, the motion control device may control the movement of one or more objects, e.g., for a manufacturing inspection application or a manufacturing assembly application.

While the motion control device executes to perform the one or more motion control operations, if the graphical program includes a user interface portion, this user interface portion may optionally be presented on a display during this time in step 974, as described above in step 974 of FIG. 27.

In one embodiment, the user may optionally provide user input to the user interface portion on the display to control the motion control device while the motion control device (i.e., the processor 212 and memory 214) executes to perform the one or more motion control operations.

In one embodiment, the motion control device executing to perform the one or more motion control operations may comprise the processor 212 in the motion control device executing the graphical program from the memory 214. In the embodiment where the executable program is generated from the graphical program, the motion control device executing to perform the one or more motion control operations may comprise the processor in the motion control device executing the executable program (in executable form) from the memory 214.

In one embodiment, the processor 212 in the motion control device may execute the executable code from the memory 214 to present the user interface portion on the display during the motion control device executing to perform the one or more motion control operations. In other words, the processor 212 may execute both portions of the graphical program concurrently, such as by threading or multi-tasking. In another embodiment, the motion control device may include multiple processors, e.g., 212A and 212B, in which case the first portion of the graphical program (such as the user interface portion) may be executed by processor 212A from memory 214 (or a first memory 214A), while the second portion (such as the motion control portion) may be executed by processor 212B from memory 214 (or a second memory 214B).

Figure 29:
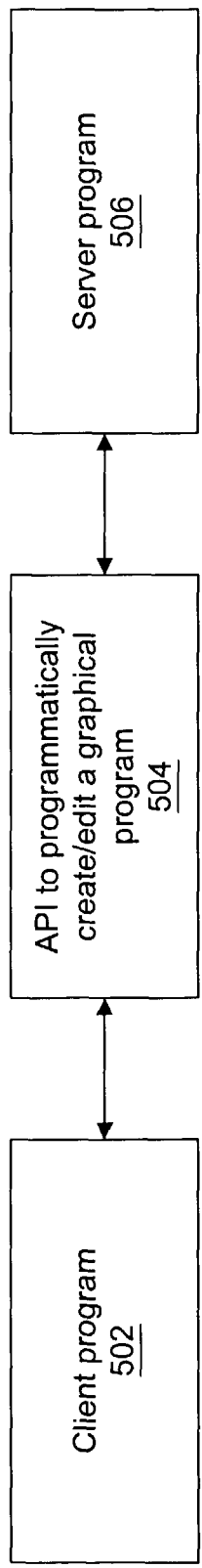
FIG. 29 is a block diagram illustrating the abstract relationship between a client program, an API to programmatically create/edit a graphical program, and a server program.

FIG. 29—Client/Server Implementation for Programmatic Generation of a Graphical Program As described above, in one embodiment, a client/server model may be utilized in programmatically generating a graphical program to implement a prototype. The server program may provide an application programming interface (API) which the client program, e.g., the prototyping environment, can use to programmatically generate the graphical program. One embodiment of such a client/server implementation is described below.

For each node, programmatic structure, user interface element, or other object of the graphical program, the client program may call the API to programmatically add the object to the graphical program, connect the object to other objects of the graphical program, etc. Any necessary files or other constructs needed by the graphical programming environment in order to use the generated graphical program may be automatically created by the server program as a result of calling the API.

FIG. 29 is a block diagram illustrating the abstract relationship between a client program 502, an API 504 to programmatically create/edit a graphical program, and a server program 506. It is noted that the API block represents the abstract notion of the API presented by the server program 506, and in various embodiments the API block 504 may not represent any actual code. Also, in actual embodiments, various layers may exist which implement the elements of the FIG. 29 relationship. For example, the client program 502 may be a part of a larger software application (e.g., the prototyping environment application), the server program 506 may receive information sent by the client program 502 via an intermediate server, etc.

As noted above, the client program 502 may be any of various types of programs. For example, the client program 502 may itself be a graphical program. The client program 502 may also be a text-based program such as a C++ program, a VISUAL BASIC™ program, a JAVA™ program, etc., or any combination of these or other languages. The client program 502 may execute independently or may execute within an execution subsystem of an application development environment.

The client program 502 may call the API 504 in any of various ways. For example, wherein the client program 502 comprises a graphical program, the client graphical program may include graphical nodes corresponding to the API 504. A client graphical program may also interface with text-based code which calls the API 504.

The client program 502 may also call the API 504 in various other ways. For example, the server program 506 may expose a component such as an ActiveX ACTIVEX™ component, CORBA™ component, JAVABEANS™ component, etc., and the client program 502 may obtain a reference to the object to invoke functions or methods of the API 504. The API 504 may also be integrated with the language or development environment of the client program 502, e.g., as a library.

Through the API 504, the client program 502 may communicate with the server program 506. The server program 506 is operable to perform the actions indicated by the API calls. For example, the server program may be operable to create a new graphical program, add objects to the graphical program, connect graphical program objects, etc. The API calls may also enable the client program 502 to request an existing graphical program to be modified. Thus, in one embodiment, in response to the user editing an existing prototype, a graphical program corresponding to the prototype may be programmatically modified to reflect the changes. Also, in one embodiment, if a hardware device was already configured according to the existing prototype, then in response to the user editing the prototype, the hardware device may be automatically re-configured to reflect the user's changes to the prototype.

LABVIEW™ API

The server program 506 of FIG. 7 is preferably an instance of a graphical programming development environment. In one embodiment, the server program 506 is an instance of the LABVIEW™ graphical programming development environment.

The LABVIEW™ environment provides specialized support for developers of instrumentation and industrial automation applications, and a LABVIEW™ graphical program may be referred to as a "virtual instrument" or "VI". The LabVIEW environment comprises functionality referred to as "VI Server" which enables client programs to communicate with the LABVIEW™ environment.

The VI Server functionality enables client programs to create or edit a LABVIEW™ graphical program or VI.

A client program which requests LABVIEW™ to generate/edit a VI may itself be a graphical program or VI. A client VI may include particular nodes in the client VI block diagram which utilize the VI Server functionality of a LABVIEW™ instance to request the LABVIEW™ instance to obtain information of an existing VI, create a new VI, add objects to the VI, etc. These nodes and exemplary uses of the nodes are described in U.S. patent application Ser. No. 09/745,023, titled "System and Method for Programmatically Generating a Graphical Program in Response to Program Information", which was incorporated by reference above.

LABVIEW™ also provides components such as ActiveX components which enable text-based programs, such as VISUALBASIC™ programs, VISUAL C++™ programs, etc., to access the VI Server functionality. In the preferred embodiment, these components enable text-based client programs to perform all of the VI server functions that graphical client programs can perform.

Figure 30:
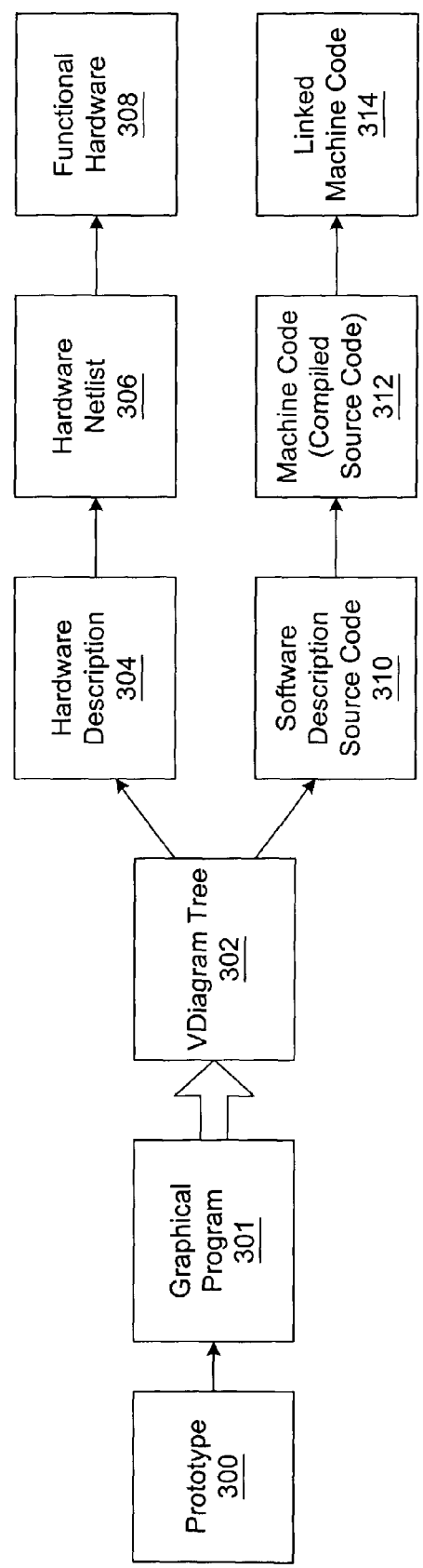
FIG. 30 is a block diagram illustrating one embodiment for conversion of a prototype into hardware and software descriptions.

FIG. 30—Block Diagram of Conversion of a Prototype Into Hardware and Software Descriptions FIG. 30 is a block diagram illustrating one embodiment for conversion of a prototype into hardware and software descriptions. The user may first create a prototype 300 such as described above. A graphical program 301 based on the prototype may then be programmatically generated as described above. For example, the graphical program 301 may comprise graphical code, such as interconnected function nodes or icons, that implements one or more operations included in the prototype. The graphical code in the graphical program may use graphical data flow, graphical control flow and/or graphical execution flow constructs, as noted above. The graphical program may be represented on a display screen as interconnected icons or function nodes. In the memory of the computer system, the graphical program 301 may comprise data structures (or scripts or code) representing functional operations, data flow and/or control flow, and execution order. In one embodiment, the user may modify the graphical program 301 after it has been programmatically generated based on the prototype.

The graphical program 301 may be associated with any of various graphical programming development environments or development tools. For example, the graphical program may be associated with the following development systems: LABVIEW™, DASYLAB™, and DIADEM™ from National Instruments, VEE™ from Agilent, WIT™ from Coreco, VISION PROGRAM MANAGER™ from PPT Vision, SOFTWIRE™ from Measurement Computing, SIMULINK™ from the MathWorks, SANSCRIPT™ from Northwoods Software, KHOROS™ from Khoral Research, SNAPMASTER™ from HEM Data, VISSIM™ from Visual Solutions, OBJECTBENCH™ by SES (Scientific and Engineering Software), and VISIDAQ™ from Advantech, among others.

In the preferred embodiment, graphical program 301 is a LABVIEW™ graphical program or virtual instrument (VI).

In one embodiment, a VDiagram tree 302 may then be created from the data structures of the graphical program 301. The VDiagram tree 302 may comprise an abstract hardware graph which represents at least a portion of the graphical program 301. The graph may be organized in a way that facilitates the generation of specific types of descriptions by back end programs. In one embodiment, a VDiagram tree 302 (abstract hardware graph) may automatically be created and stored when the graphical program 301 is automatically generated. In this instance, conversion from graphical program data structures to a VDiagram tree is not necessary.

A hardware description 304 may be generated from the abstract hardware graph 302 by a back end program. The hardware description 304 may be in any of various hardware description languages such as VHDL, EDIF, and Verilog. In the preferred embodiment, the hardware description 304 comprises one or more VHDL files. A hardware netlist 306 may be generated from the hardware description using various synthesis tools. As noted above, the term "netlist" comprises various intermediate hardware-specific description formats comprising information regarding the particular hardware elements required to implement a hardware design and the relationship among those elements. In the preferred embodiment, the hardware netlist 306 is an FPGA-specific netlist. The hardware netlist 306 is used to create or configure one or more functional hardware devices or hardware elements 308 which are configured to execute the portion of the graphical program 301 that is represented by the abstract hardware graph 302.

Hardware element 308 may comprise any of various devices. For example, hardware 308 may comprise a programmable logic device (PLD) such as an FPGA or CPLD. However, hardware 308 may comprise other types of hardware devices, such as a traditional circuit board which is created using the hardware netlist 306. In one embodiment, hardware 308 is an interface card comprising an FPGA, where the interface card may be comprised in the computer system where the graphical program 301 is created. The hardware 308 may also be comprised in an external device connected to the computer system where the graphical program 301 is created. The hardware 308 may be connected to the computer over an external serial or parallel bus, or over a network, such as the Internet.

As shown in FIG. 30, software description source code 310 may also be generated from the abstract hardware graph 302 by a back end program. The source code 310 may be in various source code languages such as C, C++, JAVA™, etc. Machine code 312 may be produced from the source code 310 using various source code compilers. Linked machine code 314 may be produced from the machine code 312 using various machine code linkers. The linked machine code 314 is executable to perform the operations of the portion of the graphical program 301 that is represented by the abstract hardware graph 302.

In one embodiment, each of the elements 301, 302, 304, 306, 308, 310, 312, and 314 may be automatically and seamlessly generated as part of a process initiated by the user to generate hardware/software descriptions for the prototype 300. In one embodiment, a minimal amount of user input may be required in generating one or more of these elements. In various embodiments, for any given element shown in FIG. 30, the user may or may not be aware that the element is generated as a part of the overall process. For example, depending on the skill level of the intended user, the user may be given more or less control and knowledge of the overall process. For example, in one embodiment, the elements may not all be generated together in response to a single user request. As one example, the user may first request to generate the graphical program 301 based on the prototype 300. The user may then (e.g., at a later time) request to finish the process by generating the other elements shown based on the graphical program 301. For example, the user may first modify the graphical program before requesting the other elements to be generated. As another example, the user may request the VDiagram tree 302 to be generated based on the graphical program 301. The VDiagram tree 302 may be generated and saved to a file, and the user may call a back end program at a later time to generate a hardware/software description.

Figure 31:
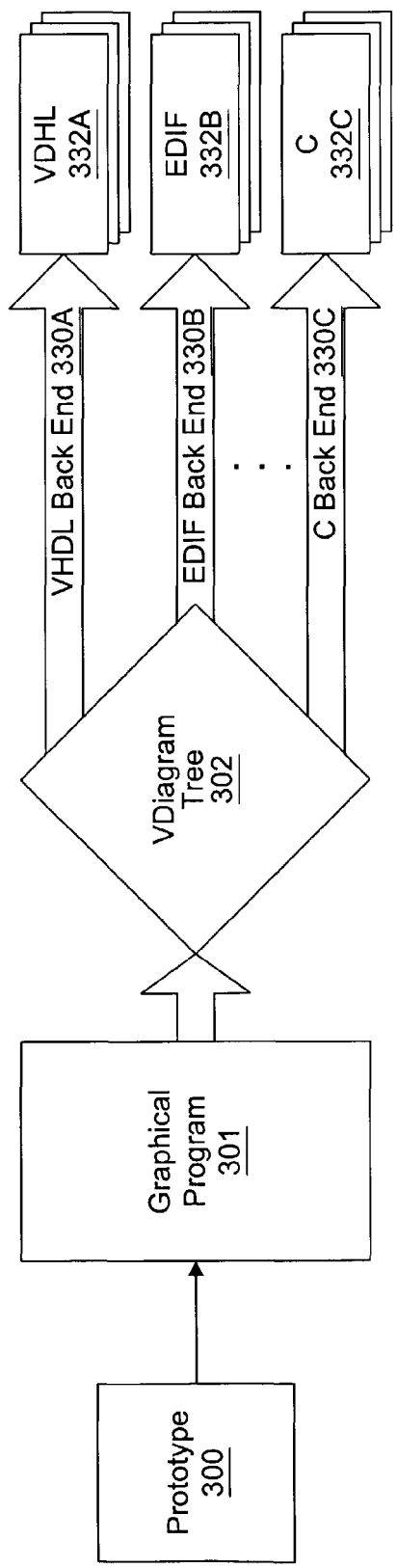
FIG. 31 is a block diagram illustrating the generation of various types of hardware and software descriptions from a VDiagram tree.

FIG. 31—Block Diagram of Generation of Hardware and Software Descriptions from a VDiagram Tree FIG. 31 is a block diagram illustrating the generation of various types of hardware and software descriptions from a VDiagram tree. As described for FIG. 30, programs of the present invention may create a VDiagram tree 302 from a graphical program 301, which is in turn created from a prototype 300. The VDiagram tree 302 represents at least a portion of the graphical program 301. Back end programs 330 generate hardware descriptions from the VDiagram tree 302. Exemplary back end programs 330A, 330B, and 330C are illustrated. Back end 330A generates a VHDL hardware description comprising one or more VHDL files, e.g., VDHL 332A. Back end 330B generates an EDIF hardware description comprising one or more EDIF files, e.g., EDIF 332B. Back end 330C generates a C source code software description comprising one or more C files, e.g., C 332C. It is also contemplated that other back ends may be used to generate hardware descriptions in other hardware and/or software programming languages.

The number and type of back end programs that may be present are not limited. In the preferred embodiment, one or more back end programs may be called automatically as part of a process initiated by a user to generate hardware/software descriptions for the prototype 300 and/or for the graphical program 301. In another embodiment, the VDiagram tree 302 may be generated and saved to a file, and the user may call a back end program at a later time to generate a hardware/software description.

As described above for FIG. 30, appropriate synthesis tools or compilers may be called to convert a hardware/software description into another format such as an FPGA-specific netlist or compiled machine code.

Figure 32:
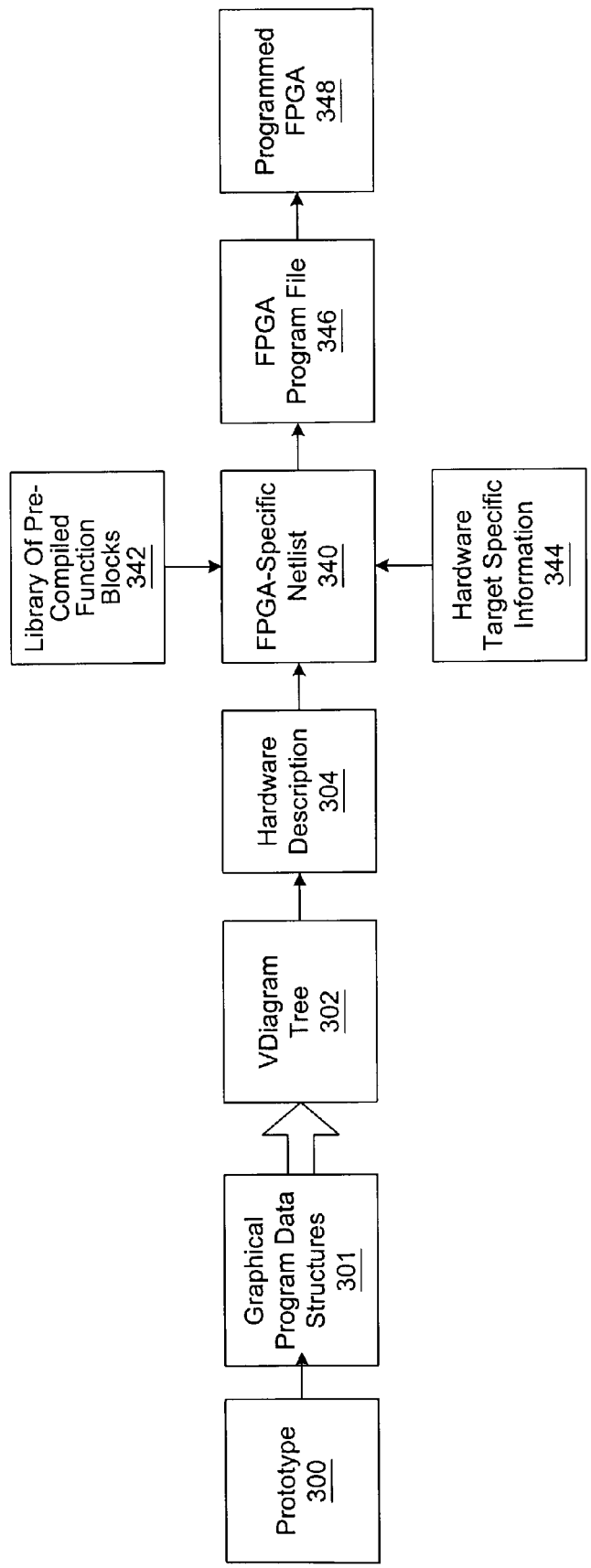
FIG. 32 is a block diagram illustrating conversion of a prototype into a hardware description for an FPGA.

FIG. 32—Block Diagram of Conversion of a Prototype into a Hardware Description for an FPGA As described above and shown in FIG. 32, the graphical program 301 may be programmatically generated based on the prototype 300. FIG. 32 illustrates the exportation of at least a portion of the graphical program 301 into a hardware description and the use of the hardware description to program an FPGA. The VDiagram tree 302 comprises information representing the graphical program 301, including the functional operations of the program, and thus comprises information representing the operations of the prototype 300. The VDiagram tree may comprise individual VDiagrams, each of which maintains a list of components. This list of components may include components which represent functional operations.

A back end program converts the VDiagram tree 302 to a hardware description 304. Back end programs may implement the functionality of the components in the VDiagram component lists using constructs of their respective description languages. For example, a VHDL back end may create VHDL code to implement a component that performs a particular mathematical algorithm such as an exponential calculation. However, in one embodiment, such functional components are simply referenced as library components.

FIG. 32 illustrates one embodiment in which the VDiagram tree references one or more library components. One embodiment of the present invention comprises pre-compiled function blocks 342 which implement these library components for particular hardware devices such as FPGAs. Various FPGA netlist synthesis tools may be called to generate an FPGA netlist 340 from the hardware description 304. These synthesis tools may incorporate the pre-compiled function blocks 342 into the FPGA netlist 340. Also, as shown, the synthesis tools may utilize hardware target-specific information, e.g., Hardware Target Specific Information 344, in creating the netlist. For example, the exact form that the FPGA netlist takes may depend on the particular type of FPGA that will use the netlist, since FPGAs differ in their available resources.

An FPGA bit stream program file 346 may be generated from the FPGA netlist 340 using readily available synthesis tools. This FPGA program file may be uploaded to an FPGA 348. The FPGA 348 may be comprised in a hardware device such as an interface board. After being programmed with the program file 346, the FPGA is able to execute the portion of the graphical program 301 that is exported to the hardware description 304. If the entire graphical program is not exported to the hardware description, then a portion of the program may execute on the general purpose CPU of the computer system. This portion preferably comprises the supervisory control and display portion of the program (if any).

Figure 33:
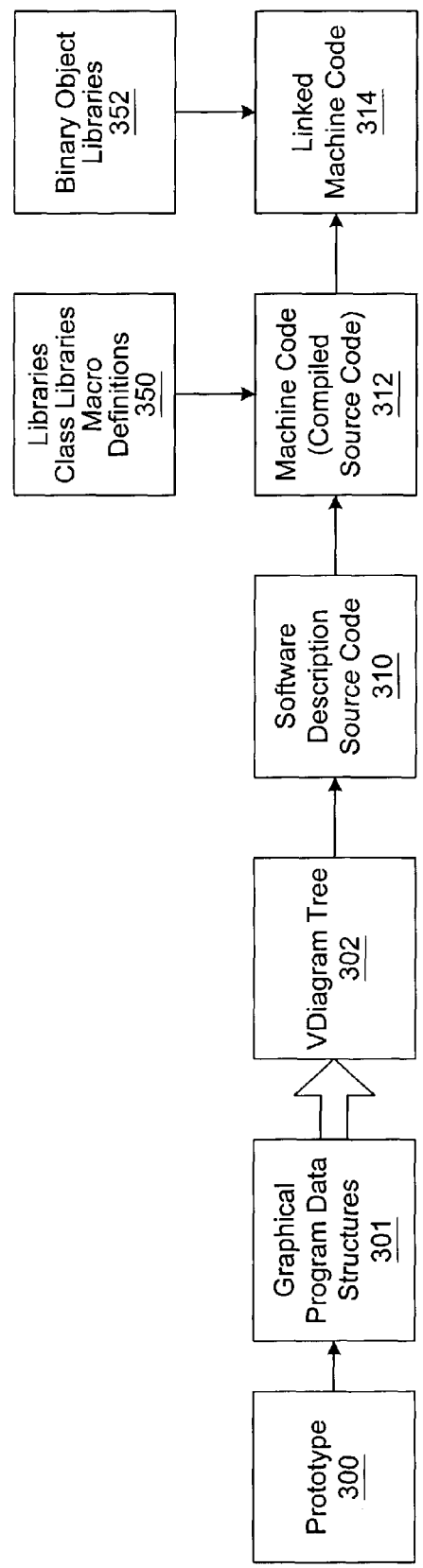
FIG. 33 is a block diagram illustrating conversion of a prototype into a software source code description with compilation and linkage.

FIG. 33—Block Diagram of Conversion of a Prototype into a Software Source Code Description with Compilation and Linkage As described above and shown in FIG. 33, a graphical program 301 may be programmatically generated based on a prototype 300. FIG. 33 illustrates the exportation of at least a portion of the graphical program 301 into a software source code description and the compilation and linkage of the source code. As shown, the graphical program data structures may be first converted to a VDiagram tree 302 and then to software description source code 310.

As described above for FIG. 32, the VDiagram tree 302 may reference library components to represent various functional components of the graphical program. These library components may be implemented in libraries, class libraries, macro definitions, etc. 350. As shown in FIG. 33, these class libraries, etc. may be used to produce the machine code 312 from the source code 310. Also, binary object libraries 362 may implement some functionality of the software description. These binary object libraries may be linked in with the machine code 312 to produce the linked executable code 314. Libraries 350 and 352 may also contain compiler-specific or platform-specific information necessary to produce executable code 314. Linked code 314 may be executed to perform the operations of the portion of the graphical program that is exported to the software source code description 310.

Figure 34:
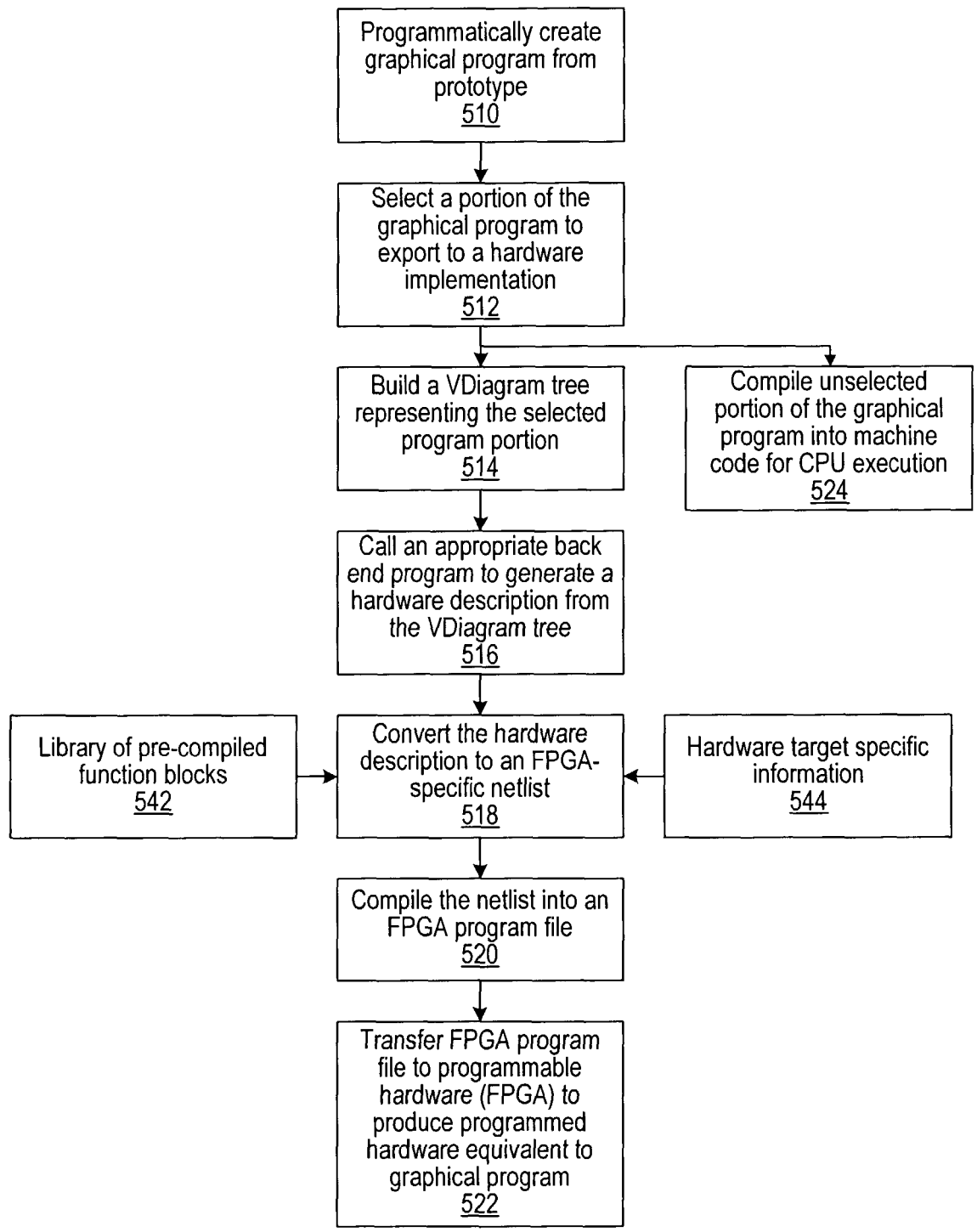
FIG. 34 is a flowchart diagram illustrating operation of one embodiment of a method for converting a prototype to an FPGA hardware implementation.

FIG. 34—Conversion of a Prototype into a Hardware Implementation

FIG. 34 is a flowchart diagram illustrating operation of one embodiment of a method for converting a prototype to a hardware implementation. In the specific embodiment shown, the method may operate to deploy the prototype on a device including an FPGA. It is noted that various of the steps in the flowchart can occur concurrently or in different orders.

According to one embodiment of the invention, a user may utilize a prototyping environment to create a prototype, and the prototyping environment may be operable to deploy the prototype on a hardware device including reconfigurable or programmable hardware. Many applications, such as signal processing and motion control, are easily implemented in software. However, in some instances traditional software compilation methods cannot produce an application that is fast enough to meet a user's needs. Thus, according to the method of FIG. 34, a software prototype may be converted into application-specific hardware such as a programmed FPGA. The hardware may maintain the functionality of the prototype while running at speeds far exceeding that of traditional general-purpose processor platforms. In one embodiment, the hardware utilized may be a desktop or embedded PC that includes an FPGA-based and/or processor based card or board.

As shown in step 510, a graphical program may first be programmatically, i.e., automatically, generated from the prototype, e.g., after the user has developed the prototype in the prototyping environment. Programmatic generation of a graphical program based on a prototype is discussed above. The graphical program may comprise a graphical data flow diagram which included interconnected nodes or icons visually indicating functionality of the program. This graphical data flow diagram may be directly compilable into machine language code for execution on a computer system.

In one embodiment, the user may modify the graphical program after the graphical program has been programmatically generated. As one example, the user may add functionality to the graphical program which was not specified by the prototype. As another example, if the generated graphical program did not include a user interface portion or front panel then the user may add a user interface portion or front panel, or the user may modify a user interface portion or front panel that was generated for the program.

The graphical program may then be compiled for the FPGA hardware. However, some graphical programming constructs may not be efficiently implemented in FPGA hardware. For example, file I/O is a task that is usually better left to the general-purpose host processor. Thus, in one embodiment the generated graphical program may be bisected into hardware and software portions.

Steps 512-522 are an example implementation of steps 866 of FIG. 23 and 966 of FIG. 27.

In step 512, a first portion of the graphical program for conversion to a hardware implementation may be selected, either programmatically or in response to user input. This first portion of the graphical program which is desired for hardware implementation preferably comprises portions of the graphical program, e.g., particular subprograms, which require a fast or deterministic implementation and/or are desired to execute in a stand-alone hardware unit. In general, portions of the graphical program which are desired to have a faster or more deterministic execution are selected in step 512 and converted into the hardware implementation in steps 514-522. A default case is that the entire block diagram portion of the graphical program is selected for hardware implementation.

In step 524 the remaining portions of the graphical program which were not selected in step 512, if any, may be compiled into machine code for execution on a CPU, such as the host processor in the computer 82 or the processor 212 comprised on the hardware device. The first portion of the program selected in step 512 preferably excludes program portions involving supervisory control and display. This enables the supervisory control and display portions to execute on the host CPU, which is optimal for these elements of the program.

In one embodiment, during creation of the prototype in the prototyping environment, the user may specify portions of the prototype, e.g., particular operations, which are to be exported to the hardware description format for conversion into a hardware implementation. Thus, in step 512 the corresponding portions of the graphical program may be automatically selected for conversion to the hardware implementation. In another embodiment, after generation of the graphical program in step 510 the user may specify portions of the graphical program, e.g. subprograms, which are to be exported to the hardware description format for conversion into a hardware implementation. In another embodiment the user may select which modules or subprograms of the graphical program to export to the hardware implementation when the conversion process from the graphical program is initiated. In another embodiment, the entire graphical program may be selected for conversion to a hardware implementation, and thus step 524 may not be performed.

In step 514 the graphical program portion selected in step 512 may first be processed to create an abstract hardware graph called a VDiagram tree, described above, which serves as an intermediate data structure. The VDiagram tree may contain a complete hardware representation of the program, but is not specific to any hardware description language. For example, the VDiagram tree may comprise data structures representing hardware signals that implement the data flow within the graphical program, as well as data structures representing hardware signals that are added to preserve the proper execution flow (enable signals).

In step 516, a back end program may be called to parse the VDiagram tree and generate a hardware description from it. The back end may translate the information contained in the VDiagram tree into a specific hardware description language. For example, a VHDL back end may be called to generate a VHDL file or set of files describing the program. The hardware description comprises a high-level hardware description of function blocks, logic, inputs, and outputs which perform the operation indicated by the portion of the graphical program selected in step 512.

Various types of back end programs may be present. Back end programs may generate software source code descriptions as well as hardware description language descriptions. For example, FIG. 35 illustrates a back end 330A which uses the VDiagram tree to generate one or more VHDL files; back end 330B which generates one or more EDIF files; and back end 330C which generates one or more C files. These three back ends are representative only. Other back ends may generate other types of descriptions for the program. For example, a Verilog back end may generate a Verilog file for the program. Also, more than one back end may be called to generate different program descriptions. In the preferred embodiment, a VHDL back end generates a VHDL description which may then be compiled and used to program a programmable logic device such as an FPGA.

In step 518 the method may operate to convert the hardware description into an FPGA-specific netlist. The netlist describes the components required to be present in the hardware as well as their interconnections. Conversion of the hardware description into the FPGA-specific netlist is preferably performed by any of various types of commercially available synthesis tools, such as those available from Xilinx, Altera, etc.

In one embodiment, the converting step 518 may utilize one or more pre-compiled function blocks from a library of pre-compiled function blocks 542. Thus, for certain function blocks which are difficult to compile, or less efficient to compile, from a hardware description into a netlist format, the hardware description created in step 516 includes a reference to a pre-compiled function block from the library 542. Alternatively, hardware implementations for all of the function blocks are included in the function library. The respective pre-compiled function blocks may simply inserted into the netlist in place of these references in step 518. One embodiment of the invention thus includes the library 542 of pre-compiled function blocks, also referred to as the component library, which are used in creating the netlist. One embodiment also includes hardware target specific information 544 which is used by step 518 in converting the hardware description into a netlist which is specific to a certain type or class of FPGA.

In step 520 the method may operate to compile the netlist into an FPGA program file, also referred to as a software bit stream. The FPGA program file is a file that can be readily uploaded to program an FPGA.

After the netlist has been compiled into an FPGA program file in step 520, then in step 522 the method may operate to transfer the FPGA program file to the FPGA, to produce a programmed hardware equivalent to the graphical program. Thus, upon completion of step 522, the portion of a graphical program selected in step 512 is comprised as a hardware implementation in an FPGA or other programmable hardware element. Thus the portion of the prototype which this portion of the graphical program implements (which may include the entire prototype) is also comprised as a hardware implementation in an FPGA or other programmable hardware element.

In the preferred embodiment, the hardware description is passed transparently through the FPGA vendor's synthesis tools. Because the vendor's tools may take a considerable amount of time to process the design and generate a programming bitstream, it is recommended that this only be done after the design has been debugged using traditional software techniques.

As described above, in one embodiment, the method may be utilized on PC computers equipped with an FPGA-based expansion card on the PCI bus. Embodiments of the FPGA-based expansion card were described with reference to FIGS. 6A-6C. The programming bitstream generated by the FPGA vendor's design tools may be uploaded into the FPGA on this board. The FPGA then may begin processing data, and a graphical programming system with which the generated graphical program is associated may coordinate data flow between the FPGA and the host CPU.

It is noted that various of the above steps can be combined and/or can be made to appear invisible to the user. For example, steps 518 and 520 can be combined into a single step, as can steps 510-522 and/or 512-522. In one embodiment, after the user creates the prototype, the user simply selects a hardware export option from within the prototyping environment and indicates the hardware target or destination, causing steps 510-522 to be automatically performed. In another embodiment, the user may first request the graphical program to be programmatically generated based on the prototype. The user may then open the generated graphical program in a graphical programming development environment application with which the graphical program is associated and may optionally modify the program. The user may then simply select a hardware export option from within the graphical programming development environment and may indicate the hardware target or destination, causing steps 510-522 to be automatically performed. For example, in one embodiment, a LABVIEW™ graphical program may be programmatically generated, and the user may open the LABVIEW™ program in the "FPGA LABVIEW™" graphical programming development environment. The "FPGA LABVIEW™" graphical programming development environment provides a seamless interface to FPGA hardware, while appearing to the user the same as the normal LABVIEW™ graphical programming development environment.

In one embodiment, it may be desirable to execute a prototype developed in the prototyping environment on multiple hardware devices. For example, a prototype may include different types of operations such as motion control, machine vision, DAQ, and/or other types of operations. In one embodiment, different types of operations in the prototype may be performed on different hardware devices. For example, configurable hardware of a motion control device may be programmed to perform motion control operations of the prototype, while configurable hardware of a DAQ device may be programmed to perform DAQ operations of the prototype. The method may automatically partition the prototype or the corresponding graphical program so that the operations are performed on the appropriate devices, or the user may specify the partitioning among the devices.

FIG. 38 applies to an embodiment in which the programmable hardware element is an FPGA. However, the same or similar steps may be applied to convert a prototype into a hardware implementation for other types of programmable or (re)configurable hardware, such as a CPLD.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for configuring a hardware device, the method comprising:

utilizing a computer to perform:
displaying a graphical user interface (GUI) in a prototyping environment that provides access to a set of operations, wherein the prototyping environment enables the user to create prototypes without requiring the user to write code in a programming language;
receiving user input to the GUI specifying a prototype by selecting a sequence of operations from the set of operations, wherein the prototype comprises the specified sequence of operations, and wherein the prototype does not include programming code;
automatically generating a graphical program based on the prototype, wherein, when executed, the graphical program implements functionality specified by the prototype, wherein the graphical program comprises graphical source code in the form of a plurality of interconnected nodes which visually indicate the functionality of the graphical program, wherein said automatically generating the graphical program based on the prototype comprises automatically including the nodes in the graphical program without direct user input selecting and interconnecting the nodes during said generating; and
configuring the hardware device to execute at least a portion of the generated graphical program by deploying the at least a portion of the graphical program to the hardware device, wherein said configuring comprises configuring the hardware device to implement at least a portion of the specified sequence of operations.

2. The computer-implemented method of claim 1, further comprising:
modifying the generated program in response to user input after generating the graphical program;
wherein said deploying comprises deploying at least a portion of the modified graphical program on the hardware device.

3. The computer-implemented method of claim 1,
wherein the hardware device includes a processor and a memory;
wherein said deploying at least a portion of the graphical program on the hardware device comprises transferring the at least a portion of the graphical program to the memory on the hardware device;
wherein the method further comprises the processor in the hardware device executing the at least a portion of the graphical program from the memory.

4. The computer-implemented method of claim 1,
wherein the hardware device includes a programmable hardware element;
wherein said deploying at least a portion of the graphical program on the hardware device comprises:
generating a hardware description based on the at least a portion of the graphical program, wherein the hardware description describes a hardware implementation of the at least a portion of the graphical program; and configuring the programmable hardware element in the hardware device utilizing the hardware description, wherein after said configuring, the programmable hardware element implements a hardware implementation of the at least a portion of the graphical program.

5. The computer-implemented method of claim 1,
wherein the hardware device includes a processor and a memory and a programmable hardware element;
wherein said deploying at least a portion of the graphical program on the hardware device comprises:
transferring a first portion of the graphical program to the memory on the hardware device;
generating a hardware description based on a second portion of the program, wherein the hardware description describes a hardware implementation of the program; and
configuring the programmable hardware element in the hardware device utilizing the hardware description, wherein after said configuring, the programmable hardware element implements a hardware implementation of the second portion of the program.

6. The computer-implemented method of claim 5, further comprising:
the processor in the hardware device executing the first portion of the graphical program from the memory; and
the programmable hardware element in the hardware device executing the second portion of the graphical program.

7. The computer-implemented method of claim 5,
wherein the first portion of the graphical program is operable to perform one or more operations of the prototype and wherein the second portion of the graphical program comprises a control portion.

8. The computer-implemented method of claim 5,
wherein the first portion of the graphical program comprises a control portion, and wherein the second portion of the graphical program is operable to perform one or more operations of the prototype.

9. The computer-implemented method of claim 1,
wherein the graphical program includes a user interface;
wherein the method further comprises displaying the user interface on a display during execution of the graphical program by the hardware device.

10. The computer-implemented method of claim 9, further comprising:
receiving user input to the user interface on the display to control the hardware device during execution of the graphical program by the hardware device.

11. The computer-implemented method of claim 1,
wherein said displaying the graphical user interface and said receiving the user input to the graphical user interface are performed by a first computer system;
wherein the hardware device is coupled to the first computer system over a network; and
wherein said configuring the hardware device to execute at least a portion of the prototype comprises the first computer system deploying the at least a portion of the prototype over the network to the hardware device.

12. The computer-implemented method of claim 1, further comprising:
receiving user input to the graphical user interface for configuring one or more of the operations in the prototype.

13. The computer-implemented method of claim 12,
wherein said receiving user input to the graphical user interface for configuring one or more of the operations in the prototype does not include receiving user input specifying programming language code to configure the operations.

14. The computer-implemented method of claim 12, further comprising:
for each operation to be configured, displaying a graphical panel including graphical user interface elements for setting properties of the operation and receiving user input to the graphical panel to set one or more properties of the operation.

15. The computer-implemented method of claim 1,
wherein the sequence of operations comprises a sequence of image processing operations that implement an image processing function;
wherein the hardware device is an image acquisition device;
wherein said configuring comprises configuring the image acquisition device to perform the image processing function.

16. The computer-implemented method of claim 1,
wherein the sequence of operations comprises a sequence of motion control operations that implement a motion control function;
wherein the hardware device is a motion control device;
wherein said configuring the hardware device to execute at least a portion of the prototype comprises configuring the motion control device to perform the motion control function.

17. The computer-implemented method of claim 16, further comprising:
the motion control device executing the motion control function to control movement of an object.

18. The computer-implemented method of claim 17, further comprising:
the motion control device acquiring an image of the object;
the motion control device analyzing the image;
wherein the motion control device controlling movement of the object is based on said analyzing the image.

19. The computer-implemented method of claim 1,
wherein the sequence of operations comprises a sequence of data acquisition (DAQ) operations that implement a data acquisition function;
wherein the hardware device is a DAQ device;
wherein said configuring the hardware device to execute at least a portion of the prototype comprises configuring the DAQ device to perform the data acquisition function.

20. The computer-implemented method of claim 19, further comprising:
the DAQ device executing the data acquisition function to acquire measurement data from an object.

21. A non-transitory computer-accessible memory medium that stores instruction executable by a processor to:
display a graphical user interface (GUI) in a prototyping environment that provides access to a set of operations, wherein the prototyping environment enables the user to create prototypes without requiring the user to write code in a programming language;
receive user input to the GUI specifying a prototype by selecting a sequence of operations from the set of operations, wherein the prototype comprises the specified sequence of operations, and wherein the prototype does not include programming code;
automatically generate a graphical program based on the prototype, wherein, when executed, the graphical program implements functionality specified by the prototype, wherein the graphical program comprises graphical source code in the form of a plurality of interconnected nodes which visually indicate the functionality of the graphical program, wherein to automatically generate the graphical program based on the prototype, the program instructions are operable to automatically including the nodes in the graphical program without receiving direct user input selecting and interconnecting the nodes during generation; and configure the hardware device to execute at least a portion of the generated graphical program by deploying the at least a portion of the graphical program to the hardware device, wherein said configuring comprises configuring the hardware device to implement at least a portion of the specified sequence of operations.

22. The non-transitory computer-accessible memory medium of claim 21,
- wherein the hardware device includes a processor and a memory;
- wherein to deploy at least a portion of the graphical program on the hardware device, the program instructions are operable to transfer the at least a portion of the graphical program to the memory on the hardware device;
- wherein the processor in the hardware device is operable to execute the at least a portion of the graphical program from the memory.

23. The non-transitory computer-accessible memory medium of claim 21,
- wherein the hardware device includes a programmable hardware element;
- wherein to deploy at least a portion of the graphical program on the hardware device, the program instructions are operable to:
- generate a hardware description based on the at least a portion of the program, wherein the hardware description describes a hardware implementation of the at least a portion of the program; and
- configure the programmable hardware element in the hardware device utilizing the hardware description, wherein after said configuration, the programmable hardware element implements a hardware implementation of the at least a portion of the program.

24. The non-transitory computer-accessible memory medium of claim 21,
- wherein the generated graphical program implements the sequence of operations in the prototype.

25. A system comprising:
- a computer system comprising a processor, memory, and a display;
- a hardware device coupled to the computer system, wherein the hardware device includes a functional unit that is configurable based on a program;
- wherein the memory of the computer system stores prototyping software that enables the user to create prototypes without requiring the user to write code in a programming language, wherein the prototyping software is operable to:
  - receive user input specifying a prototype; and
  - store the prototype, wherein the prototype comprises a sequence of operations, and wherein the prototype does not include programming code;
- wherein the memory of the computer system also stores software executable to automatically generate a graphical program based on the prototype, wherein, when executed, the generated graphical program implements functionality of the prototype, wherein the graphical program comprises graphical source code in the form of a plurality of interconnected nodes which visually indicate the functionality of the program, wherein the software executable to automatically generate the graphical program based on the prototype does not require receiving direct user input selecting and interconnecting the nodes during generation;
- wherein the memory of the computer system also stores software executable to configure the functional unit of the hardware device based on the generated graphical program.

26. The system of claim 25,
- wherein the generated graphical program implements the sequence of operations in the prototype.

* * * * *